(12) United States Patent
    Amirabadi

(10) Patent No.: US 10,250,120 B2
(45) Date of Patent: Apr. 2, 2019

(54) POWER CONVERSION DEVICES AND CONTROL METHODS THEREFOR

(71) Applicant: Northeastern University, Boston, MA (US)

(72) Inventor: Mahshid Amirabadi, Lexington, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 15/598,831

(22) Filed: May 18, 2017

(65) Prior Publication Data

US 2017/0338732 A1    Nov. 23, 2017

Related U.S. Application Data

(60) Provisional application No. 62/338,103, filed on May 18, 2016.

(51) Int. Cl.
| | |
|---|---|
| *H02M 1/12* | (2006.01) |
| *H02M 7/797* | (2006.01) |
| *H02M 7/86* | (2006.01) |
| *H02M 3/155* | (2006.01) |
| *H02M 5/458* | (2006.01) |
| *H02M 7/5387* | (2007.01) |
| *H02M 1/00* | (2006.01) |

(52) U.S. Cl.
CPC .............. *H02M 1/12* (2013.01); *H02M 3/155* (2013.01); *H02M 5/4585* (2013.01); *H02M 7/5387* (2013.01); *H02M 7/797* (2013.01); *H02M 2001/007* (2013.01)

(58) Field of Classification Search
CPC .......... H02M 1/12; H02M 7/797; H02M 7/86
See application file for complete search history.

(56) References Cited

U.S. PATENT DOCUMENTS

| | | | | |
|---|---|---|---|---|
| 5,010,471 | A * | 4/1991 | Klaassens | H02M 5/271 363/160 |
| 9,678,519 | B1 * | 6/2017 | Alexander | G05F 1/10 |
| 9,692,315 | B2 * | 6/2017 | Backman | H02M 5/4585 |
| 9,755,538 | B2 * | 9/2017 | Rahnamaee | H02M 7/4826 |
| 2008/0013351 | A1 * | 1/2008 | Alexander | H02M 3/1582 363/123 |
| 2011/0026282 | A1 * | 2/2011 | Chapman | H02J 3/38 363/65 |
| 2011/0181128 | A1 * | 7/2011 | Perreault | H02M 7/797 307/151 |

(Continued)

OTHER PUBLICATIONS

Knight J. Capacitive idling techniques improve inverter performance. Second International Conference on Power Electronics, Machines and Drives, 2004 (PEMD 2004) (Conf. Publ. No. 498), pp. 638-643.

(Continued)

*Primary Examiner* — Timothy J Dole
*Assistant Examiner* — Sisay G Tiku
(74) *Attorney, Agent, or Firm* — Arent Fox LLP

(57) ABSTRACT

Power conversion devices with control algorithms that can solve the double frequency harmonic problem are provided, as are techniques for controlling power converters when the instantaneous values of input and output power are not the same.

20 Claims, 41 Drawing Sheets

(56) References Cited

U.S. PATENT DOCUMENTS

| | | | | |
|---|---|---|---|---|
| 2012/0257429 A1* | 10/2012 | Dong | .................. | H02M 3/1582 |
| | | | | 363/127 |
| 2012/0307531 A1* | 12/2012 | Toliyat | ................ | H02M 5/4585 |
| | | | | 363/36 |
| 2013/0235628 A1* | 9/2013 | Dong | .................... | H02M 7/797 |
| | | | | 363/47 |
| 2014/0286059 A1* | 9/2014 | Tollyat | ................ | H02M 5/4585 |
| | | | | 363/37 |
| 2015/0003115 A1* | 1/2015 | Barron | .................... | H02M 1/08 |
| | | | | 363/17 |
| 2016/0172877 A1* | 6/2016 | Xue | ...................... | H02J 7/0052 |
| | | | | 320/145 |
| 2017/0025970 A1* | 1/2017 | Horst | ..................... | H02M 1/15 |
| 2017/0250618 A1* | 8/2017 | Amirabadi | ............ | H02M 5/458 |
| 2018/0019655 A1* | 1/2018 | Amirabadi | ............ | H02M 5/458 |

OTHER PUBLICATIONS

P. T. Krein, R. S. Balog, and M. Mirjafari, "Minimum Energy and Capacitance Requirements for Single-Phase Inverters and Rectifiers Using a Ripple Port," Power Electronics, IEEE Transactions on, vol. 27, pp. 4690-4698, 2012.

Jianguo L, W. Hu, K. Yao, X. Lu, F. Wu, and J. Wu, "Research on input current ripple reduction of two-stage single-phase PV grid inverter," in Power Electronics and Applications (EPE'14-ECCE Europe), 2014 16th European Conference on, 2014, pp. 1-8.

S. Harb, M. Mirjafari, and R. S. Balog, "Ripple-Port Module-Integrated Inverter for Grid-Connected PV Applications," Industry Applications, IEEE Transactions on, vol. 49, pp. 2692-2698, 2013.

S. B. Kjaer, J. K. Pedersen, and F. Blaabjerg, "A review of single-phase grid-connected inverters for photovoltaic modules," Industry Applications, IEEE Transactions on, vol. 41, pp. 1292-1306, 2005.

B. J. Pierquet and D. J. Perreault, "A Single-Phase Photovoltaic Inverter Topology with a Series-Connected Energy Buffer," Power Electronics, IEEE Transactions on, vol. 28, pp. 4603-4611, 2013.

M. Chowdhury, M. Amirabadi, J. Baek "A novel reliable and compact inverter for wireless power transfer", In Proc. IEEE Energy Conversion Congress and Exposition (ECCE), pp. 3160-3166, Sep. 20-24, 2015.

* cited by examiner (a) State 1

(c) State 2

(c) State 3

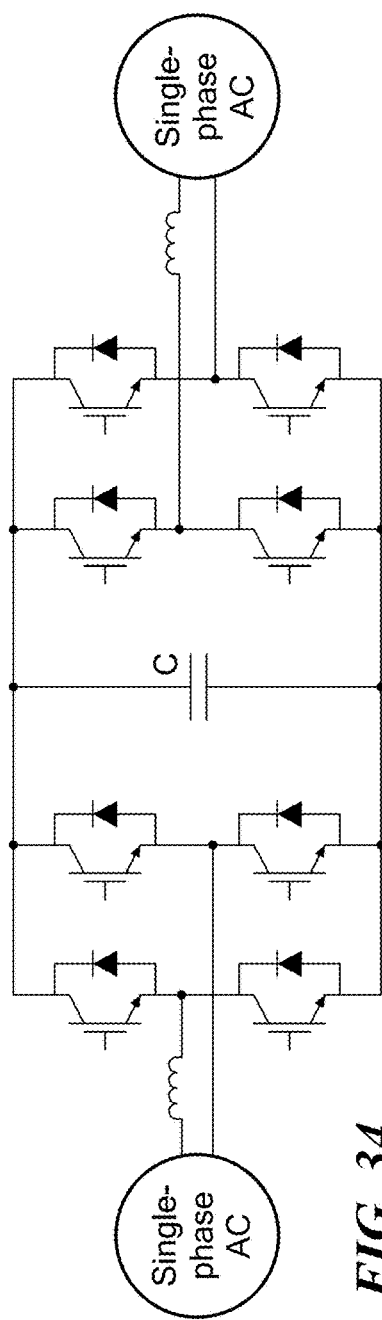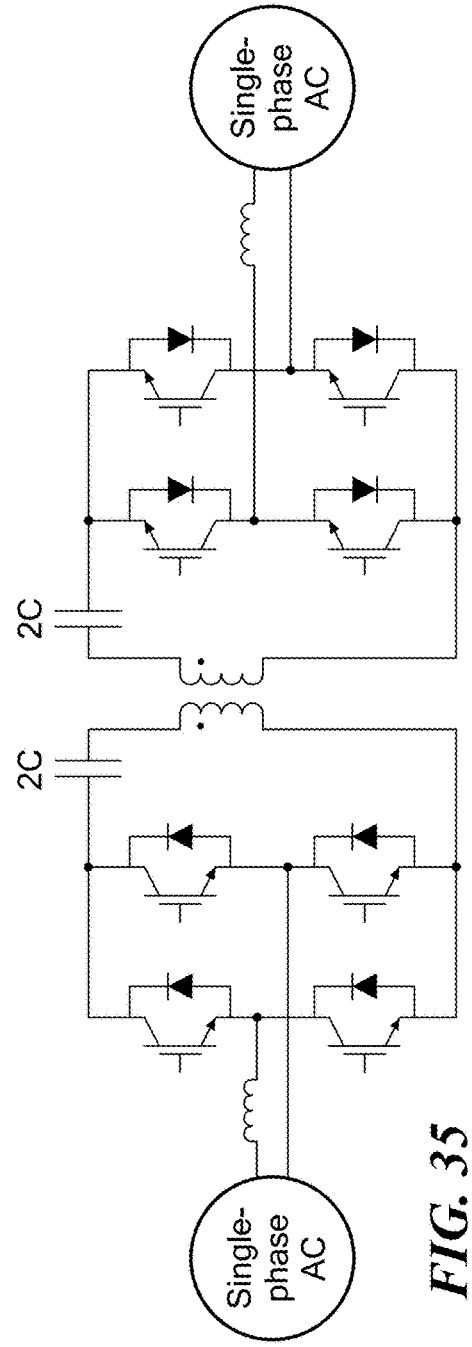
FIG. 34
FIG. 35

POWER CONVERSION DEVICES AND CONTROL METHODS THEREFOR

CROSS REFERENCE TO RELATED APPLICATIONS

This application claims priority under 35 § 119(e) of U.S. Provisional Application No. 62/338,103, filed on May 18, 2016, entitled "Sparse Capacitive Link Power Converter and Control Method Therefor," the disclosure of which is hereby incorporated by reference.

STATEMENT REGARDING FEDERALLY SPONSORED RESEARCH OR DEVELOPMENT

This invention was made with government support under DE-AR0000831 awarded by the Department of Energy. The government has certain rights in the invention.

BACKGROUND

The growing dependency on renewable energy sources and the wide range of electrical loads in residential and industrial applications, demands the next generation of power electronics circuits to be more flexible and capable of transferring electrical power from any types of source, including dc, single-phase ac, or multi-phase ac, to any type of load (dc, single-phase ac, or multi-phase ac) without compromising reliability, cost, efficiency, or power density. There are numerous applications in which the instantaneous values of input and output power are not equal. For instance, in a single-phase inverter the input current and voltage are ideally both dc, resulting in a constant dc power; whereas, the load power has a dc component and an alternating component the frequency of which is twice the frequency of the load voltage/current. The alternating part of the load power will result in the appearance of a double frequency current harmonic at the dc-side, if it is not suppressed. The presence of double frequency harmonic component at the dc-side current is undesirable and can deteriorate the performance of the system. Similarly, in a single-phase ac to single-phase ac converter, the instantaneous values of input and output power will not be the same if the input and output frequencies do not match. Moreover, the instantaneous power of a three-phase system will be dc; therefore interfacing a single-phase system and a three-phase ac system will also results in the appearance of the double frequency harmonic.

The most dominant solution for suppressing the double frequency harmonic is filtering it through a large (high capacitance) capacitor. Electrolytic capacitors are available at high capacitances; however, they have very high failure rates, and are considered the leading cause of failures in power electronic circuits. The failure rates of the other types of capacitors, i.e. film and ceramic capacitors, are much lower than that of electrolytic capacitors; however, they are not available at high capacitances.

SUMMARY OF THE INVENTION

The invention relates to power converters with control algorithms that can solve the double frequency harmonic problem and to techniques for controlling power converters when the instantaneous values of input and output power are not the same.

In some embodiments, single phase inverters/rectifiers are provided having configurations as well as control schemes that solve the double frequency harmonic problem without using electrolytic capacitors or adding any additional components to the circuit.

In some embodiments, a single phase inverter is provided that can transfer power from input towards output through a small capacitor placed in series with input and output switch bridges. This capacitor can suppress the double frequency harmonic of the single phase inverter without affecting input or output currents/voltages. The voltage of this capacitor has a large ripple, because it has very low capacitance. However, its large voltage ripple does not deteriorate the performance of the inverter. The small link capacitance allows using film capacitors instead of electrolytic capacitors. In a further embodiment, an inverter is also provided that uses a parallel capacitor for transferring the power.

In some embodiments, an inverter based on a buck-boost converter is provided that can transfer power from the source toward the load through a small inductor. As with the previous embodiments, this inductor can regulate input and output currents while suppressing the double frequency harmonic.

In some embodiments, power converters with control algorithms are provided that can solve the double frequency harmonic problem in dc to single-phase ac, single-phase ac-to-single-phase ac, and single-phase ac to three-phase ac converters without using electrolytic capacitors or adding any additional components to the circuit. In some embodiments, the techniques can be used in any system that has unequal instantaneous input and output power values.

In some embodiments, a class of converters uses a small link capacitor (series or parallel) for transferring the power from input towards output. This capacitor can manage the mismatch of input and output power, as well. For instance, it can suppress the double frequency harmonic of the single phase inverter without affecting input or output currents/voltages. The voltage of this capacitor may have larger voltage ripple, because it has very low capacitance. However, its large voltage ripple does not deteriorate the performance of the inverter. The small link capacitance allows using film capacitors instead of electrolytic capacitors.

In some embodiments, a class of converters transfers power from a source towards a load through a small inductor. This inductor regulates the input and output currents while managing the mismatch of instantaneous input and output power values. No additional passive components are required in the proposed converters for eliminating the double frequency harmonic.

Further aspects include the following:

1. A power conversion device comprising:
   input circuitry configured to be coupled to a power source or load, the input circuitry comprising at least one switching device or diode;
   an output switch bridge configured to be coupled to a load or power source, the output switch bridge comprising at least four controllable switching devices arranged in a bridge configuration to control current output; and
   a link stage comprising at least one reactive component configured for alternating current (AC) operation, wherein the input circuitry, output switch bridge and link stage are operative to regulate input and output currents and manage power mismatch between the power source and load.
2. The device of embodiment 1, wherein the device is operative to suppress a double frequency harmonic component at the input circuitry.
3. The device of any of embodiments 1-2, wherein switches in the input circuitry and output switch bridge are operative at a fixed switching frequency.

4. The device of any of embodiments 1-3, wherein the device is operative in a discontinuous current mode.
5. The device of any of embodiments 1-4, wherein the device is operative to control the input current to be about equal to a selected reference value.
6. The device of any of embodiments 1-5, wherein the input circuitry comprises an input switch bridge configured to be coupled to a direct current (DC) power source, the input switch bridge comprising at least one switching device controllable to regulate an input DC current with suppression of a double frequency harmonic component; and the output switch bridge is configured to be coupled to an AC load, the output switch bridge comprising at least four controllable switching devices arranged in a bridge configuration to control current output to the load.
7. The device of embodiment 6, wherein the input switch bridge comprises at least a second switching device, and the input switch bridge is configured to be coupled to a second direct current (DC) power source.
8. The device of embodiments 6, wherein the input switch bridge comprises at least four switching devices arranged in a bridge configuration.
9. The device of any of embodiments 1-8, wherein the device is operative as a single phase inverter or rectifier.
10. The device of any of embodiments 1-9, wherein the device is operative to regulate the input current and the output current simultaneously.
11. The device of any of embodiments 1-10, wherein the link stage is arranged in series or in parallel with the input switch bridge and the output switch bridge.
12. The device of any of embodiments 1-11, wherein the reactive component comprises at least one capacitive device having an operative range of about $1\times10^{-4}$ F to less than $1\times10^{-9}$ F.
13. The device of any of embodiments 1-12, wherein the reactive component comprises a film capacitor, a ceramic capacitor, or an electrolytic capacitor.
14. The device of any of embodiments 1-13, wherein the reactive component comprises an inductive device.
15. The device of any of embodiments 1-14, wherein the at least one reactive component comprises a galvanic isolation device.
16. The device of any of embodiments 1-15, wherein the device is operative to provide bidirectional flow of power.
17. The device of any of embodiments 1-16, wherein the output switch bridge is configured to be coupled to a second load.
18. The device of any of embodiments 1-17, wherein the input circuitry is coupled to an AC power source or load.
19. The device of any of embodiments 1-18, wherein the input circuitry is coupled to a single phase AC source or load.
20. The device of any of embodiments 1-19, wherein the output switch bridge is coupled to an AC load or power source.
21. The device of any of embodiments 1-20, wherein the output switch bridge is coupled to a single phase, three phase, or poly phase AC load or source.
22. The device of any of embodiments 1-21, wherein each of the switching devices of the output switch bridge comprises a field effect transistor (FET), an insulated gate bipolar transistor (IGBT), or a metal-oxide-semiconductor field-effect transistor (MOSFET) with anti-parallel diode.
23. The device of any of embodiments 1-22, wherein the at least one the switching device of the input circuitry comprises a field effect transistor (FET), an insulated gate bipolar transistor (IGBT), or a metal-oxide-semiconductor field-effect transistor (MOSFET) with anti-parallel diode.
24. The device of any of embodiments 1-23, further comprising circuitry that causes, and/or a controller comprising one or more processors, memory, and machine-readable instructions stored in the memory that, upon execution by the one or more processors, cause the device to carry out operations to control sequence and duration of each of the controllable switching devices.
25. The device of any of embodiments 1-24, wherein the device is operative in at least three states, including at least one state to charge the reactive component of the link stage from the power sources and through the input switch bridge, at least one state in which power is discharged from the link stage into the loads through the output switch bridge, and at least one state in which no power is transferred through the link stage.
26. The device of any of embodiments 1-25, wherein a voltage rating of the switching devices is about equal to a maximum link stage voltage.
27. The device of any of embodiments 1-26, wherein a maximum voltage of the link stage is selected based on a selected maximum link stage capacitance.
28. The device of any of embodiments 1-27, wherein the link stage comprises a plurality of capacitors, each capacitor in series with a bidirectional conducting bidirectional blocking controllable switching device, the plurality of capacitors arranged in series or in parallel with the input circuitry and the output switch bridge.
29. The device of embodiment 28, wherein each capacitor transfers power in at least two switching cycles over a load power cycle.
30. The device of any of embodiments 1-29, further comprising a transformer connected to an AC load or AC source.
31. The device of any of embodiments 1-26 and 30, wherein the link stage comprises a plurality of series inductors, each inductor in parallel with a forward conducting bidirectional blocking controllable switching device, the plurality of inductors arranged in series or in parallel with the input circuitry and the output switch bridge.
32. A method of controlling a power conversion device, comprising:
providing the power conversion device of embodiment 1; and
operating the device to regulate the input and output currents with suppression of a double frequency harmonic component.
33. The method of embodiment 32, further comprising operating the device in a first state to charge the reactive component of the link stage from the input switch bridge, in a second state in which power is discharged from the link stage into the output switch bridge, and in a third state in which no power is transferred through the link stage.
34. A method of controlling a power conversion device, comprising:
providing the power conversion device of embodiment 1; and
operating the device with a plurality of switching cycle, each switching cycle comprising at least one charging state, at least one discharging state, and at least one state during which no power is transferred.

DESCRIPTION OF THE DRAWINGS

The invention will be more fully understood from the following detailed description taken in conjunction with the accompanying drawings in which.

Figure 23:
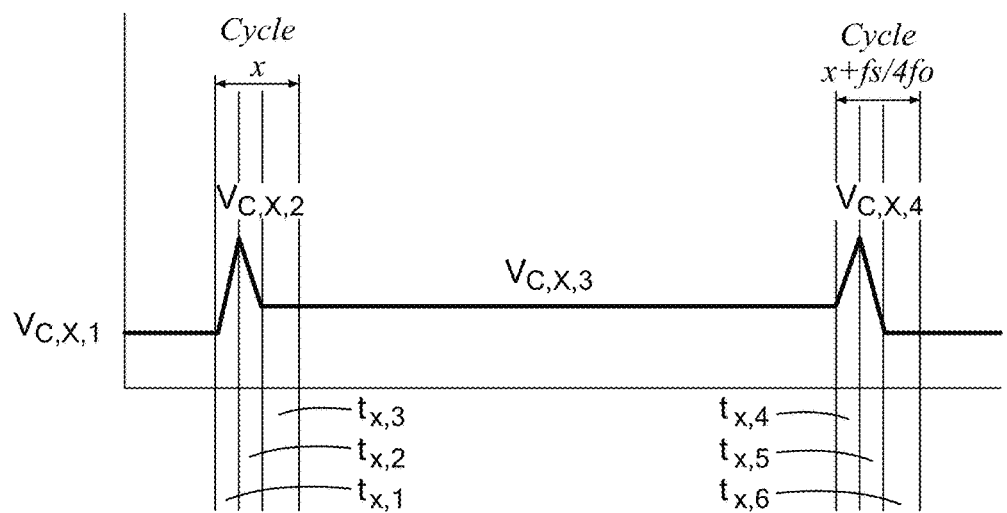
Figure 24:
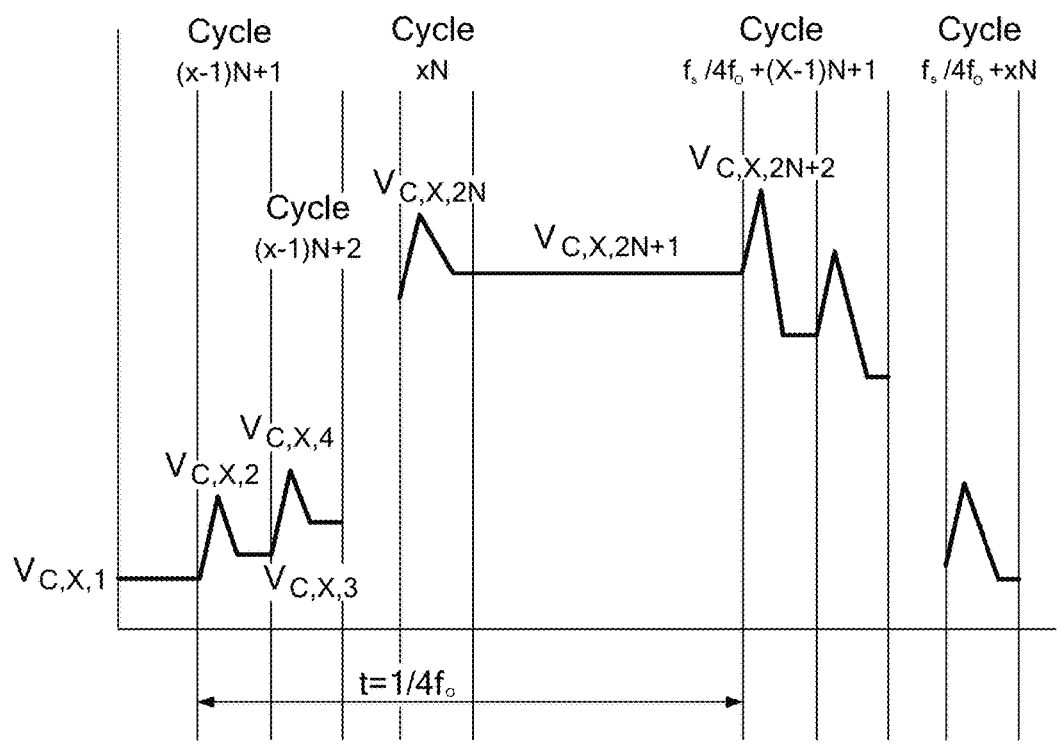
Figure 25:
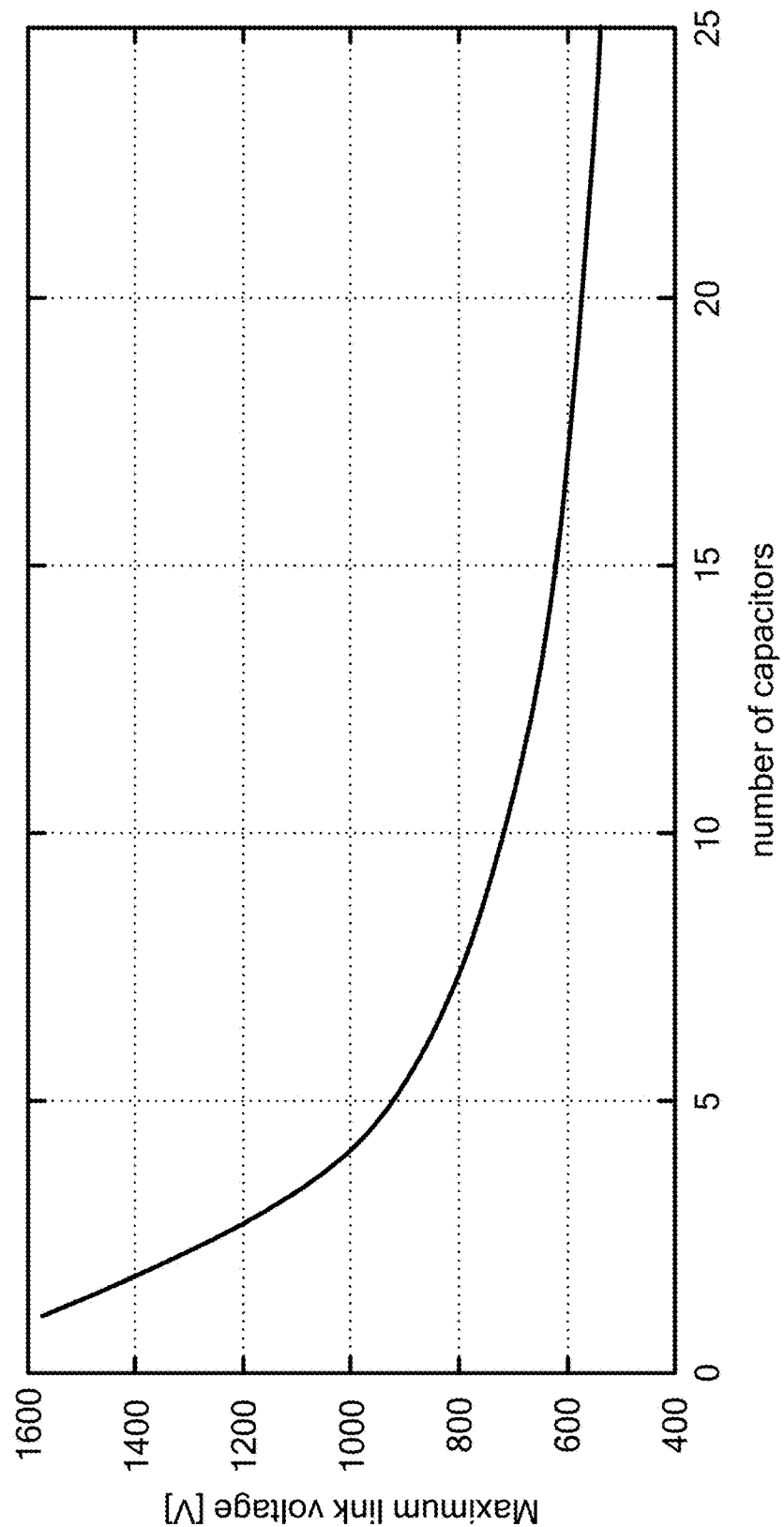

number of capacitors are used in the proposed single-phase capacitive link inverter;

FIG. 23 is a graph illustrating the voltage across an arbitrary capacitor when $$\frac{f_s}{4f_o}$$

number of capacitors are used in the proposed single-phase capacitive link inverter;

FIG. 24 is a graph illustrating the voltage across an arbitrary capacitor ($x^{th}$ capacitor) when an optional number of capacitors are used in a single-phase capacitive link inverter;

FIG. 25 is a graph illustrating maximum voltage across the switches/diodes vs. the number of capacitors used in as a capacitor network in a single-phase capacitive link inverter for a 1 kW system $$(V_m = 200 \text{ V}, I_m = 10 \text{ A}, V_{dc} = 50 \text{ V}, I_{dc} = 20 \text{ A},$$
$$f_s = 6 \text{ kHz}, f_o = 60 \text{ Hz}, \theta_V = -\frac{\pi}{4}, \theta_i = -\frac{\pi}{4}, C = 2.2 \text{ μF});$$

Figure 26:
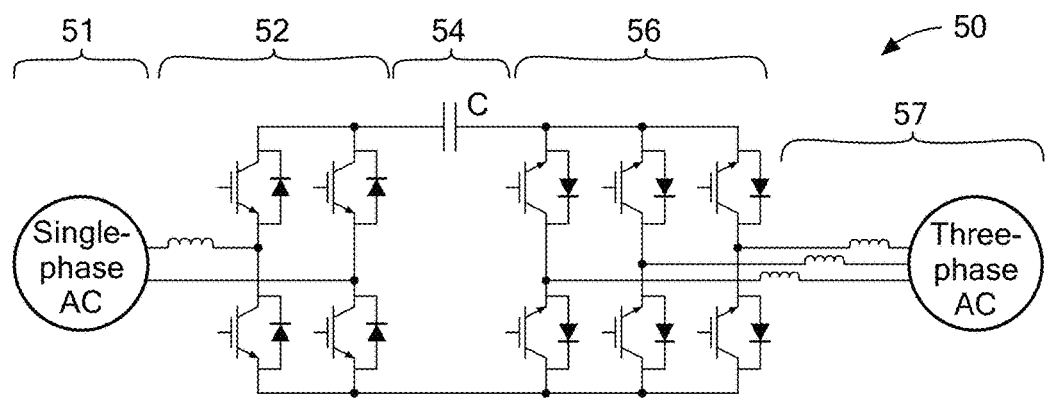
Figure 27:
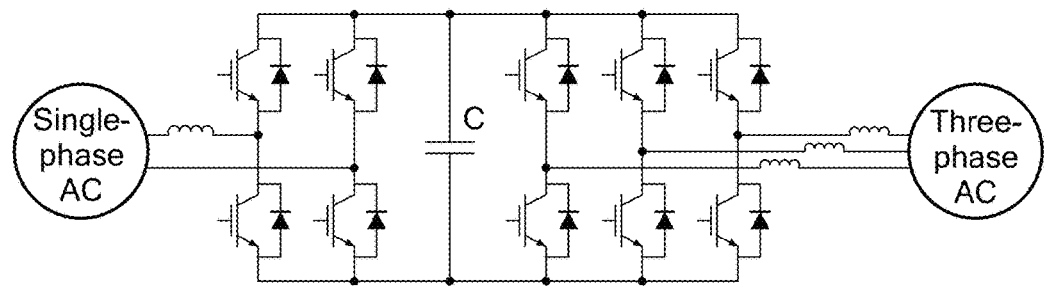
Figure 28:
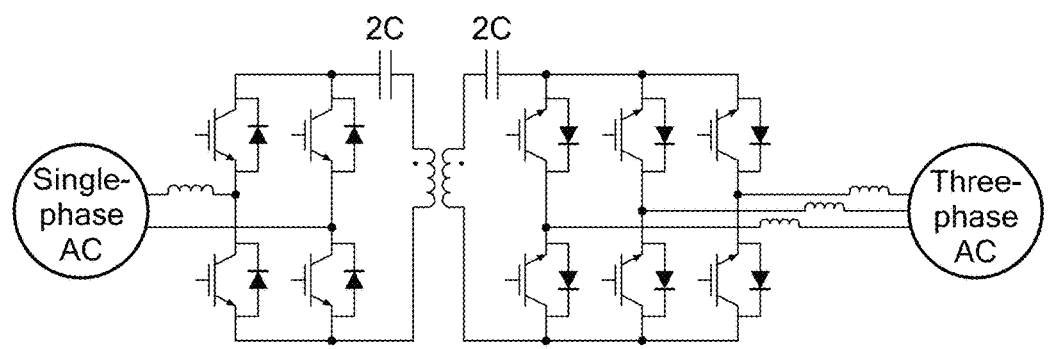
Figure 29A:
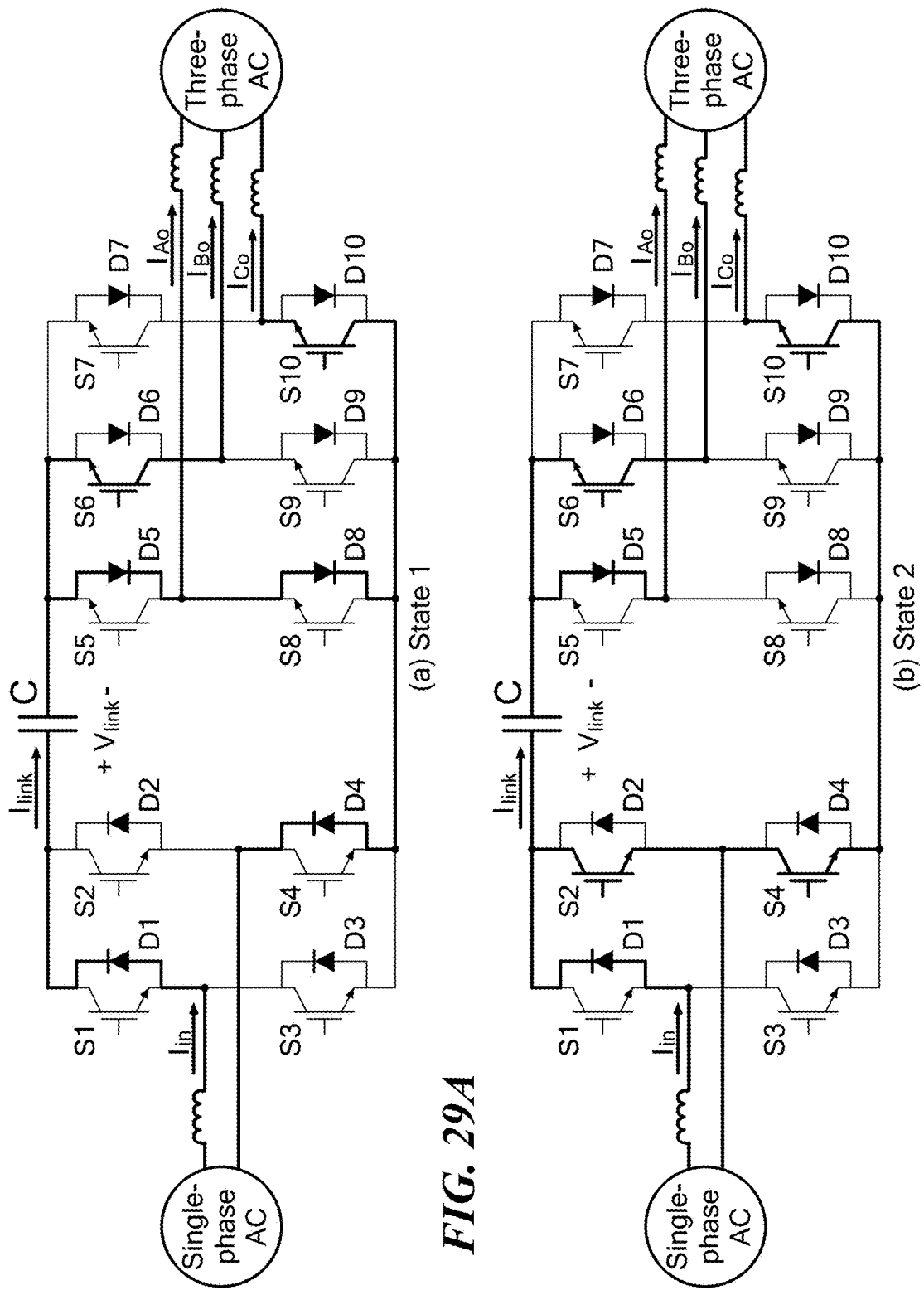
Figure 29B:
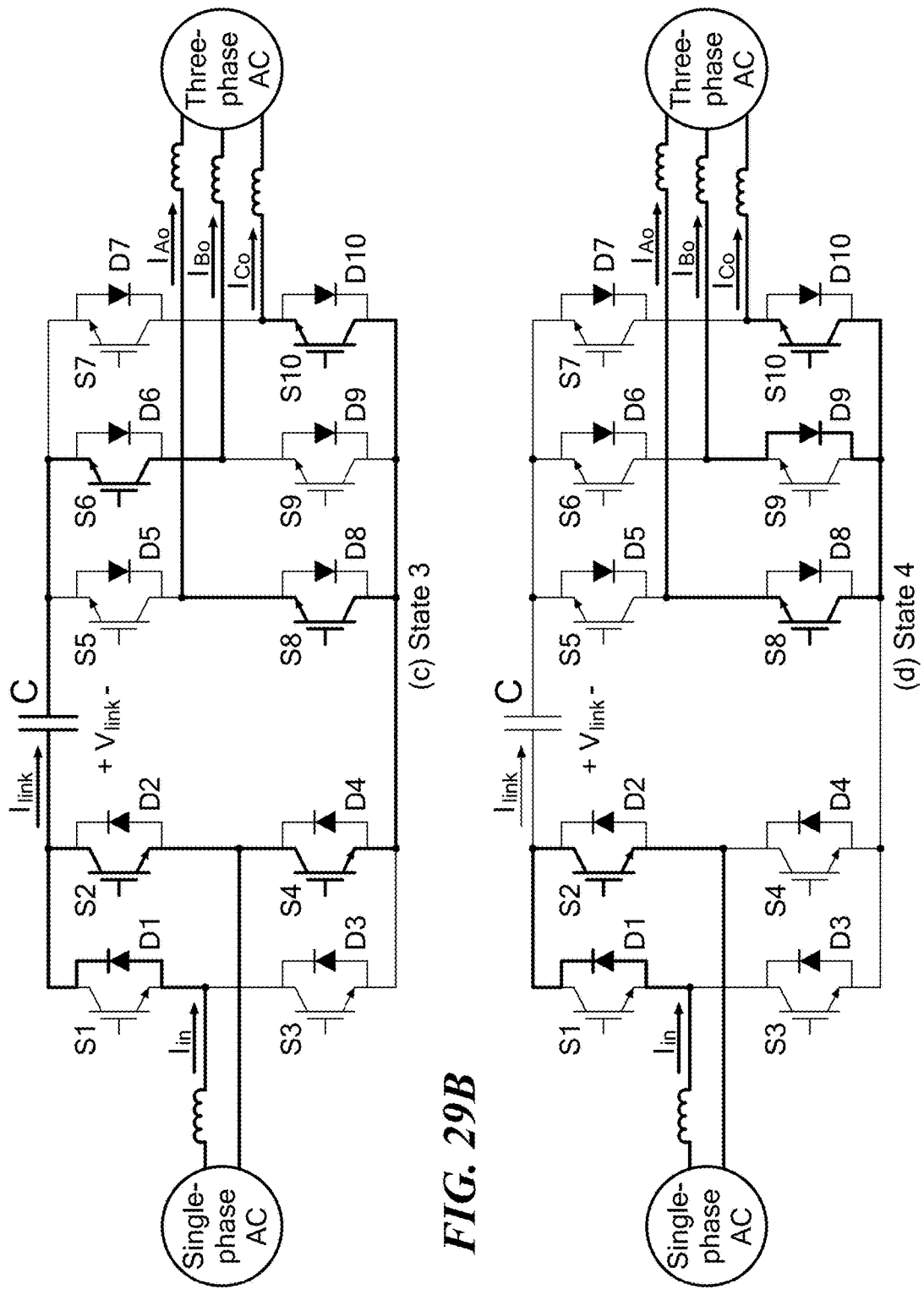
Figure 30A:
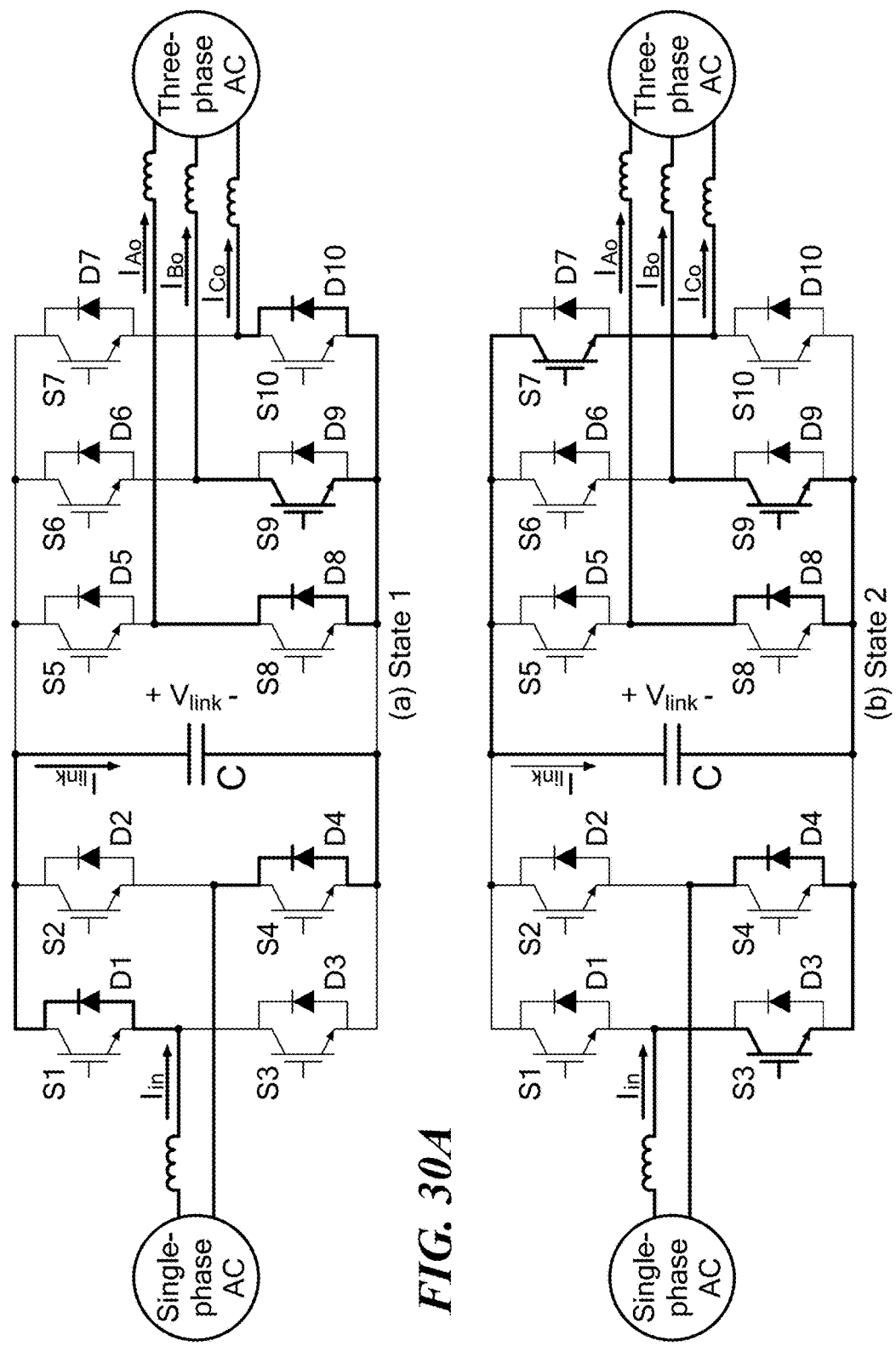
Figure 30B:
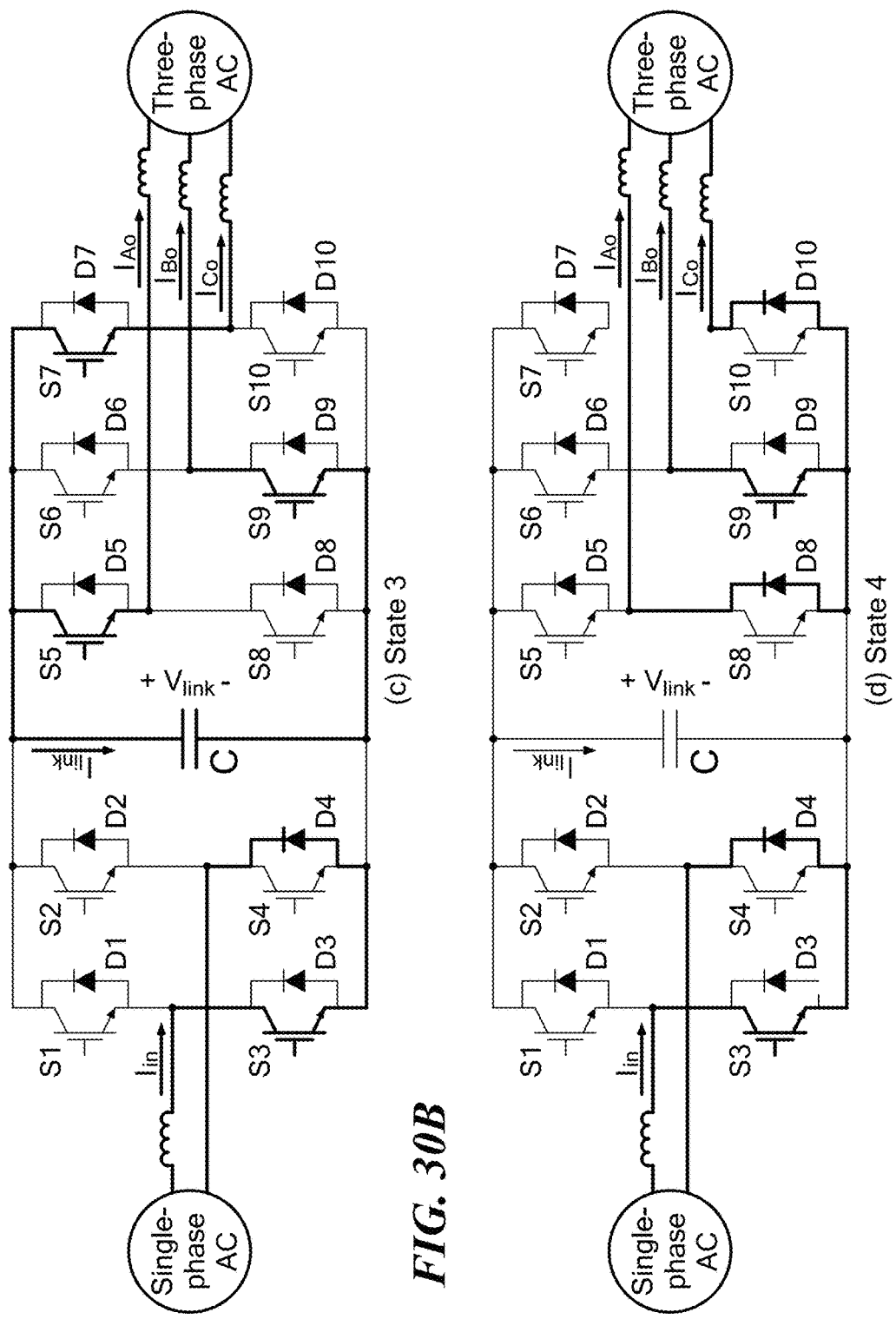
Figure 31:
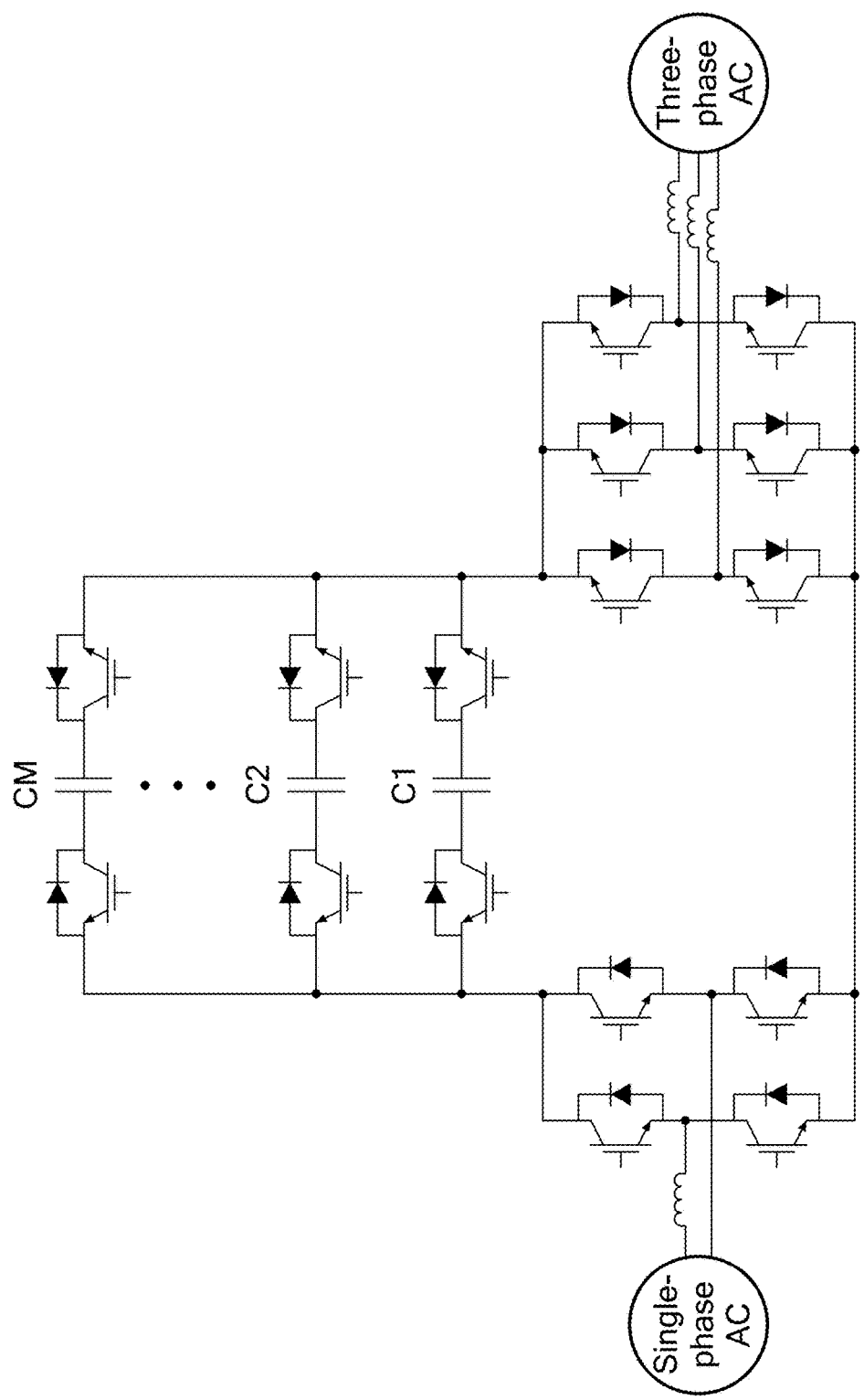
Figure 32:
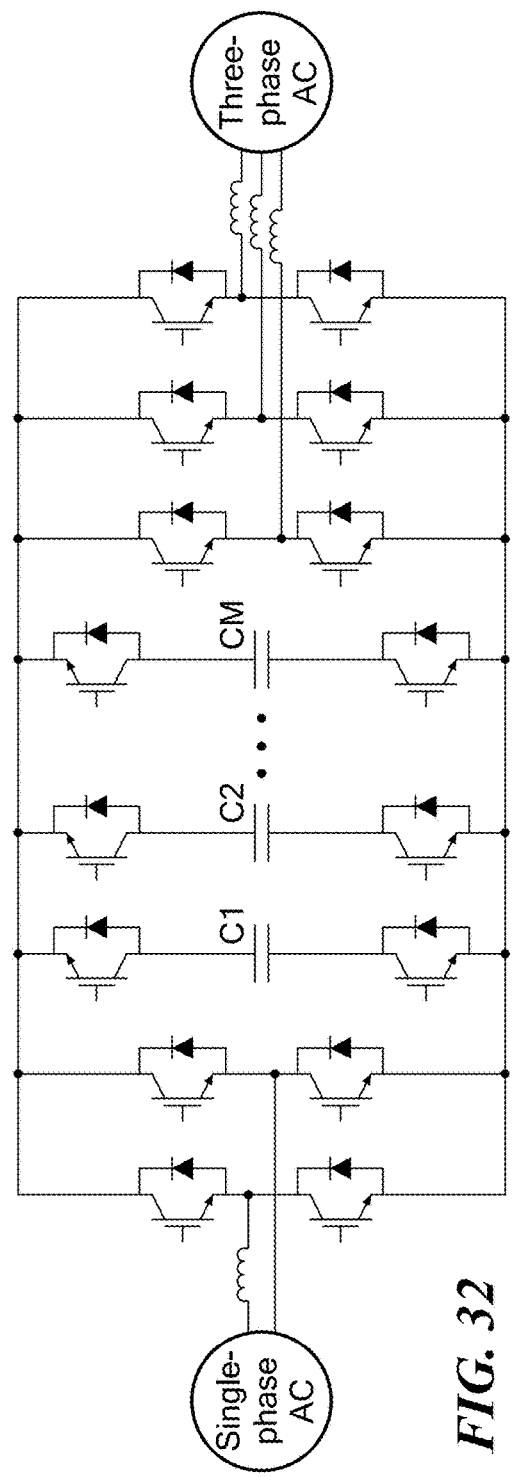
Figure 33:
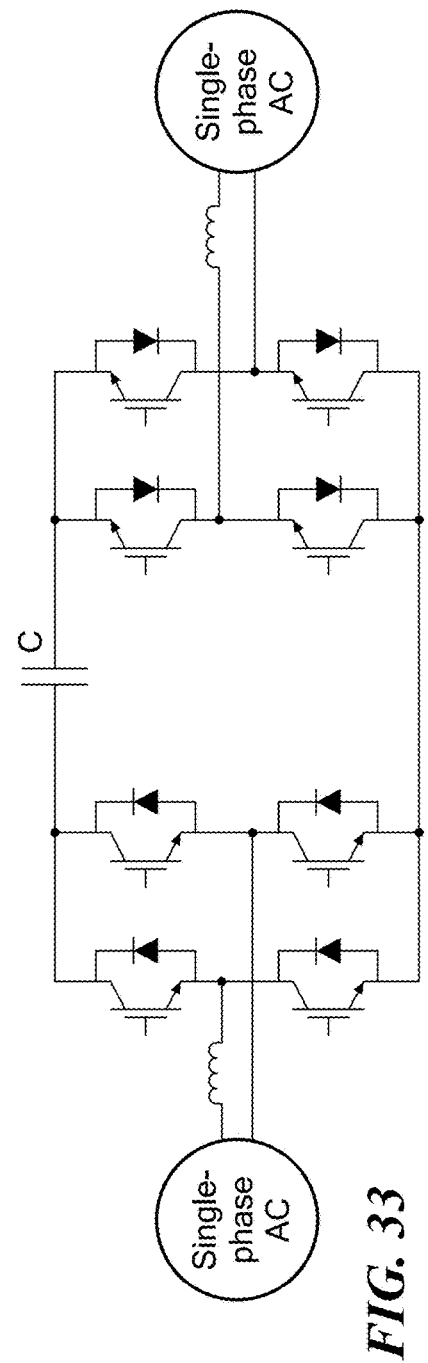
Figure 36:
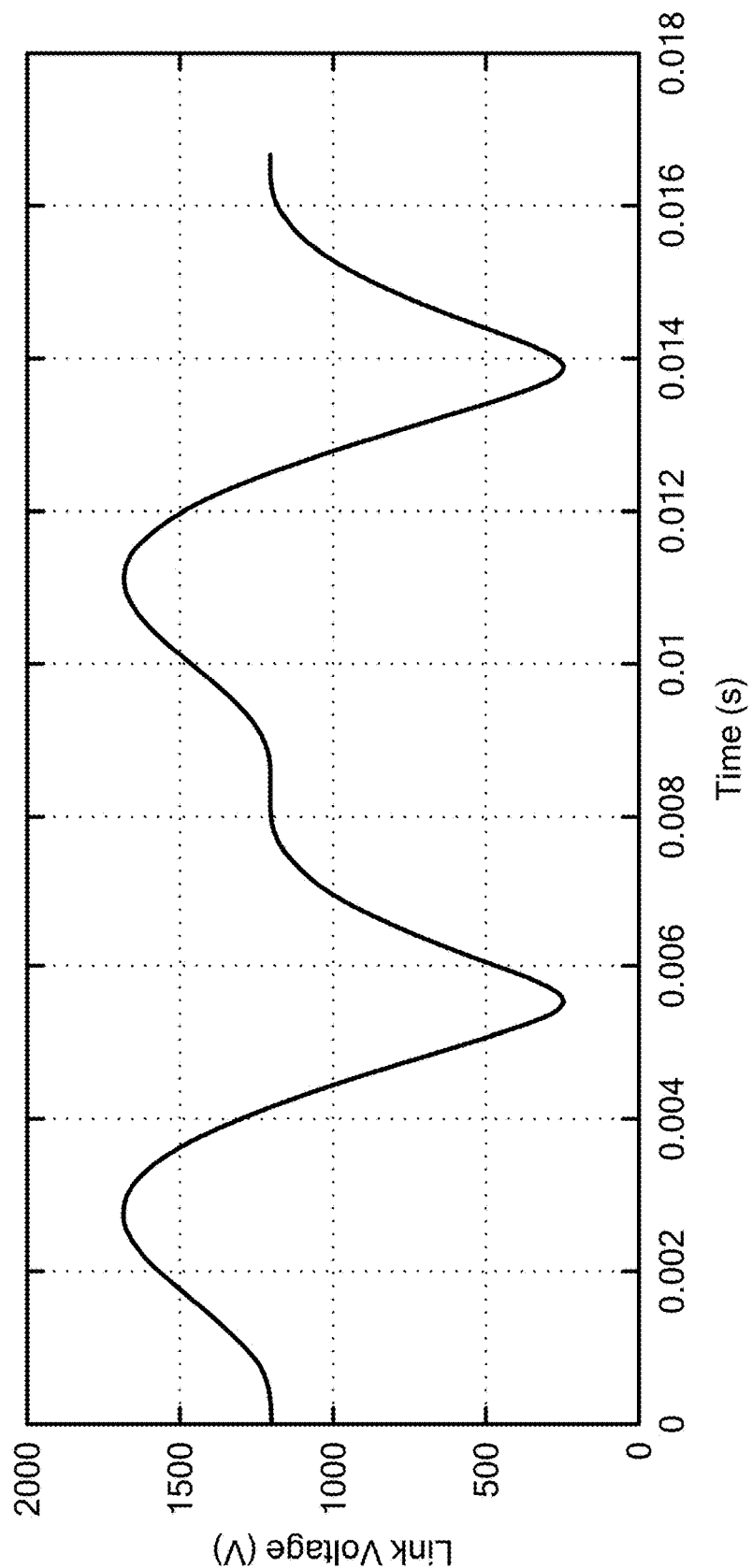
Figure 37:
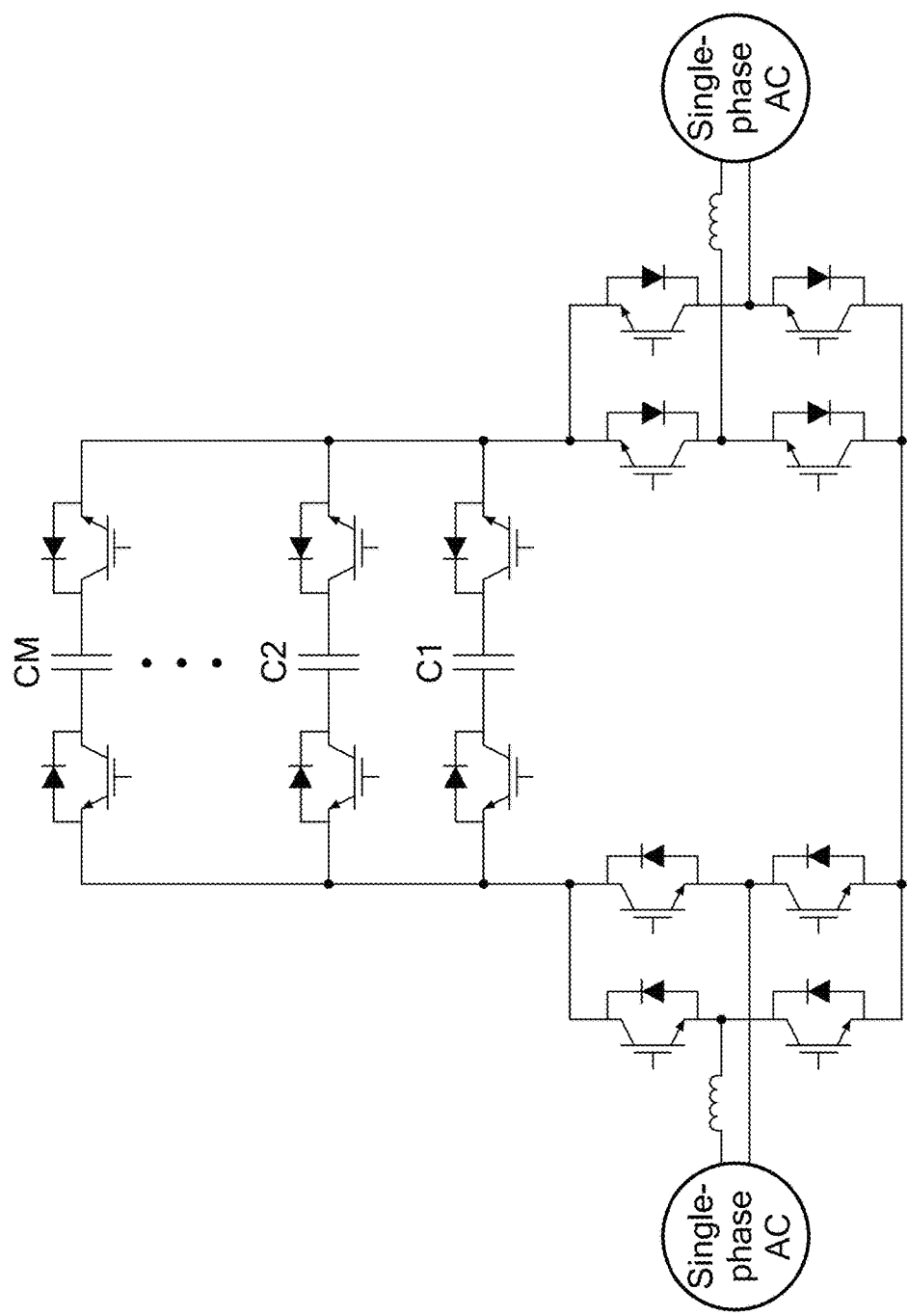
Figure 38:
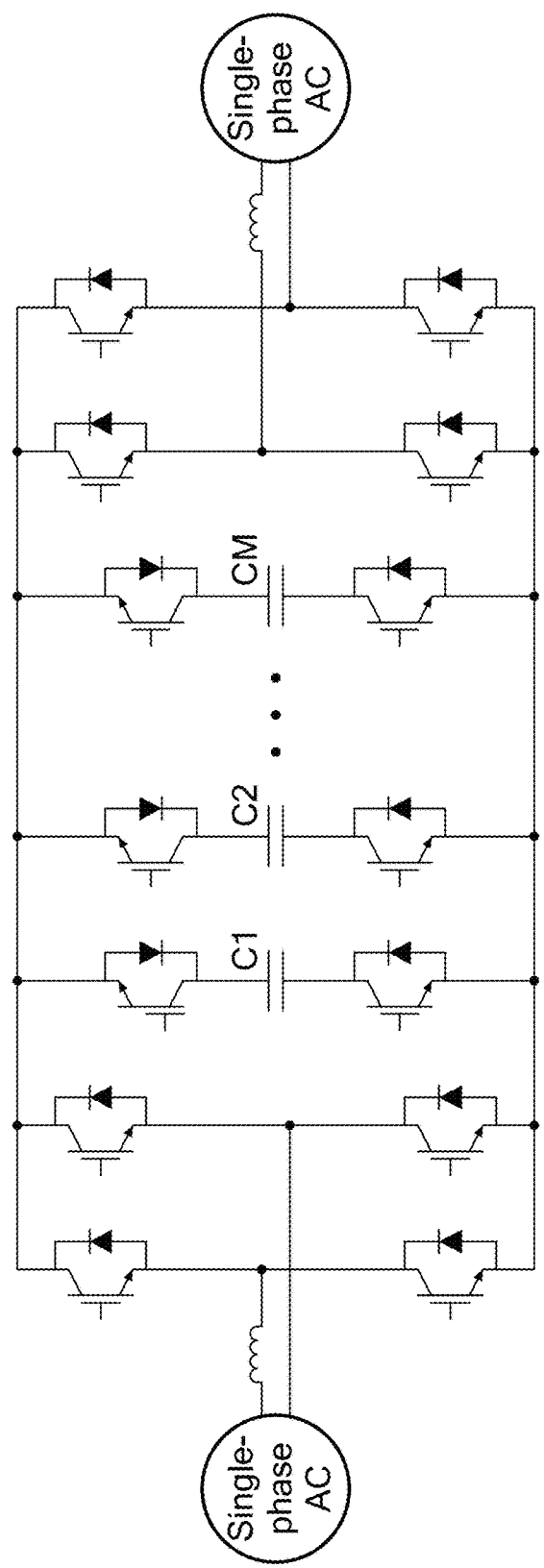
Figure 39:
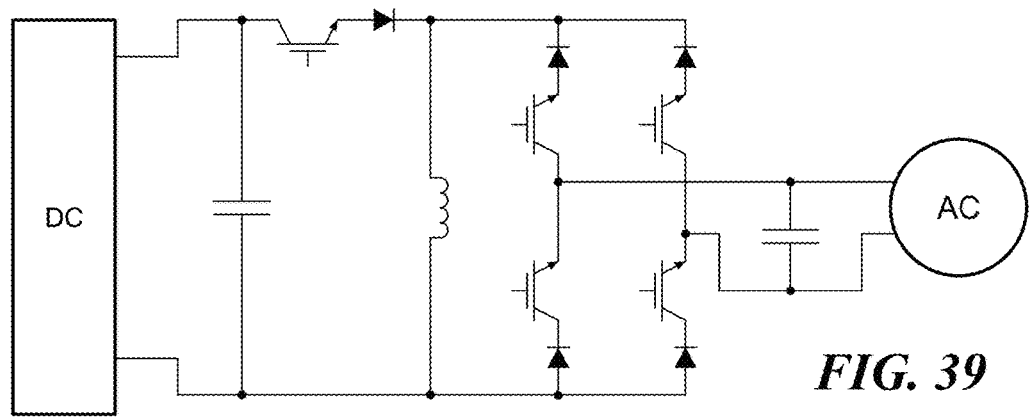
Figure 40:
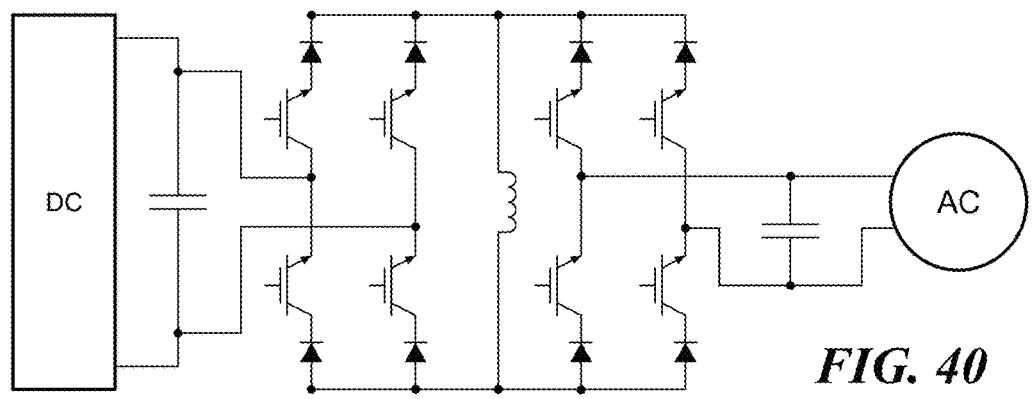
Figure 41:
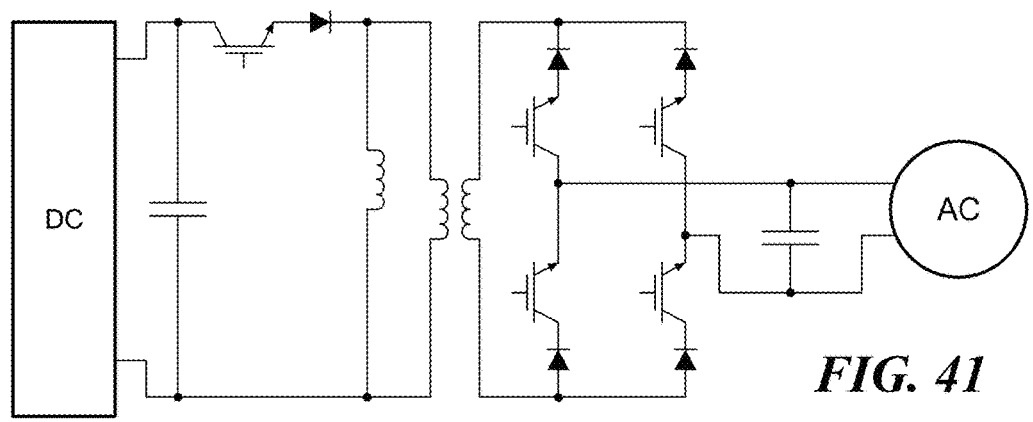
Figure 42:
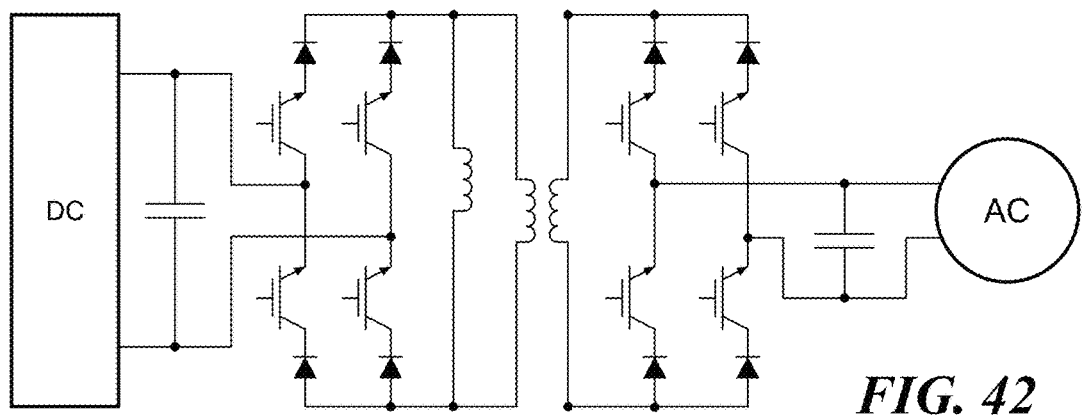
Figure 43:
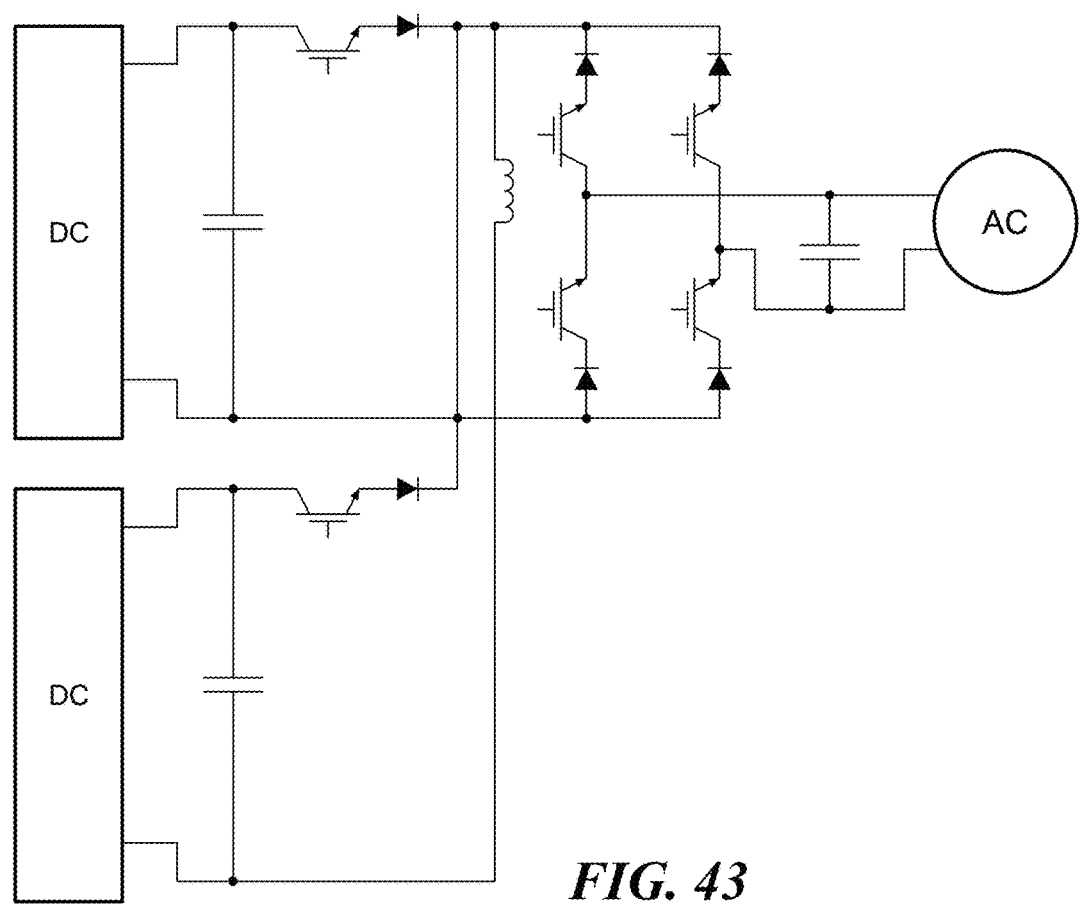
Figure 44:
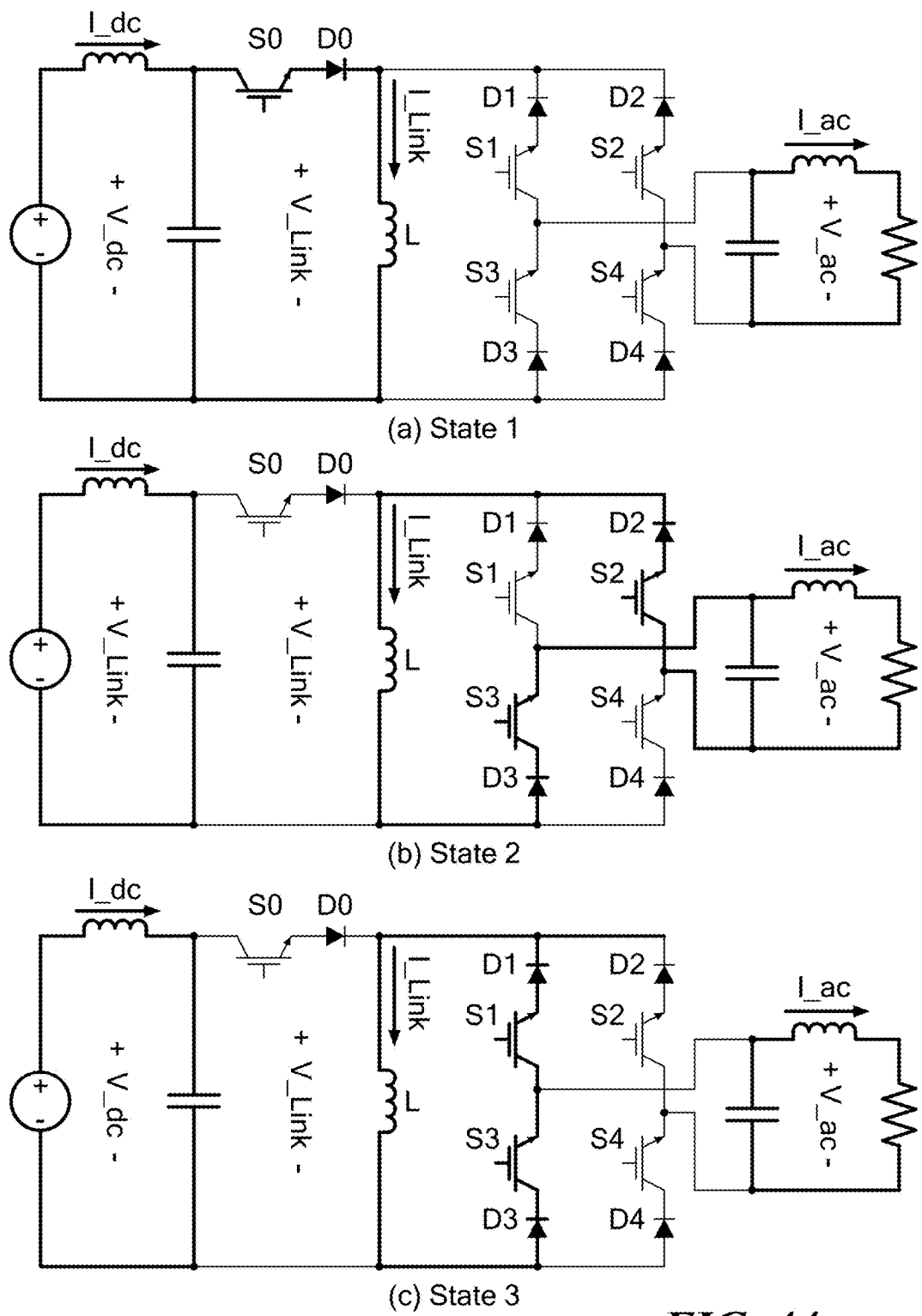
Figure 45:
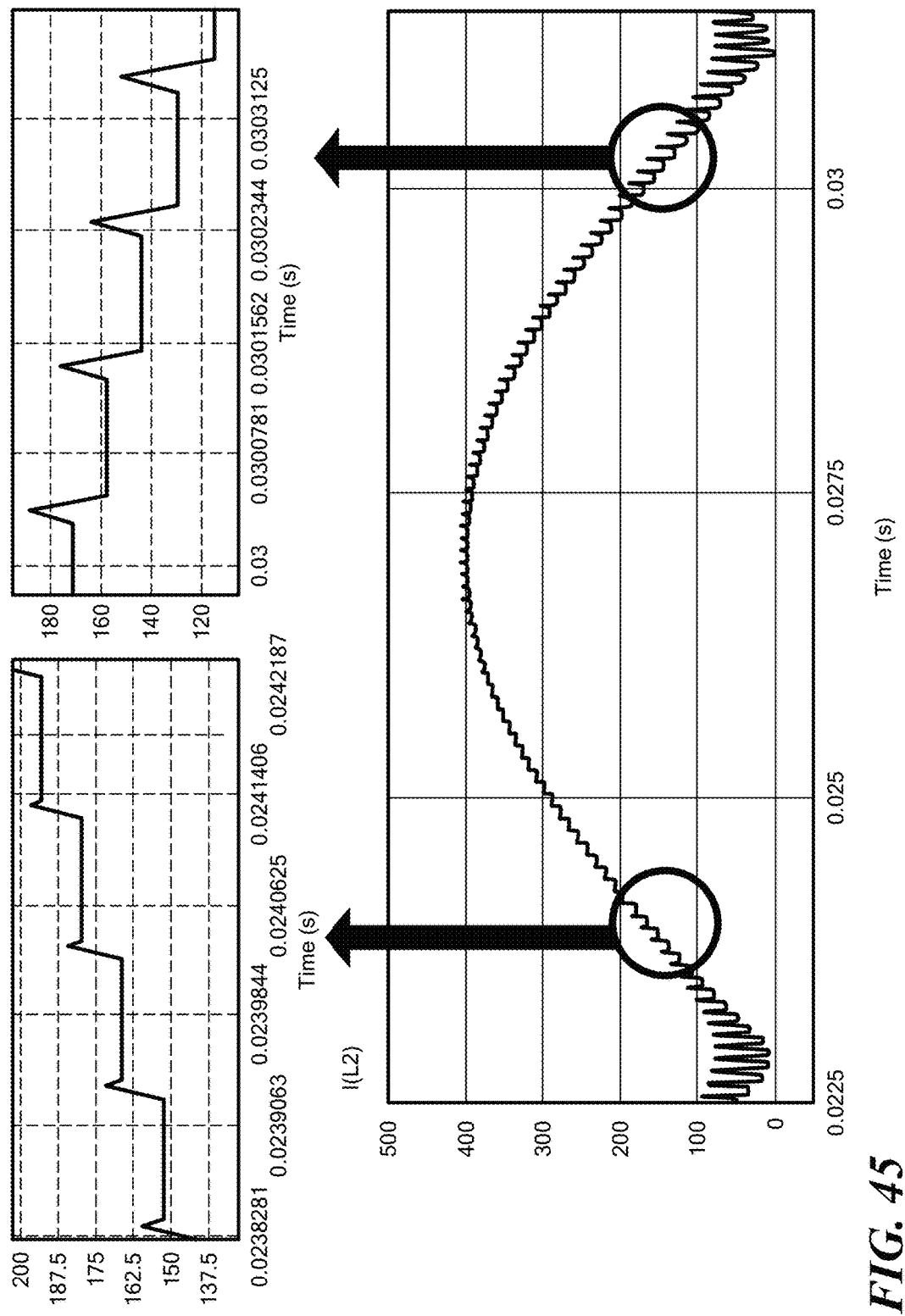
Figure 46:
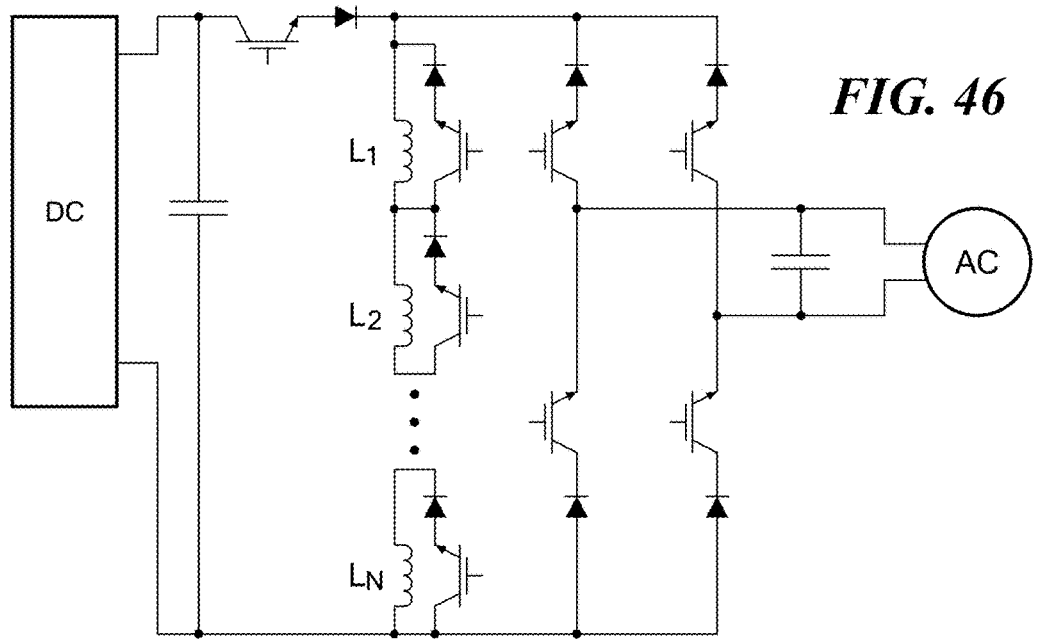
Figure 47:
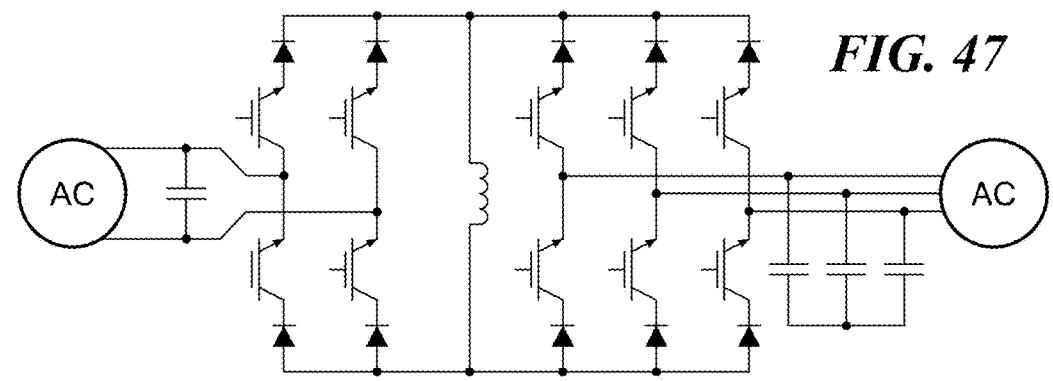
Figure 48:
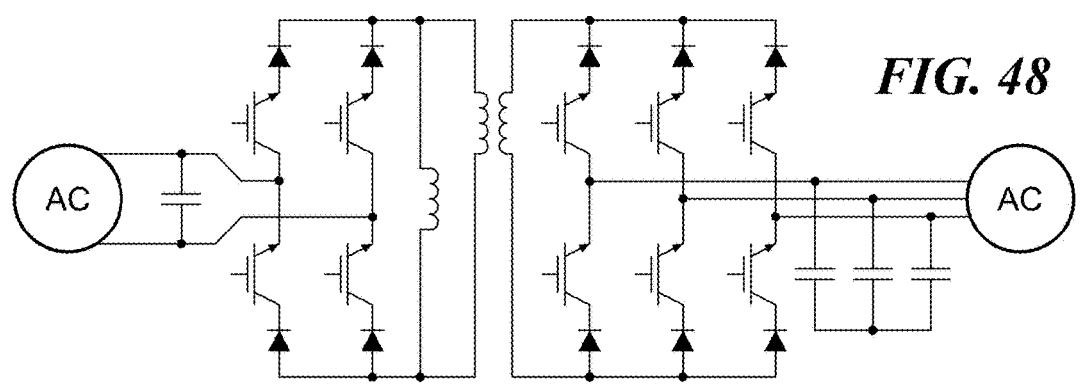
Figure 49A:
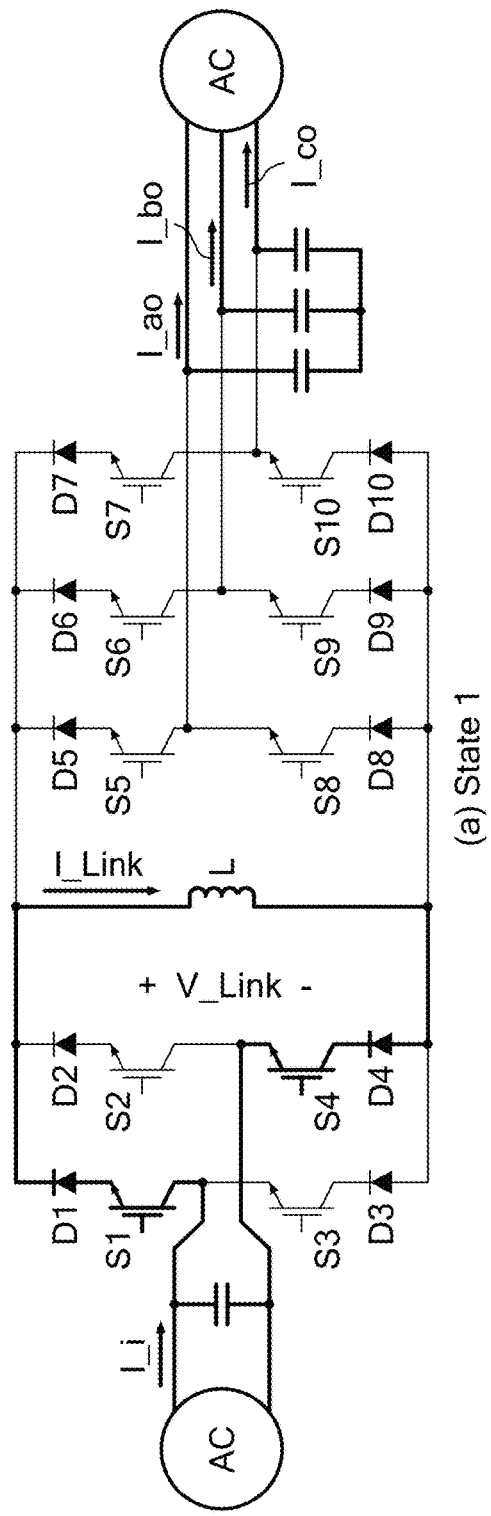
Figure 49A:
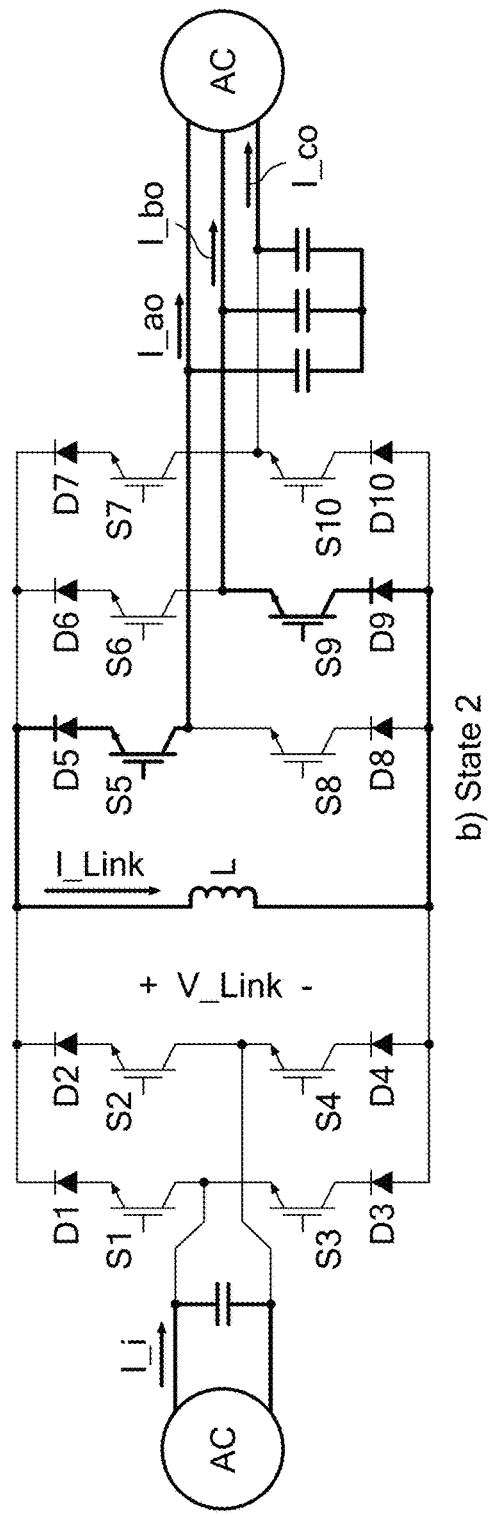
Figure 49B:
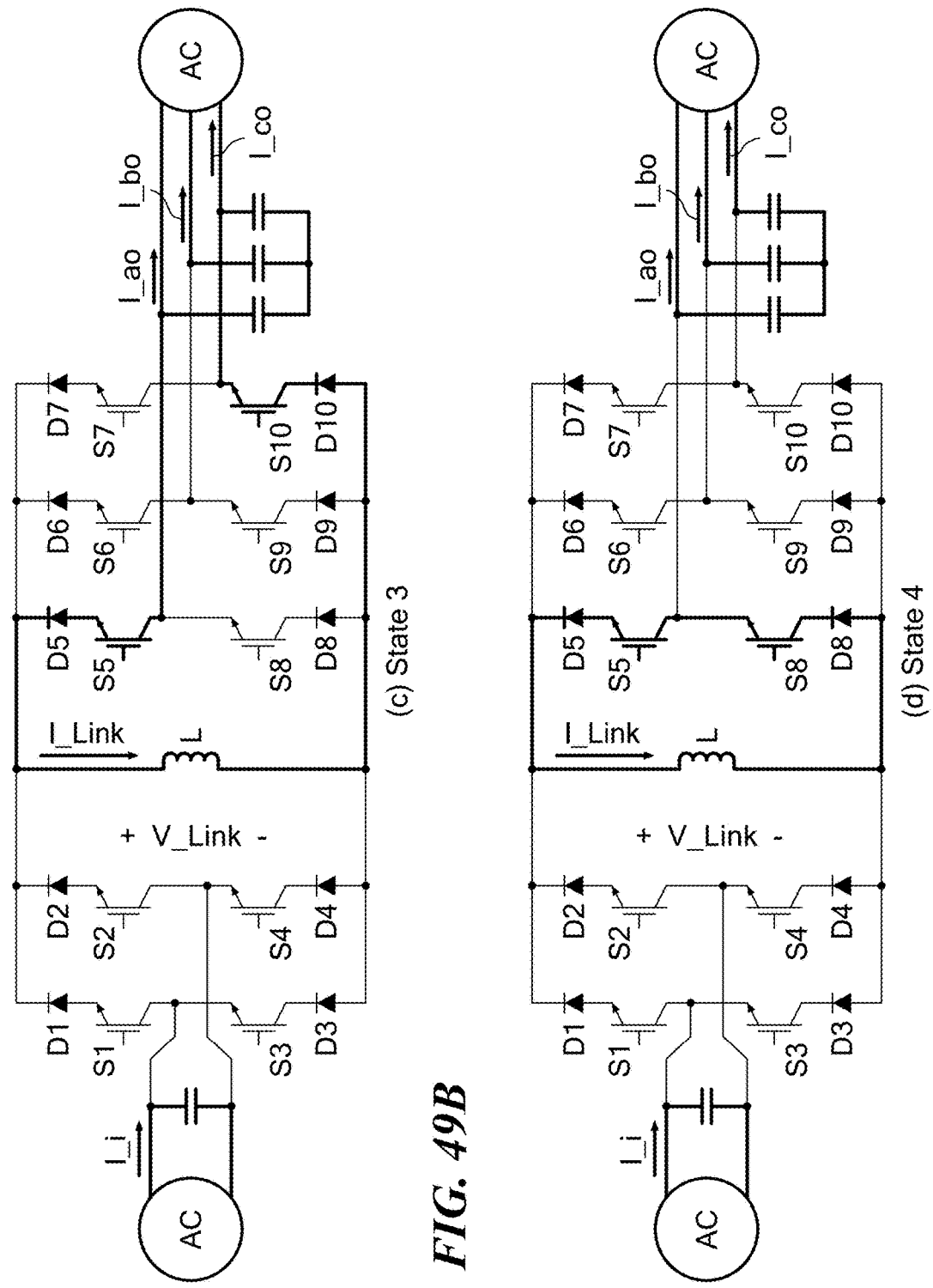
Figure 50:
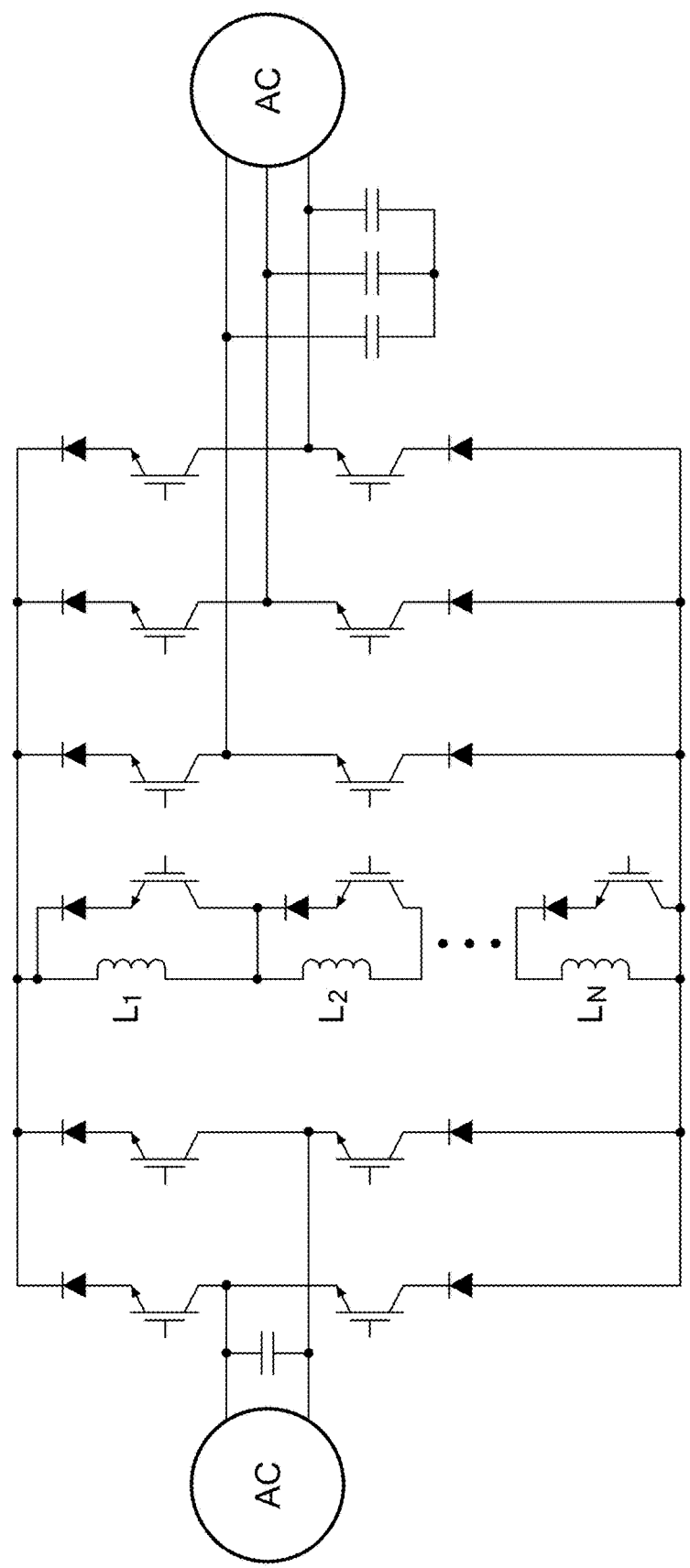
Figure 51:
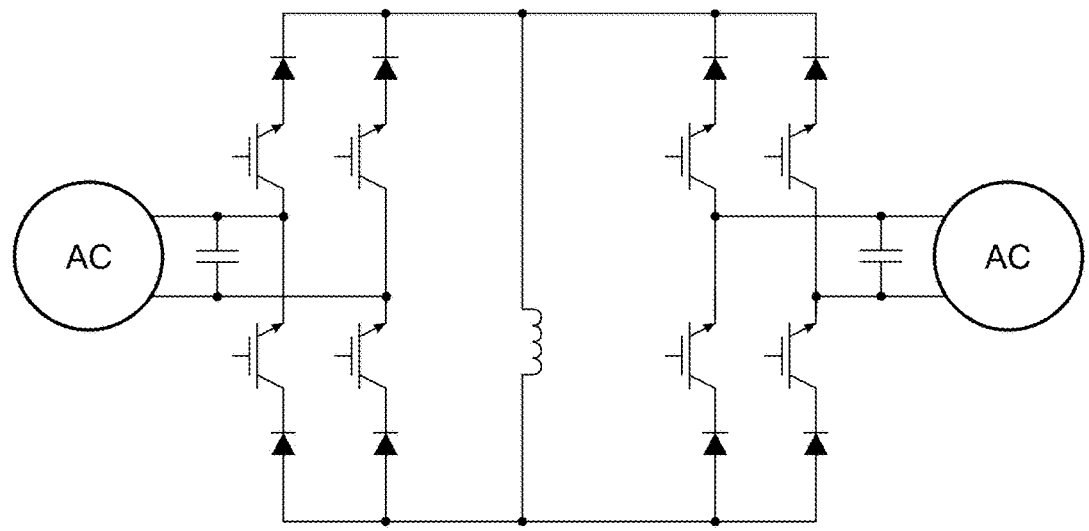
Figure 52:
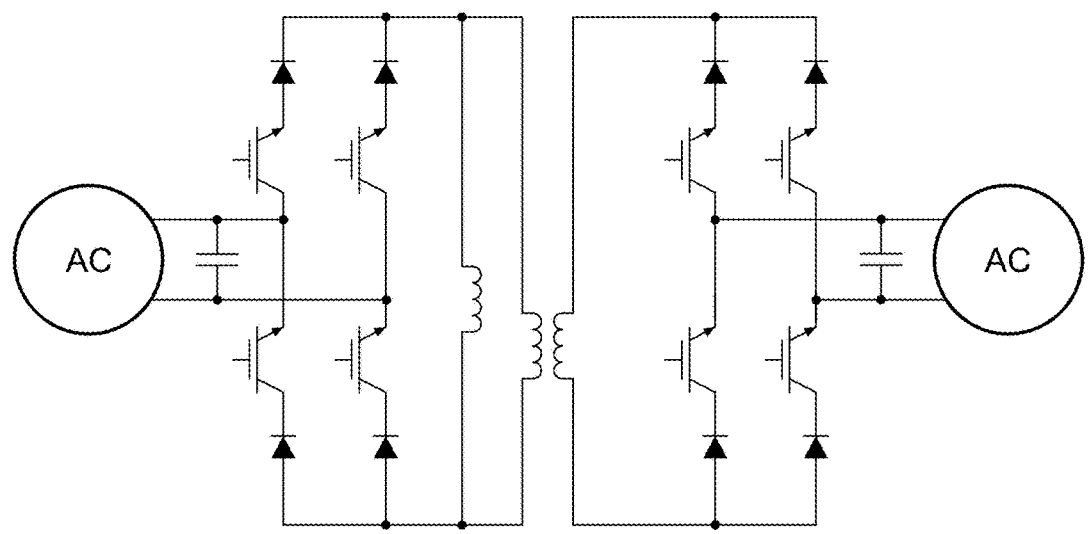
Figure 53:
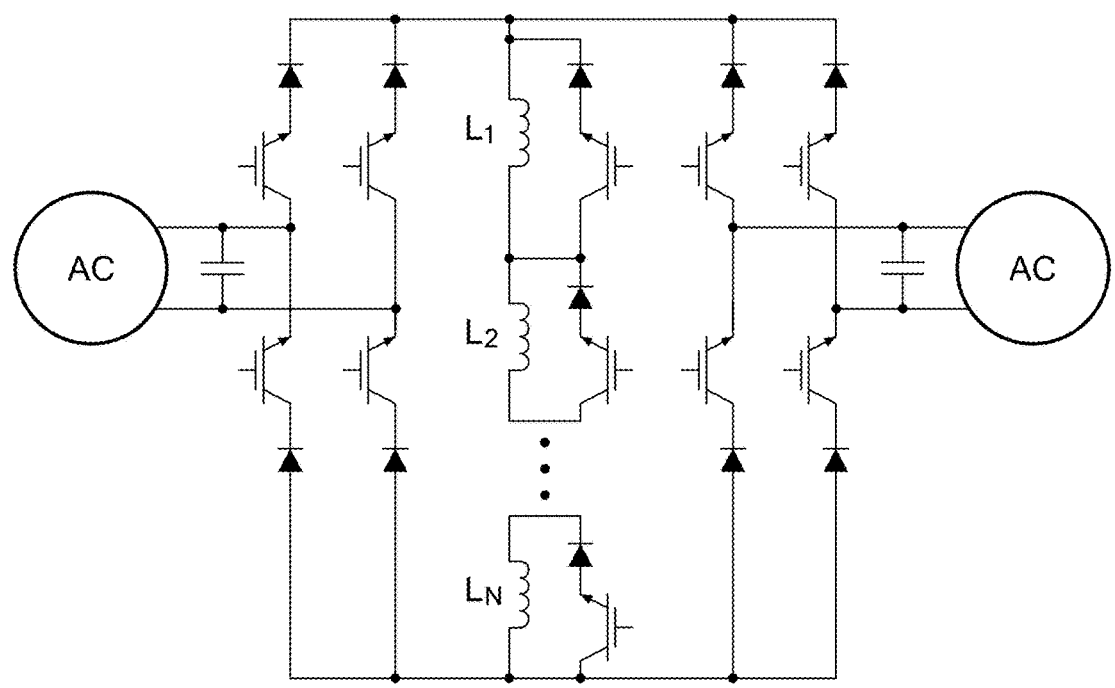

FIG. 26 is a circuit diagram of an embodiment of a bidirectional single-phase ac-to-three-phase ac capacitive link converter with series link (single-phase ac⇔three-phase ac);

FIG. 27 is a circuit diagram of an embodiment of a bidirectional single-phase ac-to-three-phase ac capacitive link converter with parallel link (single-phase ac⇔three-phase ac);

FIG. 28 is a circuit diagram of an embodiment of a bidirectional single-phase ac-to-three-phase ac capacitive link converter with galvanic isolation (single-phase ac⇔three-phase ac);

FIG. 29 illustrates in panels (a), (b), (c), and (d) circuit diagrams illustrating principles of the operation of a bidirectional single-phase ac-to-three-phase ac capacitive link converter with series link when power flows from single-phase ac side to three-phase ac side;

FIG. 30 illustrates in panels (a), (b), (c), and (d) circuit diagrams illustrating principles of the operation of a bidirectional single-phase ac-to-three-phase ac capacitive link converter with parallel link when power flows from single-phase ac side to three-phase ac side;

FIG. 31 is a circuit diagram illustrating an embodiment of a bidirectional single-phase ac to three-phase ac capacitive link converter using a series capacitor network (single-phase ac ⇔ three-phase ac);

FIG. 32 is a circuit diagram illustrating an embodiment of a bidirectional single-phase ac to three-phase ac capacitive link converter using a parallel capacitor network (single-phase ac ⇔ three-phase ac);

FIG. 33 is a circuit diagram illustrating an embodiment of a bidirectional single-phase ac to single-phase ac capacitive link converter with a series link (single-phase ac ⇔ single-phase ac);

FIG. 34 is a circuit diagram illustrating an embodiment of a bidirectional single-phase ac to single-phase ac capacitive link converter with a parallel link (single-phase ac ⇔ single-phase ac);

FIG. 35 is a circuit diagram illustrating an embodiment of a bidirectional single-phase ac to single-phase ac capacitive link converter with galvanic isolation (single-phase ac ⇔ single-phase ac);

FIG. 36 is a graph illustrating low frequency component of the link voltage in a single-phase ac to single-phase ac capacitive link converter for a 1 kW system with $f_i$=60 Hz and $f_0$=120 Hz;

FIG. 37 is a circuit diagram illustrating an embodiment of a bidirectional single-phase ac to single-phase ac capacitive link converter using a series capacitor network (single-phase ac ⇔ single-phase ac);

FIG. 38 is a circuit diagram illustrating an embodiment of a bidirectional single-phase ac to single-phase ac capacitive link converter using a parallel capacitor network (single-phase ac ⇔ single-phase ac);

FIG. 39 is a circuit diagram illustrating an embodiment of a bidirectional single-phase inductive-link inverter for positive dc-side current (dc<=>single-phase ac);

FIG. 40 is a circuit diagram illustrating an embodiment of a bidirectional single-phase inductive-link inverter for positive and negative dc-side currents (dc ⇔ single-phase ac);

FIG. 41 is a circuit diagram illustrating an embodiment of a bidirectional single-phase inductive-link inverter for positive dc-side current with galvanic isolation (dc<=>single-phase ac);

FIG. 42 is a circuit diagram illustrating an embodiment of a bidirectional single-phase inductive-link inverter for positive and negative dc-side currents with galvanic isolation (dc ⇔ single-phase ac);

FIG. 43 is a circuit diagram illustrating an embodiment of a multi-port single-phase inductive-link inverter;

FIG. 44 illustrates in panels (a), (b), and (c) circuit diagrams illustrating principles of operation of a single-phase inductive-link inverter;

FIG. 45 is a graph illustrating link inductor current in a single-phase inductive-link inverter;

FIG. 46 is a circuit diagram illustrating an embodiment of a single-phase inductive-link inverter with inductor network;

FIG. 47 is a circuit diagram illustrating an embodiment of a bidirectional single-phase ac to three-phase ac inductive-link converter (single-phase ac ⇔ three-phase ac);

FIG. 48 is a circuit diagram illustrating an embodiment of a bidirectional single-phase ac to three-phase ac inductive-link converter with galvanic isolation (single-phase ac ⇔ three-phase ac);

FIG. 49 illustrates in panels (a), (b), (c), and (d) circuit diagrams illustrating principles of operation of a bidirectional single-phase ac to three-phase ac inductive-link converter;

FIG. 50 is a circuit diagram illustrating an embodiment of a bidirectional single-phase ac to three-phase ac inductive-link converter with inductor network (single-phase ac ⇔ three-phase ac);

FIG. 51 is a circuit diagram illustrating an embodiment of a bidirectional single-phase ac to single-phase ac inductive-link converter (single-phase ac ⇔ single-phase ac);

FIG. 52 is a circuit diagram illustrating an embodiment of a bidirectional single-phase ac to single-phase ac inductive-link converter with galvanic isolation (single-phase ac ⇔ single-phase ac);

FIG. 53 is a circuit diagram illustrating an embodiment of a bidirectional single-phase ac to single-phase ac inductive-link converter with inductor network (single-phase ac ⇔ single-phase ac).

DETAILED DESCRIPTION OF THE INVENTION

This application incorporates by reference the entire disclosure of U.S. Provisional Application No. 62/338,103, filed on May 18, 2016, entitled "Sparse Capacitive Link Power Converter and Control Method Therefor."

The invention relates to embodiments of power conversion devices having configurations as well as control schemes that regulate input and output currents and manage input and output power mismatches. Some embodiments are operable to suppress dc-side double frequency harmonic components. Some embodiments can operate without using electrolytic capacitors.

In some embodiments, a power conversion device includes input circuitry configured to be coupled to a power source or load, and having at least one switching device or diode. An output switch bridge is configured to be coupled to a load or power source, the output switch bridge having at least four controllable switching devices arranged in a bridge configuration to control current output. A link stage includes at least one reactive component configured for alternating current (AC) operation and is operative to manage input and output of power mismatch between the input circuitry and the output switch bridge.

In some embodiments, a power conversion device employs an additional switch, operates in discontinuous conduction mode (DCM), and uses fixed switching frequency. These features allow this inverter to suppress the double frequency harmonic. In some embodiments, the power conversion device includes an input switch bridge configured to be coupled to a direct current (DC) power source. The input switch bridge includes at least one switching device controllable to regulate an input DC current with suppression of a double frequency harmonic component. A link stage includes at least one reactive component configured for alternating current (AC) operation. The device includes an output switch bridge configured to be coupled to an AC load. The output switch bridge includes at least four controllable switching devices arranged in a bridge configuration to control current output to the load.

1. Capacitive-Link Converters

1.1 Capacitive-Link Inverter (dc ⇔ Single-Phase ac)

Figure 1:
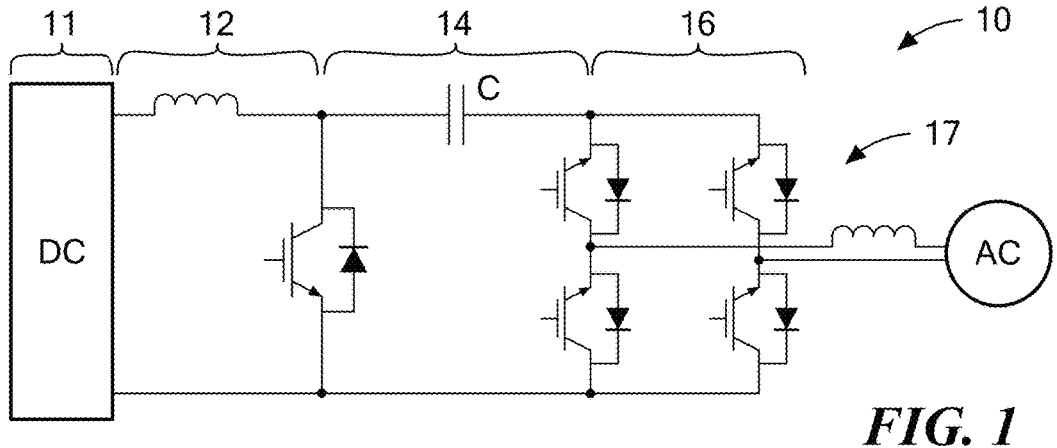
FIG. 1 is a circuit diagram of an embodiment of a bidirectional single-phase capacitive link inverter with series link (dc ⇔ single-phase ac)
Figure 2:
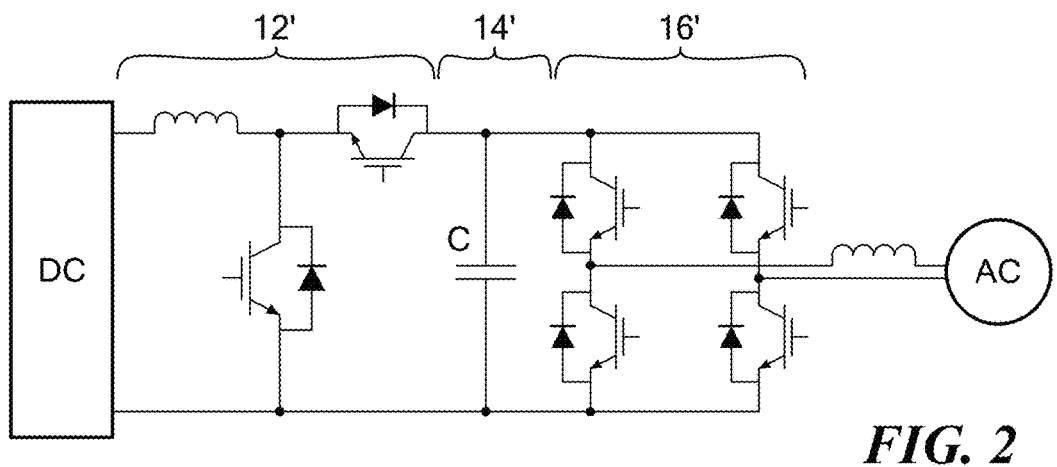
FIG. 2 is a circuit diagram of an embodiment of a bidirectional single-phase capacitive link inverter with parallel link (dc⇔single-phase ac)
Figure 3:
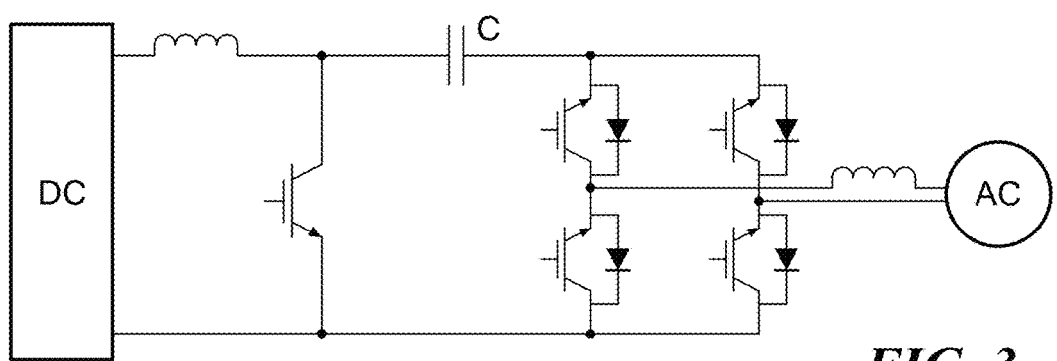
FIG. 3 is a circuit diagram of an embodiment of a dc-to-single phase ac capacitive link converter with series link (dc=>single-phase ac)
Figure 4:
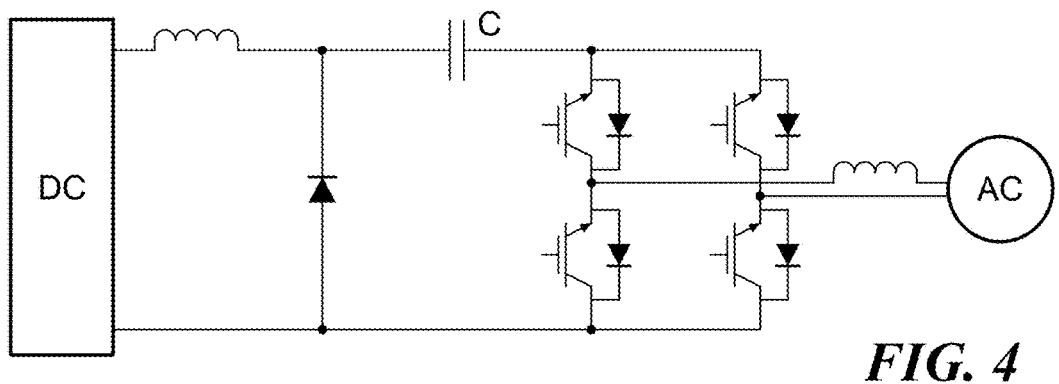
FIG. 4 is a circuit diagram of an embodiment of a single-phase ac-to-dc capacitive link converter with series link (single-phase ac=>dc)
Figure 5:
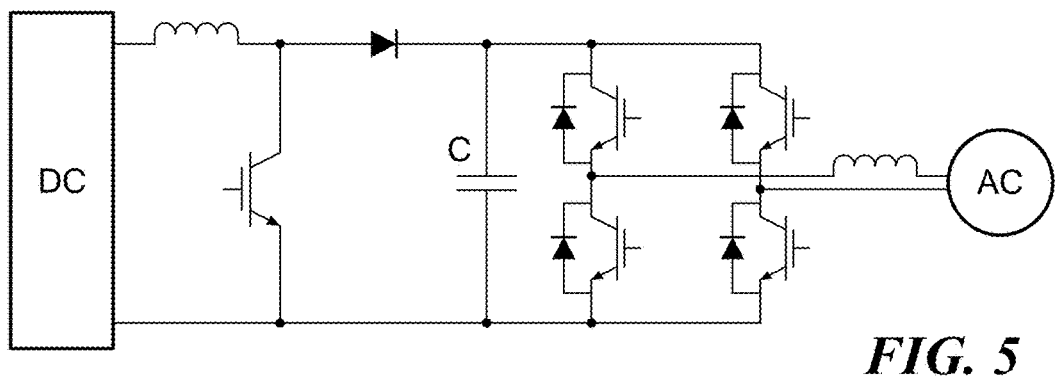
FIG. 5 is a circuit diagram of an embodiment of a dc-to-single phase ac capacitive link converter with parallel link (dc=>single-phase ac)
Figure 6:
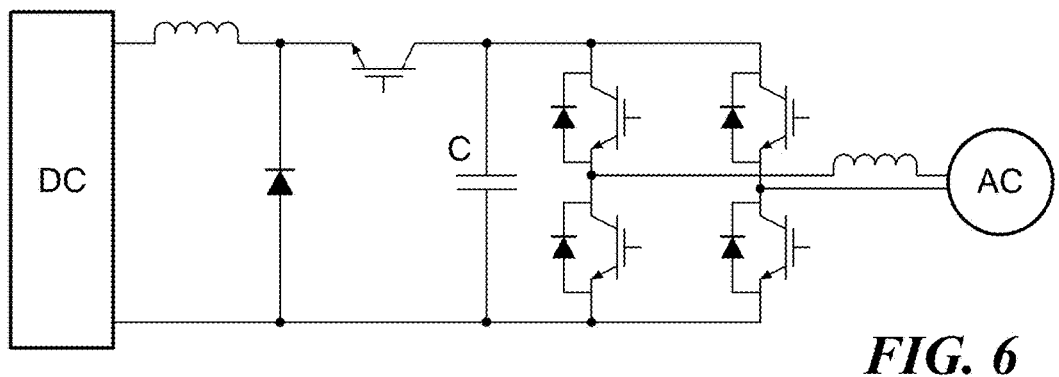
FIG. 6 is a circuit diagram of an embodiment of a single-phase ac-to-dc capacitive link converter with parallel link (single-phase ac=>dc)

FIG. 1 shows an embodiment of a capacitive-link inverter 10 having a first topology that is used for interfacing a dc source (or load) 11 and a single-phase ac load (or source) 17. This bidirectional inverter is single-stage, and transfers power from input towards output through the link capacitor (C) 14, which is placed in series with the input switch 12 and the output switch bridge 16. As shown in FIG. 2, the link capacitor 14' can also be placed in parallel with the input switch 12' and output switch-bridge 16' while changing the polarity of the output-side switches. In FIGS. 1 and 2 the dc-side voltage is positive (top terminal has positive voltage); however, the dc-side current can be positive (from left to right) or negative (from right to left). Depending on the polarity of the dc-side current the power can flow from dc-side towards ac-side or from ac-side towards dc side. For unidirectional power flow from dc-side to ac-side or from ac-side to dc-side, a switch and/or a diode can be eliminated from each of these topologies, as shown in FIGS. 3-6.

Figure 7:
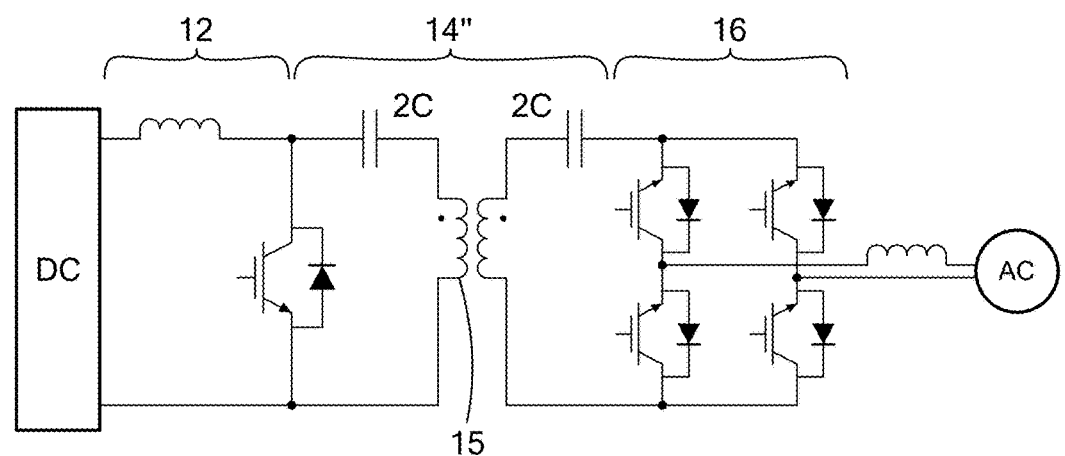
FIG. 7 is a circuit diagram of an embodiment of a bidirectional single-phase capacitive link inverter with galvanic isolation.
Figure 8:
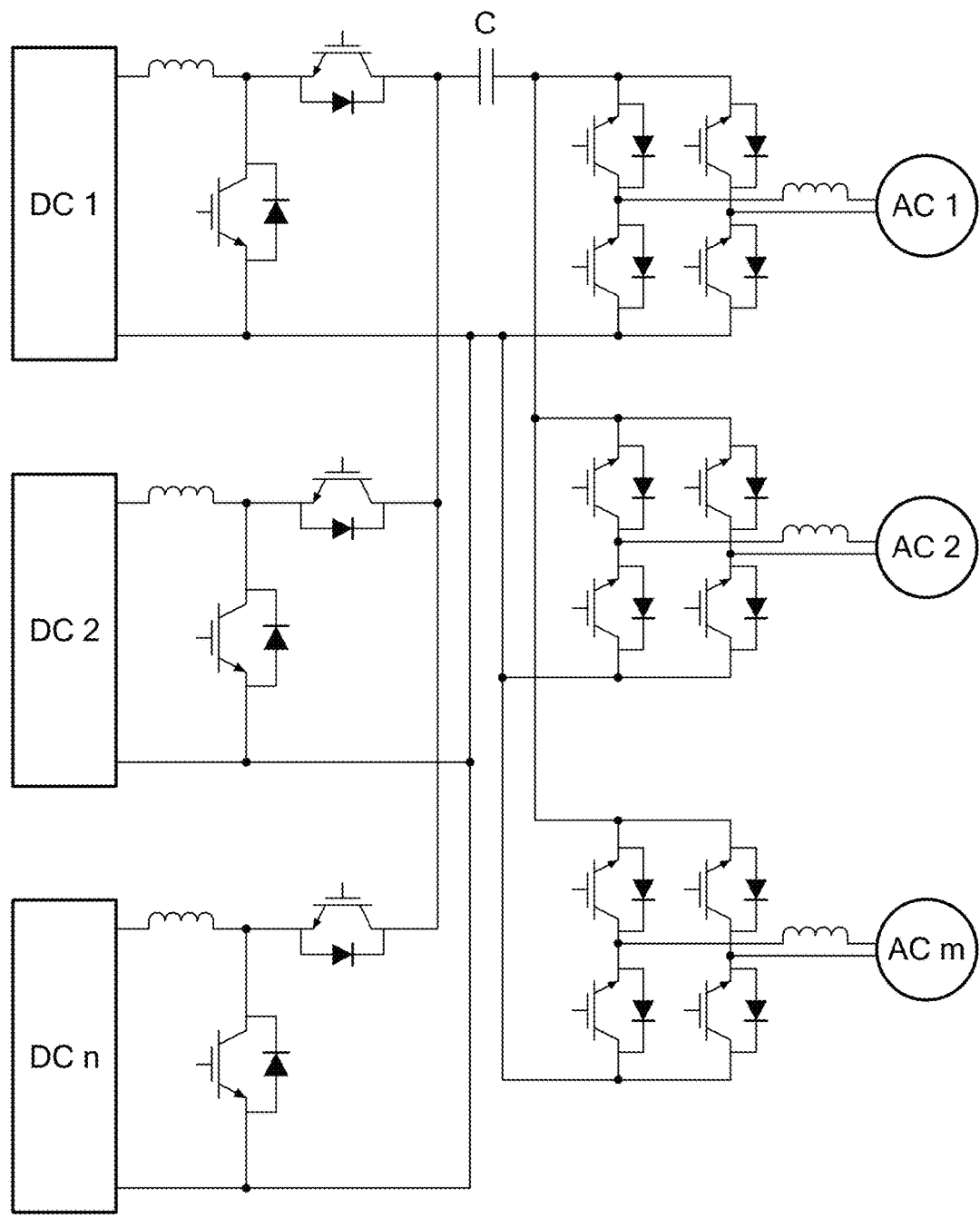
FIG. 8 is a circuit diagram of an embodiment of a multi-port capacitive link-converter with series link.
Figure 9:
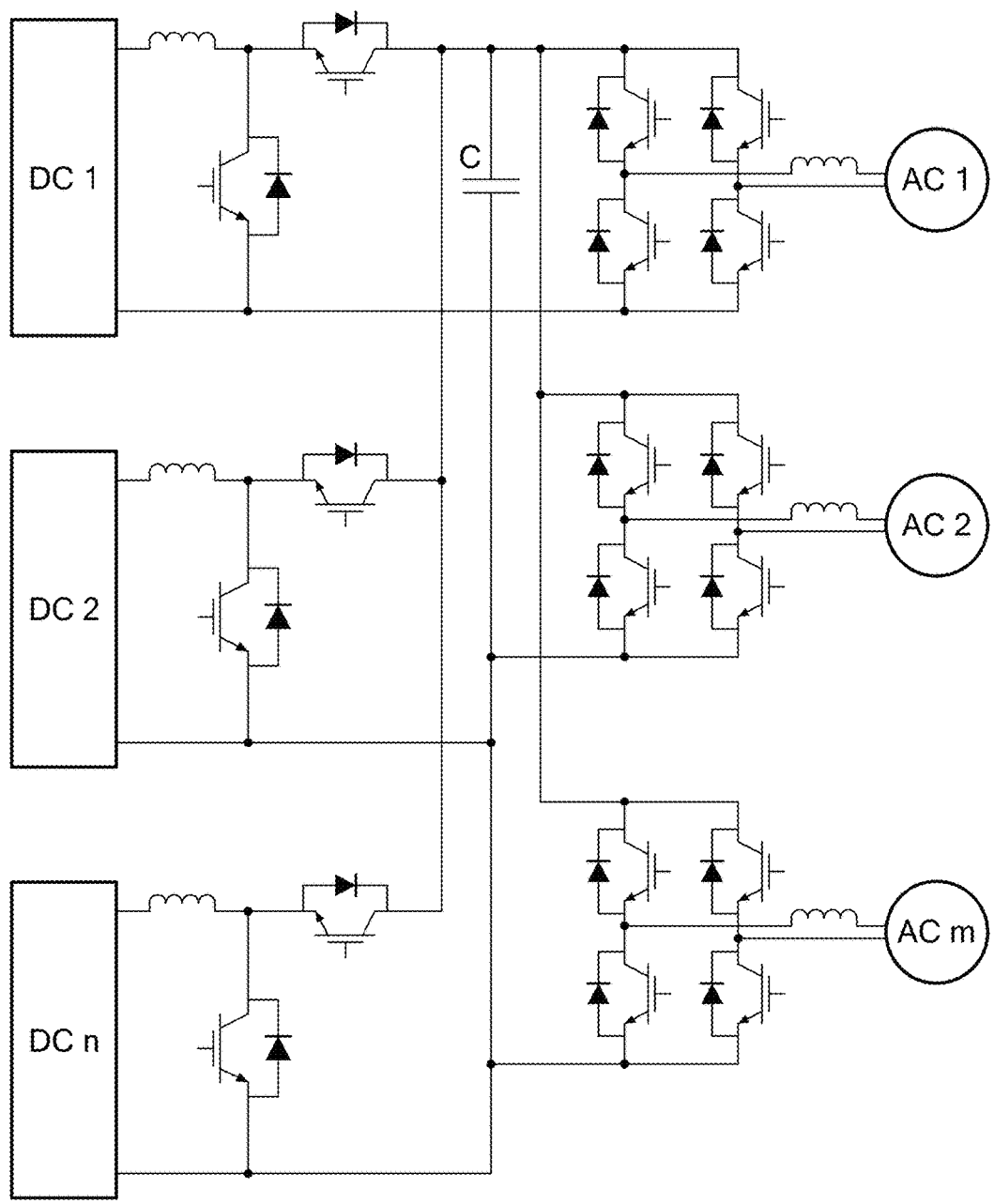
FIG. 9 is a circuit diagram of an embodiment of a multi-port capacitive link-converter with parallel link.

In some embodiments; of converters, galvanic isolation can be provided by a high frequency transformer 15 added to the link 14", as shown in FIG. 7. In some embodiments, this inverter is capable of interfacing several sources (DC1, DC2, DCn) and loads (AC1, AC2, . . . ACm) as depicted in FIGS. 8 and 9.

Figure 10:
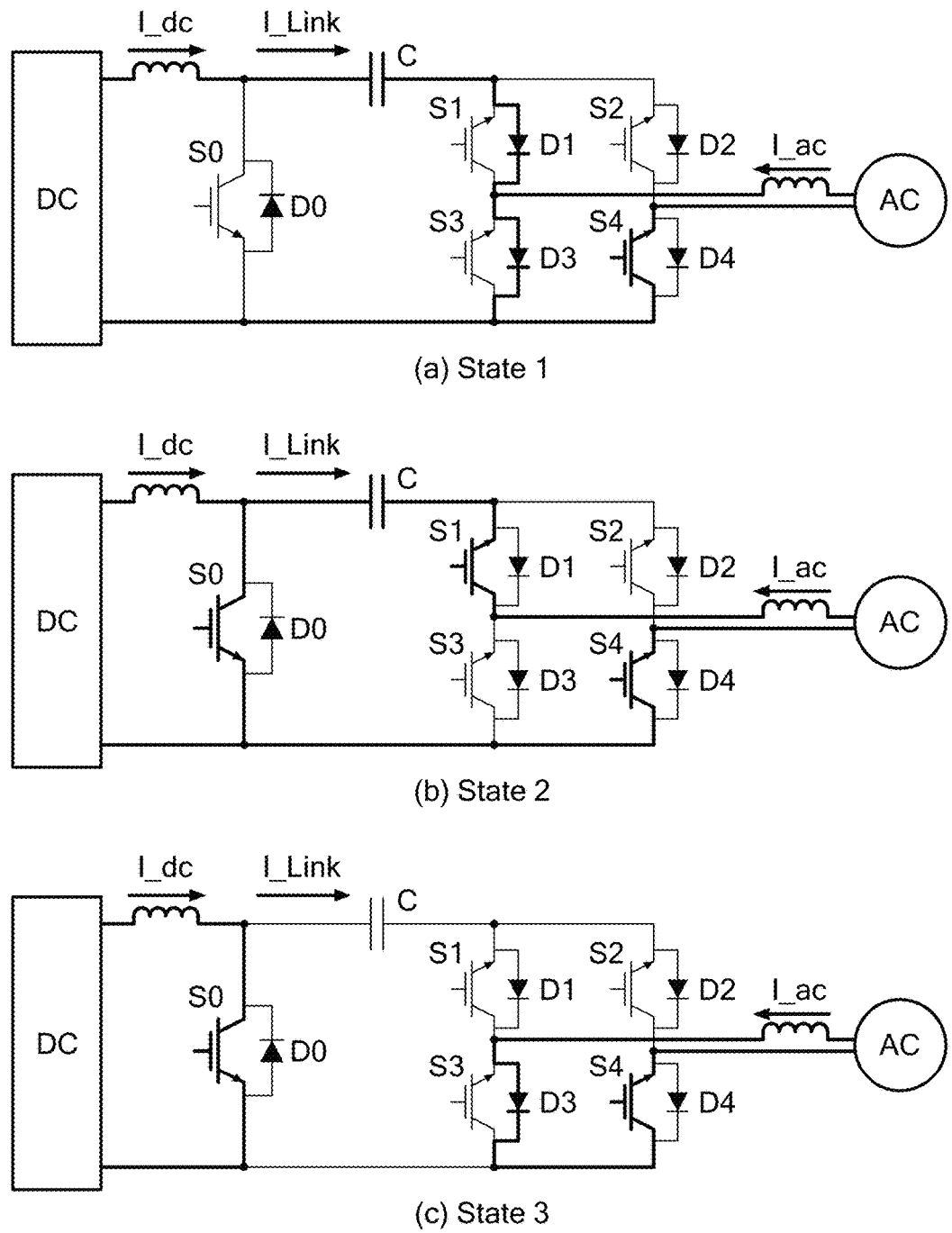
FIG. 10 illustrates in panels (a), (b), and (c) circuit diagrams illustrating principles of the operation of an embodiment of a bidirectional single-phase capacitive link inverter with series link when power flows from dc-side to ac-side and load current (I_ac) is positive.

1.1.1 Principles of Operation of the Bidirectional Capacitive-Link Inverter Regardless of the direction of the power flow, this converter has three states (mode) in each switching cycle. FIG. 10 shows the behavior of the first topology when the power flows from dc side to the ac side.

1) State 1—charging the link capacitor through the source: during this state, switch S0 is off. If the load current (I_ac) is positive (right to left), switch S4 and diodes D3 and D1 provide paths for input and output currents. If the load current is negative, switch S3 and diodes D2 and D4 are conducting. During this state, the link current is equal to the dc-side current and it is positive. Therefore, the voltage across the link increases.

2) State 2—discharging the link capacitor into the load: during this state, switch S0 is on to provide a path for the input current and the load current. Switches S1 and S4, if the load current is positive, and switches S2 and S3, if the load current is negative, provide a path for the load current. During this state, the magnitude of the link current is equal to that of the output current and its polarity is negative. Therefore, the voltage across the link decreases.

3) State 3—no power transfer: during this state switch S0 is on to provide a path for input current. If the load current is positive, switch S4 and diode D3 provide a path for the load current. If load current is negative, switch S3 and diode D4 are conducting instead of S4 and D3. During this state the link current is zero, and the link voltage remains constant.

Duration of state 1 is determined such that input current meets its reference, and duration of state 2 is controlled such that the load current meets its reference. State 3 is needed due to the mismatch of input and output power, and its duration depends on the difference between input and output power. In this manner, double frequency harmonic components can be suppressed.

Figure 11:
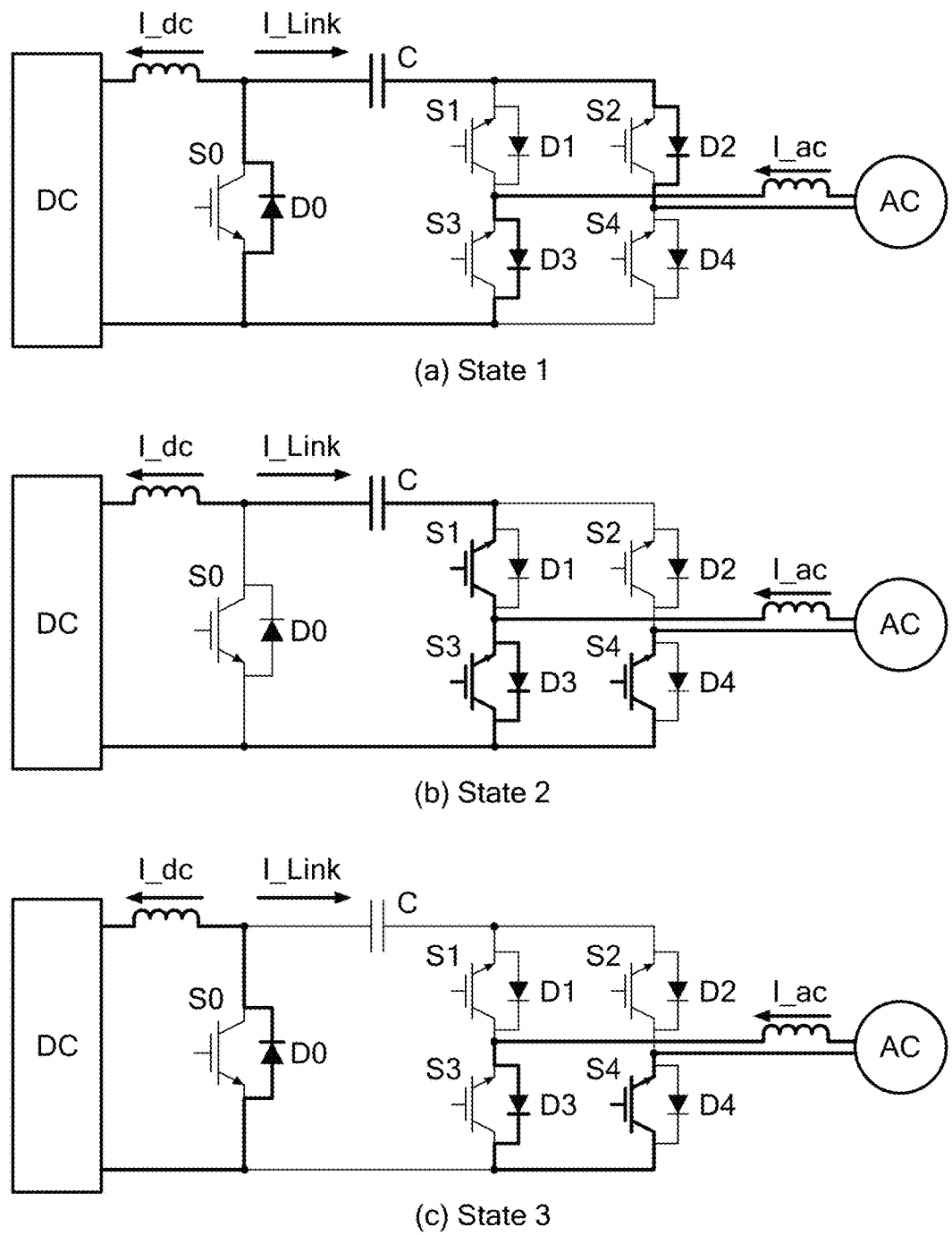
FIG. 11 illustrates in panels (a), (b), and (c) circuit diagrams illustrating principles of the operation of a bidirectional single-phase capacitive link inverter with series link when power flows from ac-side to dc-side and load current (I_ac) is positive.

The behavior of the first topology when the power flows from the ac side to the dc side is shown in FIG. 11. In this figure it is assumed I_ac is positive. As seen in this figure, during the first state, diodes D2 and D3 allow I_ac to charge the link capacitor while D0 provides a path for dc-side current and ac-side current. In the second state, dc-side current discharges the link capacitor, and switches S1 and S4 conduct. If the ac-side current is higher than the dc-side current, D3 conducts; otherwise, S3 conducts. During the third state link current is zero, and diodes D0 and D3 along with switch S4 provide paths for the dc-side and ac-side currents. If I_ac is negative D1 and D4 conduct instead of D2 and D3 during the 1st state. In the second state S2 and S3 along with S4 or D4, depending on the values of dc-side and ac-side currents, conduct while in the thirds state D0, S3 and D4 conduct, if I_ac is negative.

Figure 12:
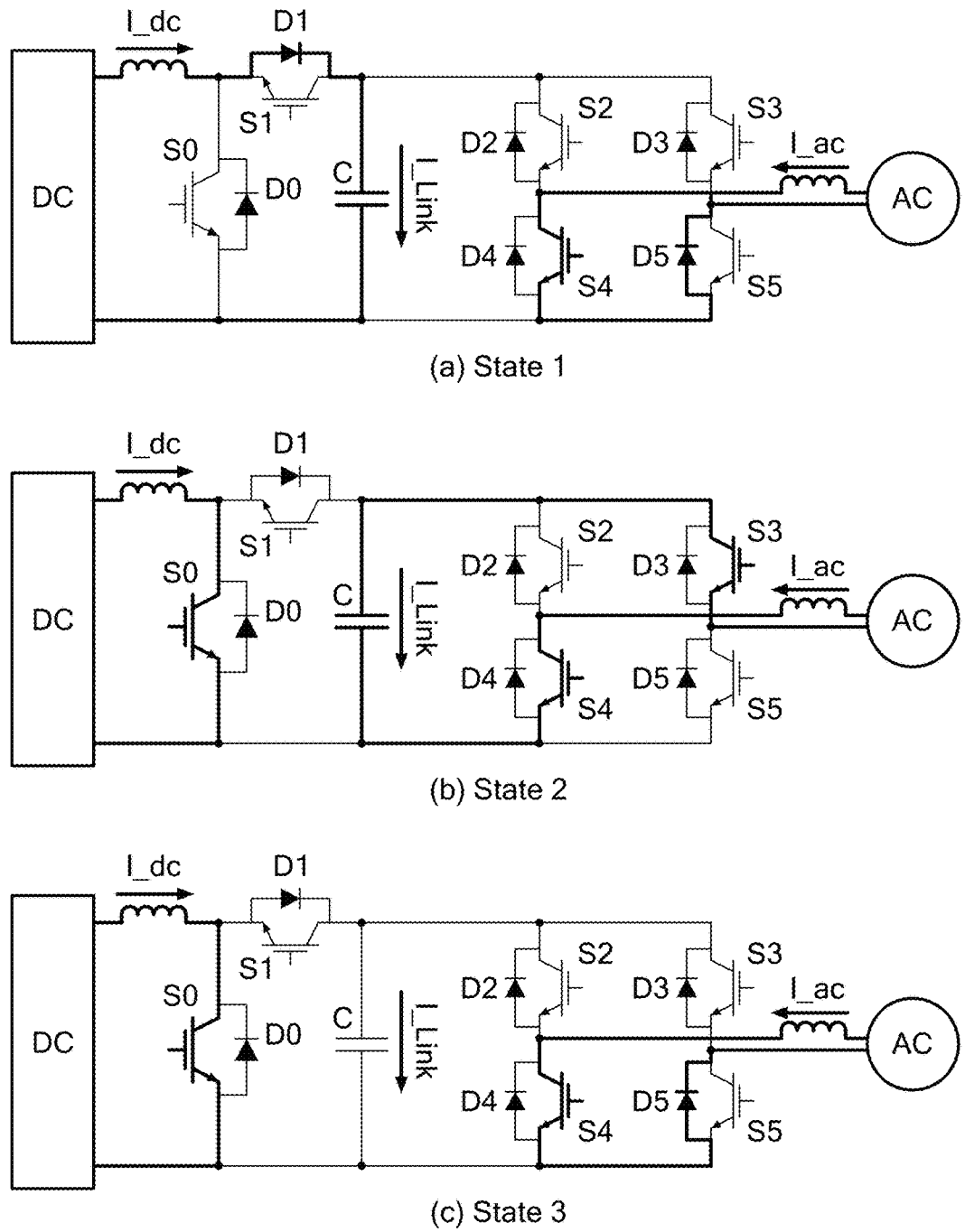
FIG. 12 illustrates in panels (a), (b), and (c) circuit diagrams illustrating principles of operation of a bidirectional single-phase capacitive link inverter with parallel link when power flows from dc-side to ac-side and load current (I_ac) is positive.

The behavior of the second proposed topology (parallel link) when the power flows from dc-side to the ac-side is depicted in FIG. 12. In this figure I_ac is assumed to be positive. Similar to the first proposed topology, there are three states:

1) State 1—charging the link capacitor through dc source: during this state, diode D1 conducts to allow the dc-side current to charge the link capacitor while S4 and D5 provide a path for the ac-side current. If I_ac is negative, S5 and D4 conduct instead of S4 and D5.

2) State 2—discharging the link capacitor into the load: during this mode switch S0 conducts to provide a path for dc-side current. Switches S4 and S3 conduct and allow the link capacitor to be discharged into the load. For negative values of I_ac S2 and S5 will conduct instead of S3 and S4.

3) State 3—no power transfer: during this mode switches S0 and S4 along with diode D5 provide paths for the dc-side and ac-side currents. For negative values of I_ac, switches S0 and S5 along with diode D4 are conducting.

Figure 13:
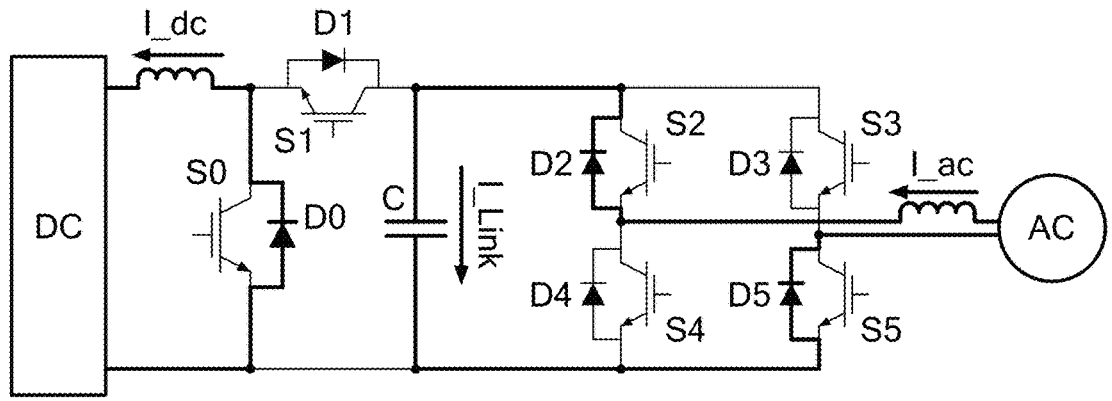
FIG. 13 illustrates in panels (a), (b), and (c) circuit diagrams illustrating principles of operation of a bidirectional single-phase capacitive link inverter with parallel link when power flows from ac-side to dc-side and load current (I_ac) is positive.
Figure 13:
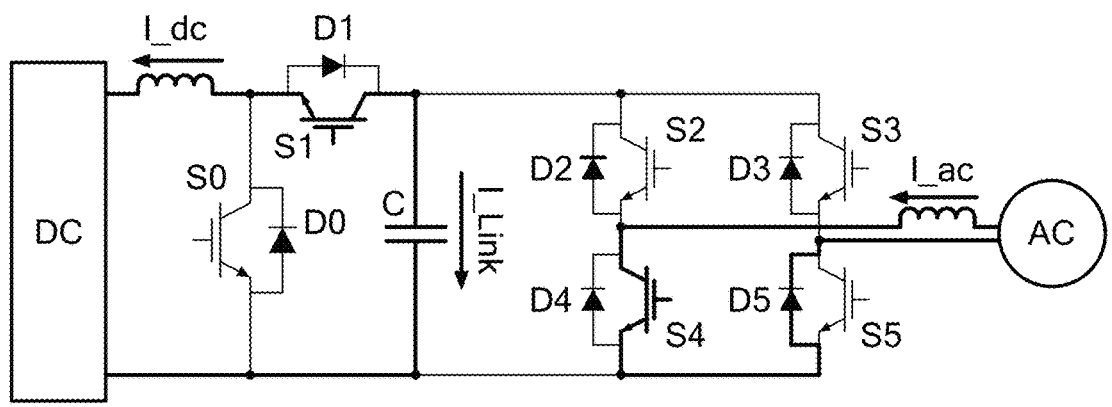
Figure 13:
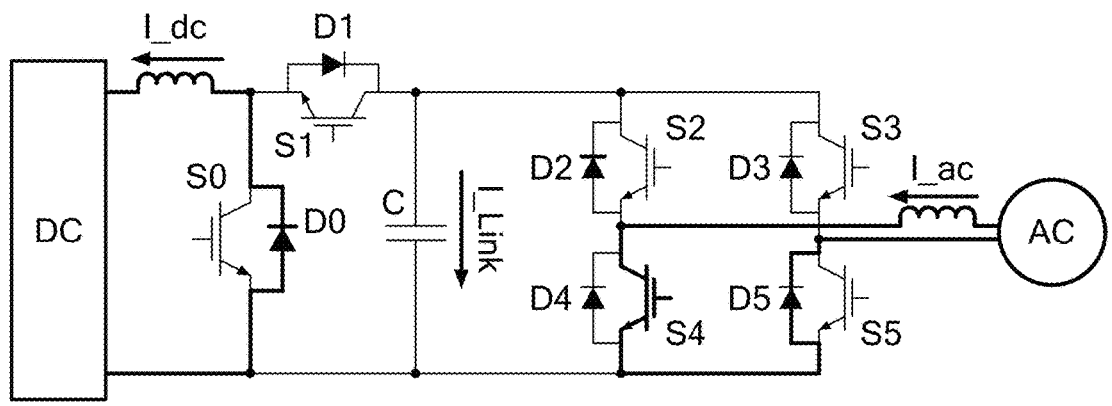

FIG. 13 depicts the behavior of the 2nd proposed topology when power transfers from the ac-side to the dc-side assuming I_ac is positive.

1.1.2 Analysis of Capacitive-Link Inverter

The disclosed inverters are analyzed as follows, and the maximum voltage of the link capacitor as well as the required link capacitance are determined. The maximum voltage of the link capacitor determines the voltage stress of the switches and diodes.

1.1.2.1 Voltage Rating of the Switches/Diodes

The output and input voltages and currents of a single-phase inverter are expressed in (1)-(4):

$$v_o(t) = V_m \sin(\omega t + \theta_V) = V_m \sin(2\pi f_o t + \theta_V) \qquad (1)$$

$$i_o(t) = I_m \sin(\omega t + \theta_I) = I_m \sin(2\pi f_o t + \theta_I) \qquad (2)$$

$$v_{in}(t) = V_{dc} \qquad (3)$$

$$i_{in}(t) = I_{dc} \qquad (4)$$

Figure 14:
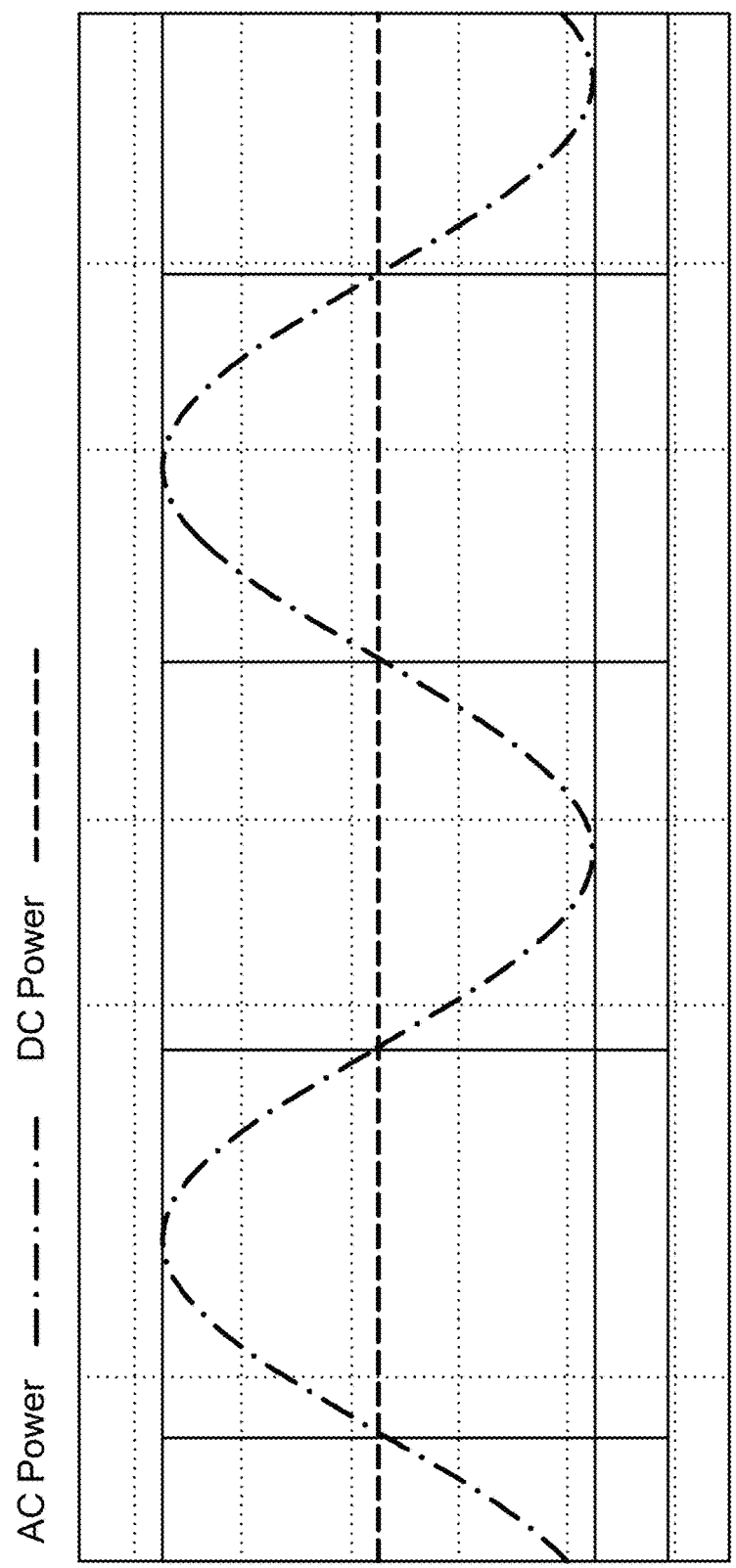
FIG. 14 is a graph illustrating inherent double frequency harmonic in single phase inverters.

Using (1)-(4), the output power and the input power, shown in FIG. 14, can be calculated as follows:

$$P_o(t) = \frac{I_m V_m}{2} \{\cos(\theta_V - \theta_I) - \cos(2\omega t + \theta_V + \theta_I)\} = \qquad (5)$$

$$\frac{I_m V_m}{2} \{\cos(\theta_V - \theta_I) - \cos(4\pi f_o t + \theta_V + \theta_I)\}$$

$$P_{in}(t) = V_{dc} \times I_{dc} = \frac{I_m V_m}{2} \cos(\theta_V - \theta_I) \qquad (6)$$

According to (5), the instantaneous output power has a dc component and an alternating component the frequency of which is twice the output voltage/current frequency ($f_o$). The dc component of the output power is equal to the input power. The mismatch of input and output power values need to be managed by the link capacitor. Therefore, the instantaneous value of capacitor power is as follows:

$$P_c(t) = \frac{I_m V_m}{2}\cos(2\omega t + \theta_V + \theta_I) = \frac{I_m V_m}{2}\cos(4\pi f_o t + \theta_V + \theta_I) \quad (7)$$

Assuming C, $i_c(t)$, and $v_c(t)$ are the link capacitance and low frequency components of the link capacitor current and voltage, the following expression needs to be met:

$$P_c(t) = v_c(t) \times i_c(t) = C \times v_c(t) \times \frac{d(v_c(t))}{dt} \quad (8)$$

One of the possible solutions for (7) and (8) is as follows:

$$v_c(t) = \sqrt{\frac{I_m V_m}{C\omega}} \sin\left(\omega t + \frac{\theta_V + \theta_I}{2} + \frac{\pi}{4}\right) \quad (9)$$

$$0 \leq \omega t + \frac{\theta_V + \theta_I}{2} + \frac{\pi}{4} \leq \pi$$

$$v_c(t) = -\sqrt{\frac{I_m V_m}{C\omega}} \sin\left(\omega t + \frac{\theta_V + \theta_I}{2} + \frac{\pi}{4}\right) \quad (10)$$

$$\pi \leq \omega t + \frac{\theta_V + \theta_I}{2} + \frac{\pi}{4} \leq 2\pi$$

$$i_c(t) = C\omega \sqrt{\frac{I_m V_m}{C\omega}} \cos\left(\omega t + \frac{\theta_V + \theta_I}{2} + \frac{\pi}{4}\right) \quad (11)$$

$$0 \leq \omega t + \frac{\theta_V + \theta_I}{2} + \frac{\pi}{4} \leq \pi$$

$$i_c(t) = -C\omega \sqrt{\frac{I_m V_m}{C\omega}} \cos\left(\omega t + \frac{\theta_V + \theta_I}{2} + \frac{\pi}{4}\right) \quad (12)$$

$$\omega \leq \omega t + \frac{\theta_V + \theta_I}{2} + \frac{\pi}{4} \leq 2\pi$$

The above response results in having a minimum link voltage of zero. It is also possible to determine the link capacitor voltage and current such that the minimum voltage of capacitor is above zero. One possible solution for this case is as follows:

$$v_c(t) = \sqrt{\frac{I_m V_m}{2C\omega}\sin(2\omega t + \theta_V + \theta_I) + V_0} \quad (13)$$

$$i_c(t) = \frac{I_m V_m \cos(2\omega t + \theta_V + \theta_I)}{2\sqrt{\frac{I_m V_m}{2C\omega}\sin(2\omega t + \theta_V + \theta_I) + V_0}} \quad (14)$$

In prior art techniques, only (13) and (14) are considered as the voltage and current across the link capacitor.

Figure 15:
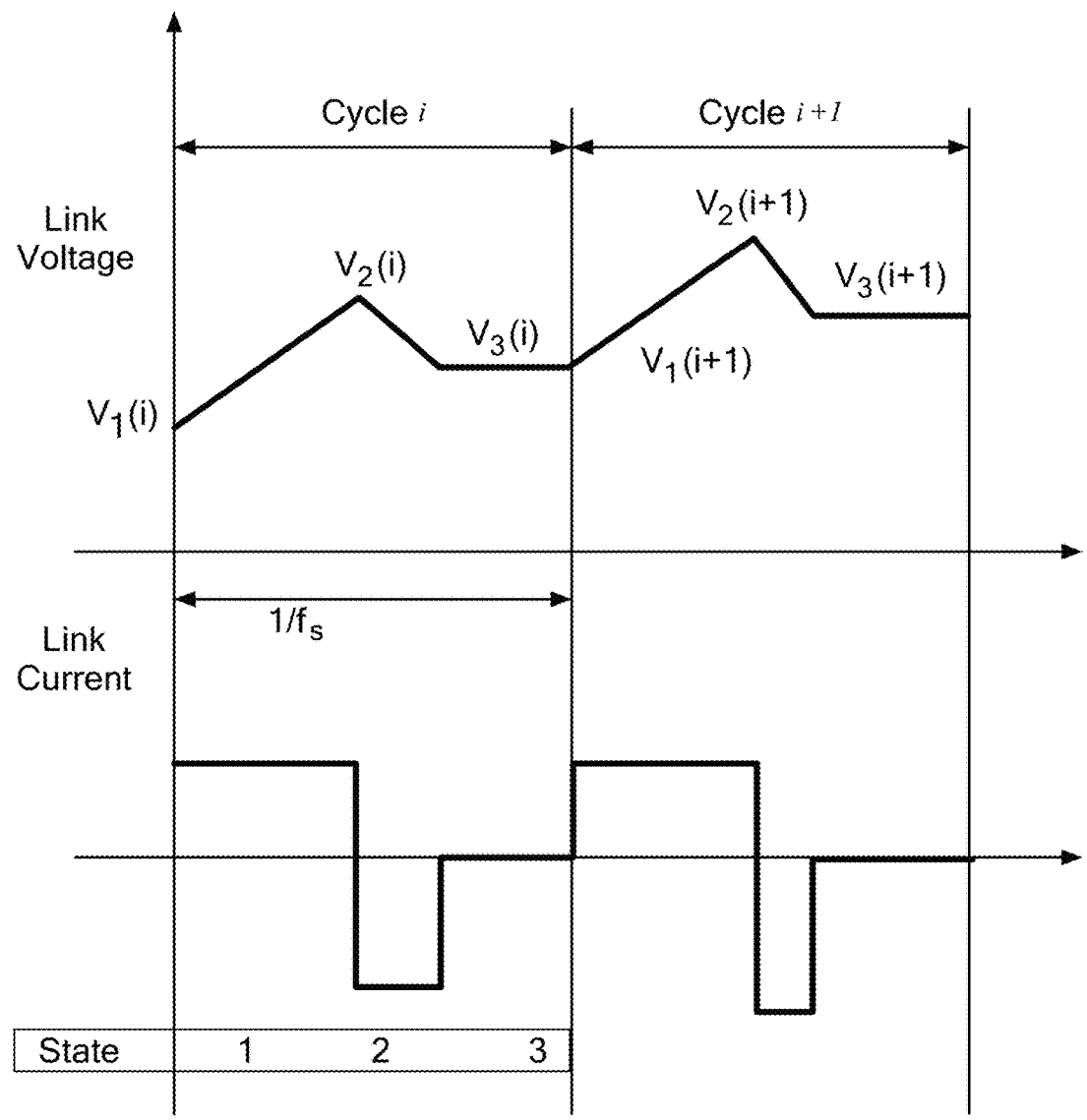
FIG. 15 is a graph illustrating link voltage and current of a bidirectional single-phase capacitive link inverter when the instantaneous source power is higher than the instantaneous load power.
Figure 16:
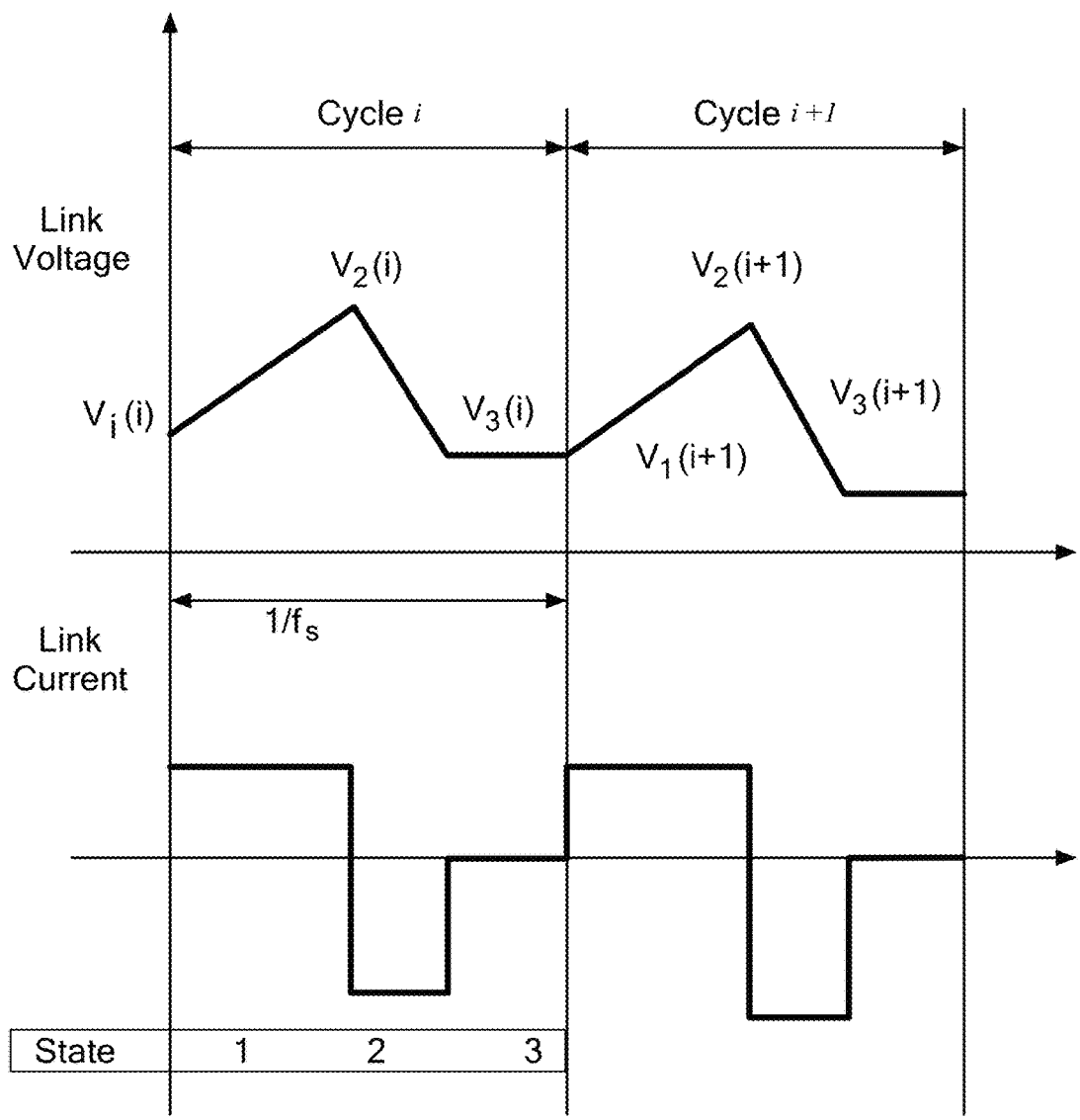
FIG. 16 is a graph illustrating link voltage and current of a bidirectional single-phase capacitive link inverter when the instantaneous source power is lower than the instantaneous load power.

As mentioned earlier, in any switching cycle, there are three states. The voltage of the link capacitor at the beginning of states 1 to 3 in any arbitrary cycle ($i^{th}$ cycle) is expressed as $V_1(i)$, $V_2(i)$, and $V_3(i)$, respectively. During the first state (charging mode), the input current passes the link capacitor and charges the capacitor. This results in an increase of the link voltage from $V_1(i)$ to $V_2(i)$. During the second state (discharging mode), the load current passes the link capacitor. However, the current of the link capacitor during this state (discharging mode) is negative. This results in a decrease of the link voltage from $V_2(i)$ to $V_3(i)$. As shown in FIGS. 15 and 16, if the instantaneous value of the input power is higher than the instantaneous value of the output power, $V_3(i)$ will be higher than $V_1(i)$; otherwise, $V_3(i)$ will be lower than $V_1(i)$. During the third state, no current passes the link capacitor, and the link voltage remains equal to $V_3(i)$. The voltage at the beginning of the next cycle (($i+1$)$^{th}$ cycle) will be equal to $V_3(i)$:

$$V_1(i+1) = V_3(i) \quad (15)$$

Figure 17:
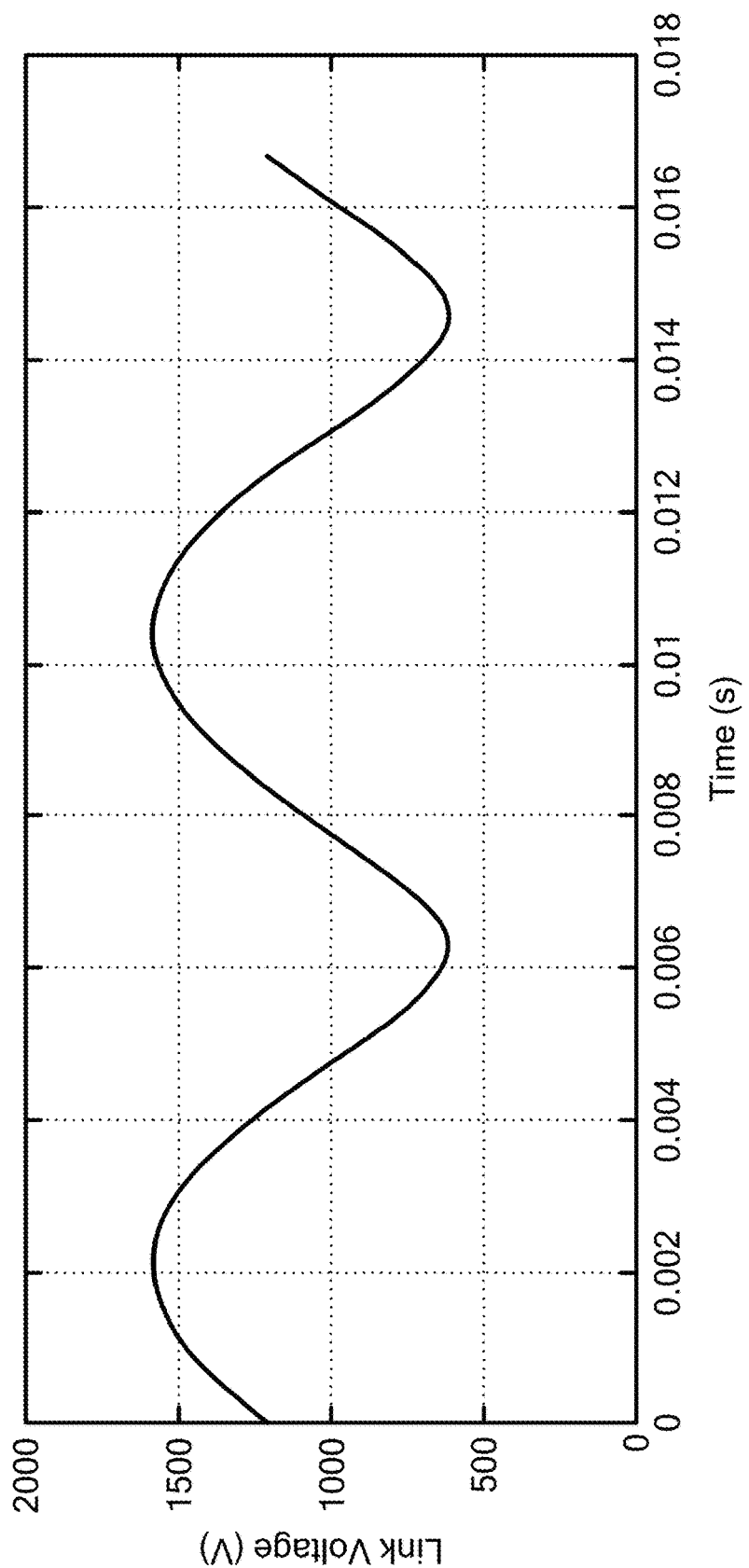
FIG. 17 is a graph illustrating low frequency component of the link in a bidirectional single-phase capacitive link inverter.

If the input power is higher than the load power, $V_1(i+1)$ will be higher than $V_1(i)$. Assuming $f_s$ is the switching frequency, in each load power cycle, the duration of which is $$\frac{1}{2f_o},$$

there are $$\frac{f_s}{2f_o}$$

high frequency cycles. In half of these cycles the input power is higher than the load power, and in another half of these cycles, the input power is lower than the load power. FIG. 17 shows the low frequency component of the link capacitor voltage.

Assuming the duration modes 1 to 3 in $i^{th}$ cycle are $t_1(i)$, $t_2(i)$, and $t_3(i)$, respectively, (16) to (18) describe the behavior of the circuit during the charging state of an arbitrary switching cycle (the $i^{th}$ cycle, where $$1 \leq i \leq \frac{f_s}{2f_o}\right):$$

$$i_{in}(i) = I_{dc} = C\frac{V_2(i) - V_1(i)}{t_1(i)} \quad (16)$$

$$v_{in}(i) = V_{dc} = t_1(i) \times f_s \frac{V_2(i) + V_1(i)}{2} \quad (17)$$

$$P_{in}(i) = I_{dc} V_{dc} = \frac{I_m V_m}{2}\cos(\theta_V - \theta_I) = \frac{1}{2}C f_s(V_2^2(i) - V_1^2(i)) \quad (18)$$

The behavior of the converter during the discharging state can be expressed through (19) to (21):

$$i_o(i) = I_m \sin\left(\frac{2\pi f_o}{f_s}i + \theta_I\right) = C\frac{V_2(i) - V_3(i)}{t_2(i)} \quad (19)$$

$$v_o(i) = V_m \sin\left(\frac{2\pi f_o}{f_s}i + \theta_V\right) = t_2(i) \times f_s \frac{V_2(i) + V_3(i)}{2} \quad (20)$$

$$P_o(t) = v_o(i) * i_o(i) = \frac{I_m V_m}{2}\left\{\cos(\theta_V - \theta_I) - \cos\left(\frac{4\pi f_o}{f_s}i + \theta_V + \theta_I\right)\right\} = \quad (21)$$

$$\frac{1}{2}C f_s(V_2^2(i) - V_3^2(i)) = \frac{1}{2}C f_s(V_2^2(i) - V_1^2(i+1))$$

Using (18) and (21), $V_1(i+1)$ can be calculated:

$$V_1^2(i+1) = \frac{I_m V_m}{Cf_s}\cos\left(\frac{4\pi f_o}{f_s}i + \theta_V + \theta_I\right) + V_1^2(i) \quad (22)$$

$$\left(1 \le i \le \frac{f_s}{2f_o}\right)$$

Assuming the initial value of the link voltage across the link capacitor is $V_1(0)$, (22) can be simplified as follows:

$$V_1^2(i+1) = \sum_{x=1}^{i}\left(\frac{I_m V_m}{Cf_s}\cos\left(\frac{4\pi f_o}{f_s}x + \theta_V + \theta_I\right)\right) + V_1^2(0) \quad (23)$$

The value of $V_1(i+1)$ can be determined as follows:

$$V_1(i+1) = \quad (24)$$

$$\sqrt{\frac{I_m V_m}{Cf_s}\frac{\sin\left(\frac{2\pi f_o}{f_s}\times(i+1)\right)\cos\left(\frac{2\pi f_o}{f_s}\times i + \theta_V + \theta_I\right)}{\sin\left(\frac{2\pi f_o}{f_s}\right)} + V_1^2(0)}$$

Using (24) and (18), $V_2(i)$ can be determined:

$$V_2(i) = \sqrt{\frac{I_m V_m}{Cf_s}\frac{\sin\left(\frac{2\pi f_o}{f_s}\times(i+1)\right)\cos\left(\frac{2\pi f_o}{f_s}\times i + \theta_V + \theta_I\right)}{\sin\left(\frac{2\pi f_o}{f_s}\right)} + \frac{I_m V_m}{Cf_s}\cos(\theta_V - \theta_I) + V_1^2(0)} \quad (25)$$

It can be shown that the maximum value of $V_2$ that occurs at $$= \frac{f_s}{4f_o},$$

and is equal to:

$$V_{2,max} = \quad (26)$$

$$\sqrt{-\frac{I_m V_m}{Cf_s}\frac{\cos\left(\frac{2\pi f_o}{f_s}\right)\sin(\theta_V + \theta_I)}{\sin\left(\frac{2\pi f_o}{f_s}\right)} + \frac{I_m V_m}{Cf_s}\cos(\theta_V - \theta_I) + V_1^2(0)}$$

Assuming $$\theta_V = \theta_I = -\frac{\pi}{4},$$

the maximum value of $V_{2,is}$ is as follows:

$$V_{2,max} = \sqrt{\frac{I_m V_m}{Cf_s}\left(\frac{\cos\left(\frac{2\pi f_o}{f_s}\right)}{\sin\left(\frac{2\pi f_o}{f_s}\right)} + 1\right) + V_1^2(0)} \quad (27)$$

If $f_o \ll f_s$, the maximum value of $V_2$ can be determined by (28):

$$V_{2,max} = \sqrt{\frac{I_m V_m}{2\pi f_o C} + \frac{I_m V_m}{Cf_s} + V_1^2(0)} \cong \sqrt{\frac{I_m V_m}{2\pi f_o C} + V_1^2(0)} \quad (28)$$

The voltage rating of all the switches and diodes in the disclosed inverters are equal to $V_{2,max}$. It should be noted that although the value of $V_1(0)$ is optional, it needs to be in the following range:

$$0 \le V_1(0) \le \frac{V_m}{\sqrt{2}} + V_o \quad (29)$$

1.1.2.2 Maximum Capacitance

To make sure this inverter has all the three states in each switching cycle, the following condition must be valid:

$$t_1(i) + t_2(i) < \frac{1}{f_s} \quad (30)$$

Using (17) and (20), (30) can be written as follows:

$$\frac{2V_{dc}}{V_2(i) + V_1(i)} + \frac{2v_o(i)}{V_2(i) + V_1(i+1)} < 1 \quad (31)$$

It can be shown that the maximum value of $t_1(i) + t_2(i)$ occurs at $$i = \frac{f_s}{2f_o}.$$

The values of $V_2$ and $V_1$ at this point can be calculated by (24) and (25):

$$V_1\left(\frac{f_s}{2f_o}\right) = V_1\left(\frac{f_s}{2f_o} + 1\right) = \sqrt{\frac{I_m V_m}{Cf_s}\cos(\theta_V + \theta_I) + V_1^2(0)} \quad (32)$$

$$V_2\left(\frac{f_s}{2f_{in}}\right) = \sqrt{\frac{I_m V_m}{Cf_s}\cos(\theta_V + \theta_I) + \frac{I_m V_m}{Cf_s}\cos(\theta_V - \theta_I) + V_1^2(0)} \quad (33)$$

Plugging (32) and (33) into (31) determines the maximum value of the link capacitance:

$$|2V_m\sin(\pi + \theta_V)| + 2V_{dc} < \sqrt{\frac{I_m V_m}{Cf_s}\cos(\theta_V + \theta_I) + V_1^2(0)} + \quad (34)$$

-continued $$\sqrt{\frac{I_m V_m}{Cf_s}\cos(\theta_V+\theta_I)+\frac{I_m V_m}{Cf_s}\cos(\theta_V-\theta_I)+V_1^2(0)}$$

Assuming $$\theta_V=\theta_I=-\frac{\pi}{4},$$

proper values of $V_1(0)$, C, and $f_s$ can be selected such that:

$$V_m\sqrt{2}+2V_{dc}<\sqrt{\frac{I_m V_m}{Cf_s}+V_1^2(0)}+V_1(0) \quad (35)$$

The maximum value of the link capacitance will be as follows:

$$C<\frac{I_m V_m}{f_s(V_m\sqrt{2}+2V_{dc})(V_m\sqrt{2}+2V_{dc}-2V_1(0))} \quad (36)$$

A unique feature of the disclosed inverter is that it does not have any minimum requirement for the link capacitance; instead it has a maximum requirement.

Plugging the maximum value of the capacitance achieved from (36) into (28), the voltage rating of the switches/diodes, which is equal to the maximum value of the link voltage, is determined as follows:

$$V_{2,max}\cong \quad (37)$$
$$\sqrt{\left(\frac{f_s}{2\pi f_o}(V_m\sqrt{2}+2V_{dc})(V_m\sqrt{2}+2V_{dc}-2V_1(0))\right)+V_1^2(0)}$$

1.1.3 Techniques for Reducing the Voltage Rating of the Switches

According to (36) and (28), the link capacitance of the proposed inverter can be as small as the designer wishes; however, choosing a very small value for C increases the maximum value of the link voltage. Accordingly, a number of techniques for reducing the maximum value of the link voltage are described herein.

Figure 18:
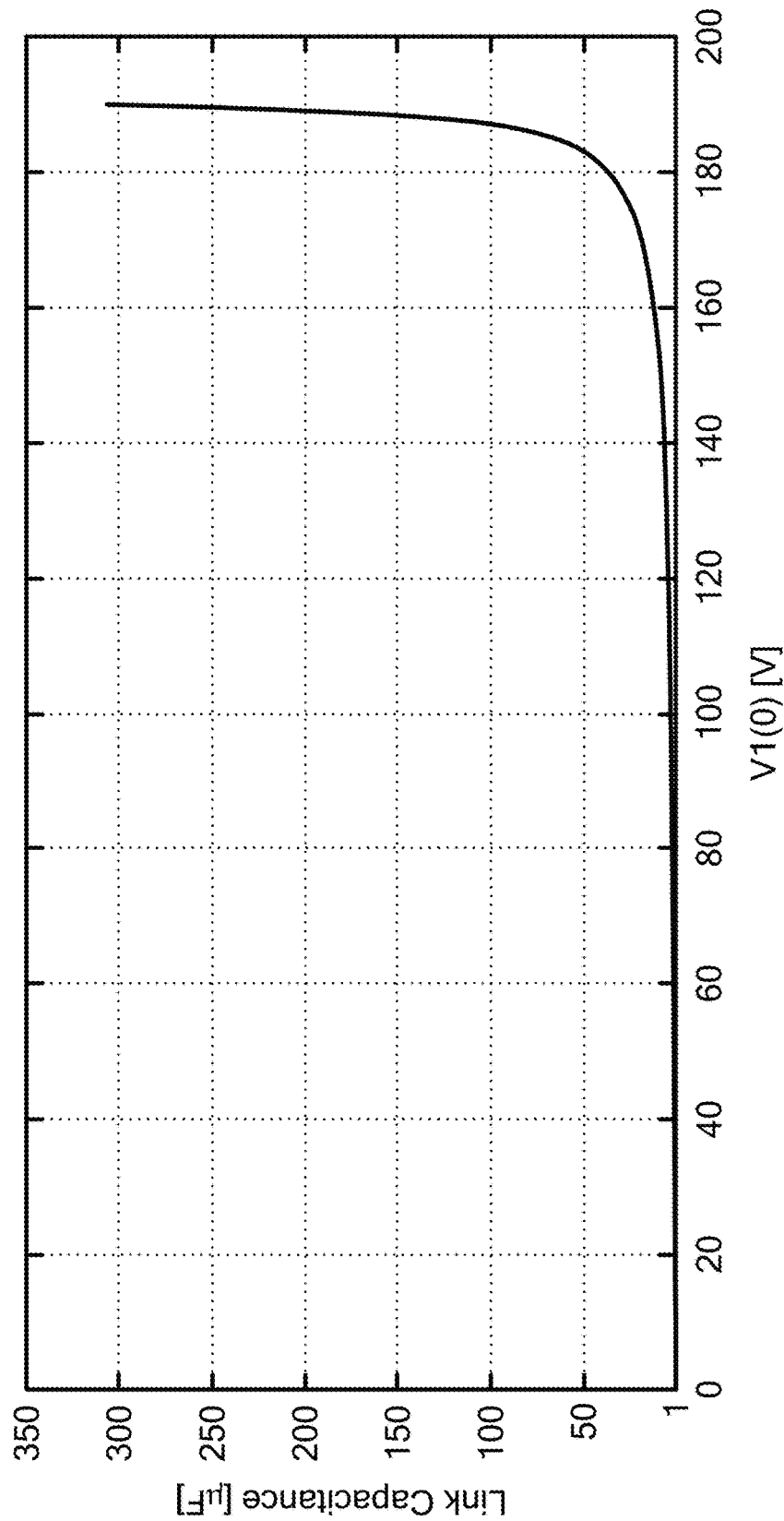
FIG. 18 is a graph illustrating maximum value of link capacitance vs. selected minimum value of the link voltage ($V_1(0)$) for a 1 kW system $$(V_m = 200 \text{ V}, I_m = 10 \text{ A}, V_{dc} = 50 \text{ V}, I_{dc} = 20 \text{ A},$$
$$f_s = 6 \text{ kHz}, f_o = 60 \text{ Hz}, \theta_V = -\frac{\pi}{4}, \text{ and } \theta_i = -\frac{\pi}{4});$$
Figure 19:
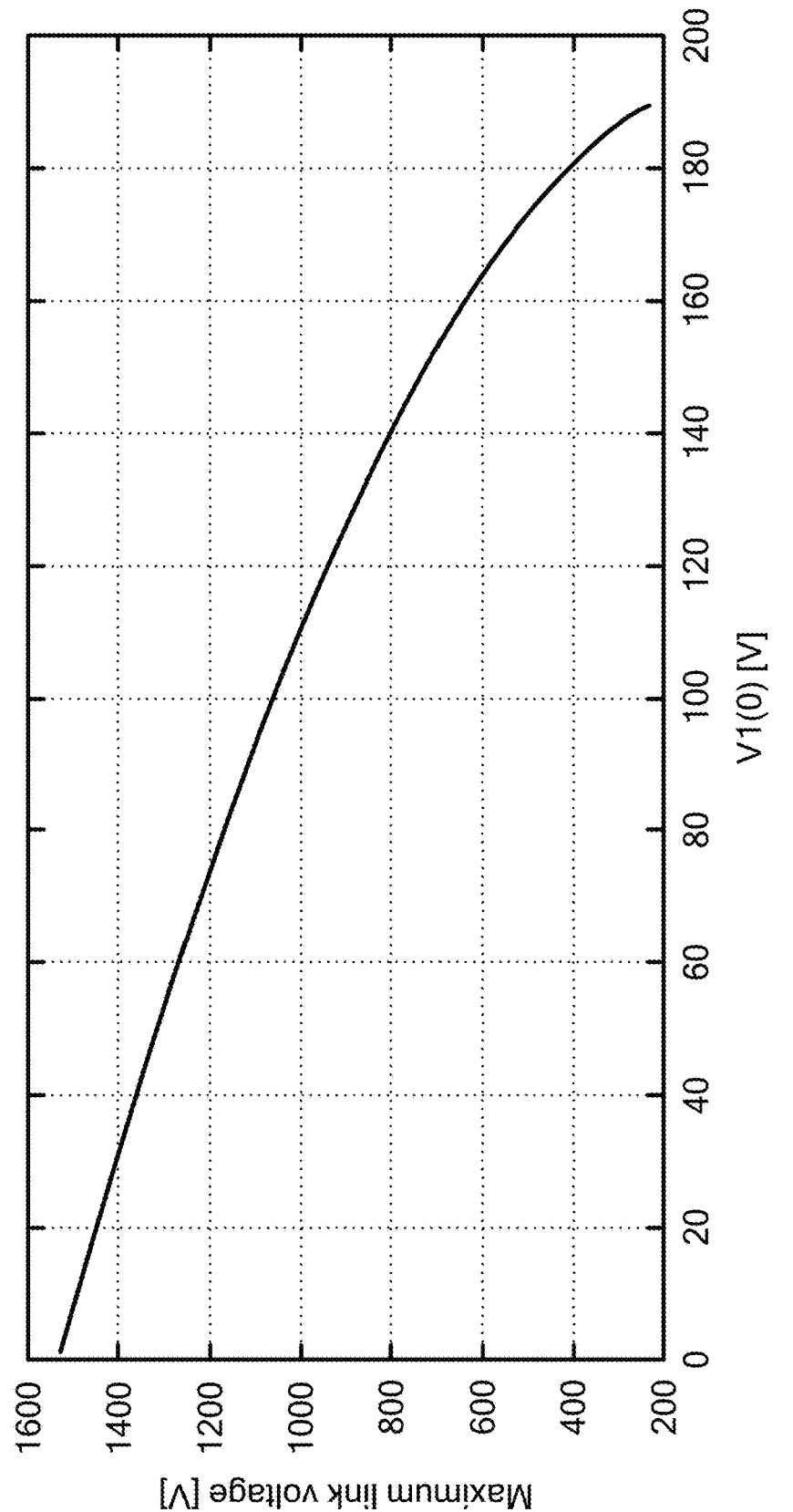
FIG. 19 is a graph illustrating maximum value of link voltage vs. selected minimum value of the link voltage ($V_1(0)$) for a 1 kW system $$(V_m = 200 \text{ V}, I_m = 10 \text{ A}, V_{dc} = 50 \text{ V}, I_{dc} = 20 \text{ A},$$
$$f_s = 6 \text{ kHz}, f_o = 60 \text{ Hz}, \theta_V = -\frac{\pi}{4}, \text{ and } \theta_i = -\frac{\pi}{4});$$

1.1.3.1 Choosing a Nonzero Value for Minimum Voltage of the Link Capacitor to Increase the Maximum Capacitance According to (36) and (28), choosing a nonzero value for $V_1(0)$ helps increase the maximum value of the link capacitance and reduces the voltage stress. The closer $V_1(0)$ is to its maximum value (determined by (29)) the lower the peak voltage of the capacitor is. As an example, FIG. 18 shows the maximum value of link capacitance for different values of $V_1(0)$, assuming $V_m=200\,V,\ I_m=10\,A,\ V_{dc}=50\,V,\ I_{dc}=20A,$ $f_s=6\,kHz,\ f_o=60\,Hz\ \theta_V=-\frac{\pi}{4},\ \text{and}\ \theta_i=\frac{\pi}{4}.$ FIG. 19 depicts the maximum value of link voltage in this system for different values of $V_1(0)$, assuming the maximum link capacitance is selected.

Figure 20:
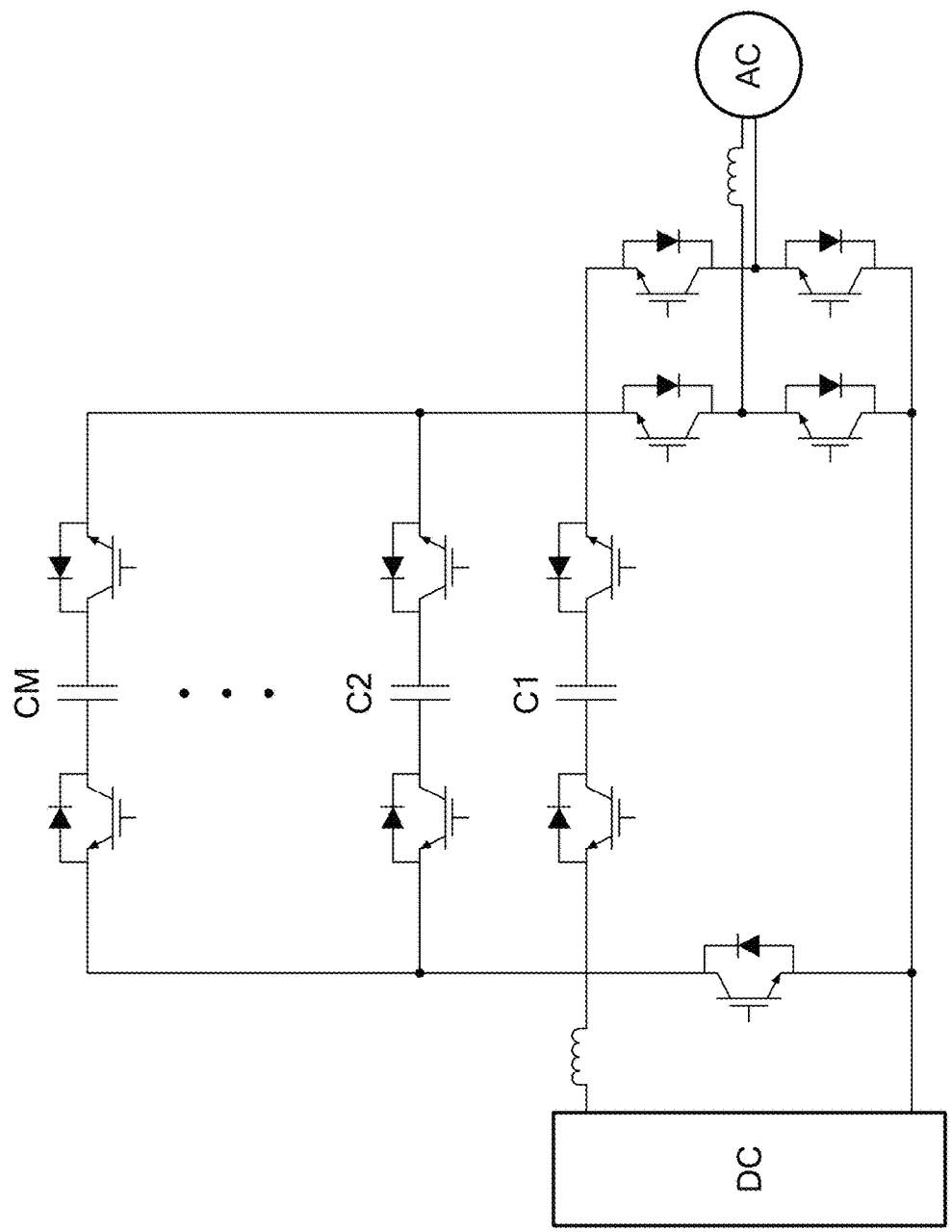
FIG. 20 is a circuit diagram of an embodiment of a bidirectional single-phase capacitive link inverter using a series capacitor network (dc⇔single-phase ac)
Figure 21:
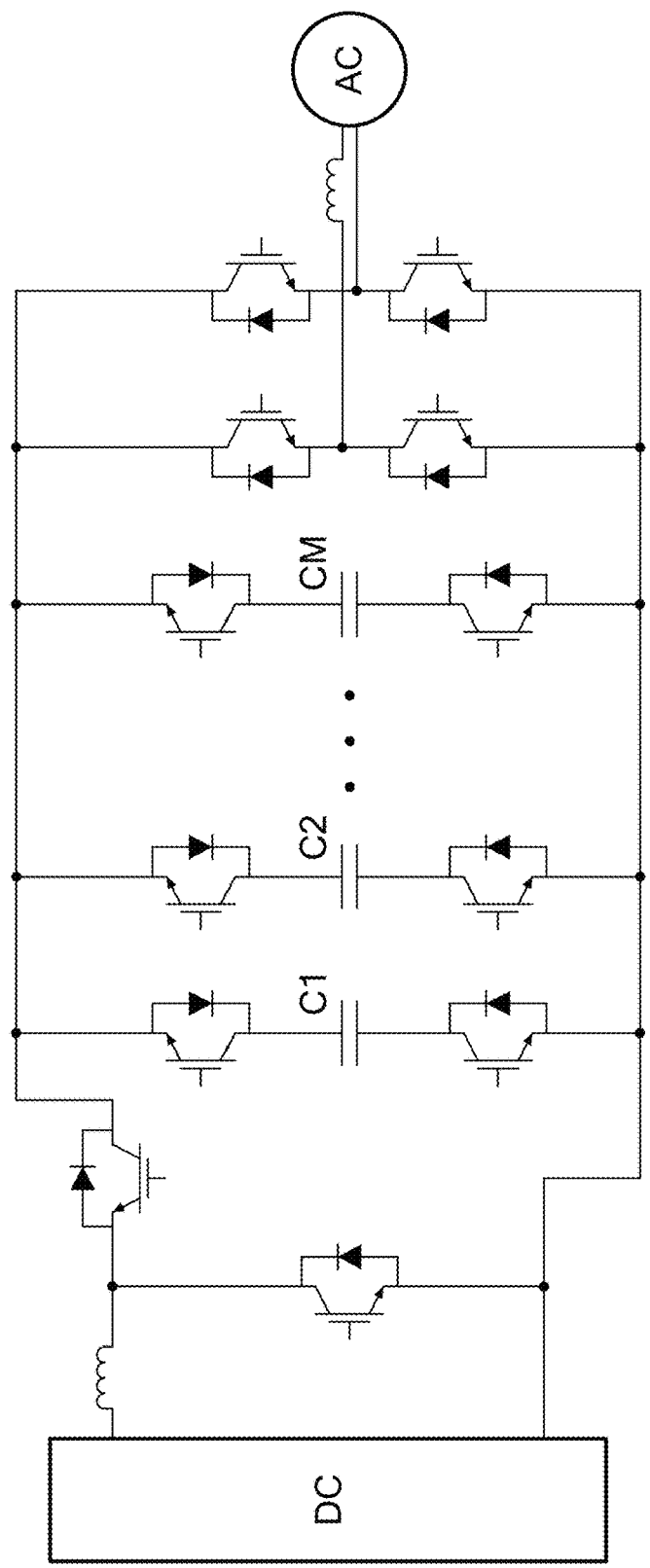
FIG. 21 is a circuit diagram of an embodiment of a bidirectional single-phase capacitive link inverter using a parallel capacitor network (dc⇔single-phase ac)

1.1.3.2 Use of Multiple Capacitors (a Capacitor Network) for Reducing the Voltage Rating of the Switches/Diodes To minimize the voltage rating of the switches in the inverter, a capacitor network can be used instead of a single capacitor. The schematics of the embodiment of an inverter when a capacitor network is used instead of a single capacitor are illustrated in FIGS. 20 and 21.

One approach is to use $$\frac{f_s}{4f_o}$$

number of capacitors such that each capacitor can be involved in transferring the power in two switching cycles (cycle "i" and cycle $$"\frac{f_s}{4f_o}+i")$$

over a load power cycle, the frequency of which is $2f_o$. The difference between the instantaneous values of the input power and output power in cycles "i" and $$"\frac{f_s}{4f_{in}}+i"$$

are equal but they have opposite polarities. This implies that the net energy is zero, and the voltage of the capacitor at the beginning of cycle "i" is equal to the voltage of the capacitor at the end of cycle $$"\frac{f_s}{4f_o}+i".$$

Figure 22:
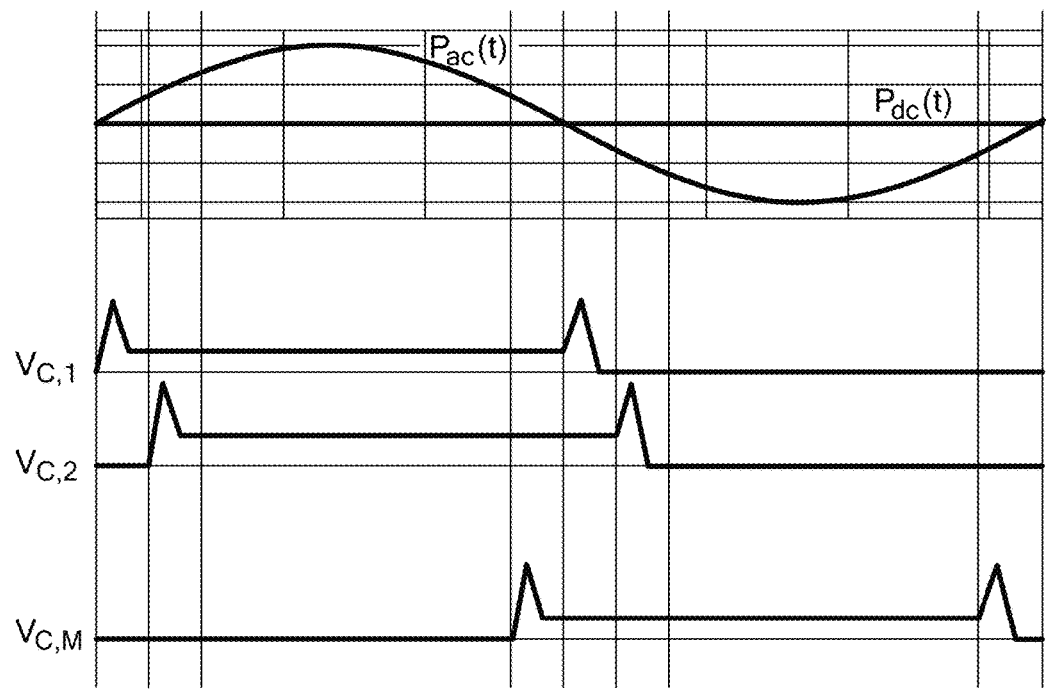
FIG. 22 is a graph illustrating input and output power and the voltage across each capacitor when $$\frac{f_s}{4f_o}$$

FIG. 22 shows this concept.

It is also possible to use an arbitrary number of capacitors. In this case each capacitor will be involved in transferring the power in more than two switching cycles over a load power cycle, i.e. in $i^{th}$ cycle, $$"\frac{f_s}{4f_o}+i"^{th}$$

cycle, and a number of consequent cycles after cycles i and $$\frac{f_s}{4f_{in}}+i.$$

Both approaches are discussed below.

1.1.3.2.1 Using $$\frac{f_s}{4f_0}$$

Number of Capacitors

FIG. 23 shows the voltage of an arbitrary capacitor ($x^{th}$ capacitor) that transfers power in cycle x and cycle In cycle x the input power is higher than the load power; therefore, $V_{c,x,3}$ (the voltage of $x^{th}$ capacitor at the end of $x^{th}$ cycle) will be higher than $V_{c,x,1}$ (the voltage of $x^{th}$ capacitor at the beginning of $x^{th}$ cycle). In cycle $$\frac{f_s}{4f_{in}} + x$$

the input power is lower than the load power; thus, the voltage of $x^{th}$ capacitor at the beginning this cycle, which is equal to $V_{c,x,3}$, will be higher than its voltage at the end of this cycle. As mentioned earlier the difference between input and output power values are the same in these two cycles but they have opposite polarities. This implies that the voltage of the capacitor at the end of cycle $$\frac{f_s}{4f_{in}} + x$$

will be equal to $V_{c,x,1}$.

The peak value of the voltage across $x^{th}$ capacitor in each of the two cycles, i.e. cycles x and $$\frac{f_s}{4f_{in}} + x,$$

can be determined based on $V_{C,x,1}$ and the instantaneous values of source power and load power. The values of $V_{C,x,2}$ and $V_{C,x,4}$ can be determined by (38) and (39):

$$C_{c,x,2} = \sqrt{\frac{I_m V_m}{Cf_s} \cos(\theta_V - \theta_I) + V_{C,x,1}^2} \qquad (38)$$

$$V_{c,x,4} = \sqrt{\frac{I_m V_m}{Cf_s}\left\{\cos(\theta_V - \theta_I) - \cos\left(\frac{4\pi f_o}{f_s}i + \theta_V + \theta_I\right)\right\} + V_{C,x,1}^2} \qquad (39)$$

Assuming $$\theta_V = \theta_I = -\frac{\pi}{4} \text{ and}$$

$$V_{c,x,1} = 0,$$

$V_{C,x,2}$ and $V_{C,x,4}$ will be as follows:

$$V_{c,x,2} = \sqrt{\frac{I_m V_m}{Cf_s}} \qquad (40)$$

$$V_{c,x,4} = \sqrt{\frac{I_m V_m}{Cf_s}\left\{1 + \sin\left(4\pi \frac{f_o}{f_s}x\right)\right\}} \qquad (41)$$

$$\frac{f_s}{4f_{in}} + x$$

According to (40), $V_{C,x,2}$ does not depend on the value of x; therefore, the peak value of the voltage across all the capacitors during the first half cycle of the load power is the same. However, the value of $V_{C,x,4}$ depends on the value of x. To find the voltage stress of the switches/diodes, the maximum value of $V_{C,x,4}$ needs to be determined. It should be noted that $$1 < x < \frac{f_s}{4f_o};$$

therefore, $$0 < \sin\left(\frac{4\pi f_{in}}{f_s}x\right) < 1.$$

This implies that $V_{C,x,4}$ varies in the following range:

$$\sqrt{\frac{I_m V_m}{Cf_s}} < V_{C,x,4} < \sqrt{\frac{2I_m V_m}{Cf_s}} \qquad (42)$$

The voltage rating of the switches/diodes, which is equal to the maximum value of $V_{c,x,4}$, is as follows:

$$V_{max} = \sqrt{\frac{2I_m V_m}{Cf_s}} \qquad (43)$$

If maximum value of capacitance, determined by (36), is used, the maximum value of the link voltage will be as follows:

$$V_{max} = 2 \times (V_m + \sqrt{2} V_{cd}) \qquad (44)$$

Assuming as an example $V_m = 200$ V, $I_m = 10$ A, $V_{dc} = 50$ V, $I_{dc} = 20$ A, $f_s = 6$ kHz, $f_o = 60$ Hz, $\theta_V = -\frac{\pi}{4}$, and $\theta_i = -\frac{\pi}{4}$, the maximum voltage stress of this inverter is 816V when 25 capacitors are used.

1.1.3.2.2 Using an Arbitrary Number of Capacitors

As mentioned above, it is also possible to use each capacitor for more than two cycles. The voltage of an arbitrary link capacitor ($x^{th}$ capacitor) that transfers power during 2N switching cycles over the load power cycle is shown in FIG. 24. In this figure, the arbitrary capacitor ($x^{th}$ capacitor) is involved in transferring the power in cycles $(x-1)N+1$ to $xN$ and cycles $$\frac{f_s}{4f_o} + (x-1)N + 1 \text{ to } \frac{f_s}{4f_o} + xN.$$

There are $$M = \frac{f_s}{4Nf_o}$$

number of capacitors in this inverter, and $x$ varies in the following range:

$$1 \leq x \leq \frac{f_s}{4Nf_o} \quad (45)$$

During cycles $(x-1)N+1$ to $xN$, the input power is higher than the load power; therefore, the voltage across the capacitor at the end of each cycle is higher than that of beginning of that cycle. During cycles $$\frac{f_s}{4f_o} + (x-1)N + 1 \text{ to } \frac{f_s}{4f_o} + xN$$

the input power is lower than the output power; thus, the voltage of the capacitor at the end of each cycle is lower than the beginning of the cycle.

The value of the link voltage at the beginning of each cycle ($V_{C,x,2i+1}$) depends on its value at the beginning of the previous cycle ($V_{C,x,2i-1}$) and the alternating part of the load power in that cycle:

$$\frac{I_m V_m}{2} \cos\left(\frac{4\pi f_o}{f_s}((x-1)N+i) + \theta_V + \theta_I\right) = \quad (46)$$

$$\frac{1}{2} C f_s (V_{C,x,2i+1}^2 - V_{C,x,2i-1}^2) \quad 1 \leq i \leq N$$

Assuming the initial voltage of the $x^{th}$ capacitor is $V_{C,x,1}$, the voltage of this capacitor at the end of each cycle (cycle $(x-1)N+i$) can be determined as follows:

$$V_{C,x,2i+1} = \quad (47)$$

$$\sqrt{\sum_{y=1}^{i}\left(\frac{I_m V_m}{C f_s}\cos\left(\frac{4\pi f_o}{f_s}((x-1)N+y) + \theta_V + \theta_I\right)\right) + V_{C,x,1}^2}$$

The voltage of the capacitor at the end of $(xN)^{th}$ cycle can be determined by (48):

$$V_{C,x,2N+1} = \quad (48)$$

$$\sqrt{\frac{I_m V_m}{C f_s} \frac{\sin\left(\frac{4\pi f_o}{f_s} \times \frac{N+1}{2}\right)\cos\left(\frac{4\pi f_o}{f_s} \times \frac{N}{2} + \frac{4\pi f_o}{f_s}(x-1)N + \theta_V + \theta_I\right)}{\sin\left(\frac{2\pi f_o}{f_s}\right)} + V_{C,x,1}^2}$$

The peak value of the voltage across $x^{th}$ capacitor occurs in cycle $$\frac{f_s}{4f_o} + (x-1)N + 1,$$

and it can be determined as follows:

$$V_{C,x,2N+2} = \sqrt{\frac{I_m V_m}{C f_s} \frac{\sin\left(\frac{4\pi f_o}{f_s} \times \frac{N+1}{2}\right)\cos\left(\frac{4\pi f_o}{f_s} \times \frac{2xN-N}{2} + \theta_V + \theta_I\right)}{\sin\left(\frac{2\pi f_o}{f_s}\right)} + \frac{I_m V_m}{C f_s}\cos(\theta_V - \theta_I) + V_{C,x,1}^2} \quad (49)$$

Assuming $$\theta_V = \theta_I = -\frac{\pi}{4} \text{ and } V_{c,x,1} = 0,$$

(49) can be simplified as follows:

$$V_{C,x,2N+2} = \sqrt{\frac{I_m V_m}{C f_s}\left(\frac{\sin\left(\frac{2\pi f_o}{f_s}(N+1)\right)\sin\left(\frac{2\pi f_o}{f_s}(2xN-N)\right)}{\sin\left(\frac{2\pi f_o}{f_s}\right)} + 1\right)} \quad (50)$$

$V_{C,x,2N+2}$, which is calculated by (50), denotes the peak voltage of the $x^{th}$ capacitor. There are $$\frac{f_s}{4Nf_o}$$

number of capacitors, and the capacitor, the peak voltage of which has the maximum value, determines the voltage rating of the switches/diodes. According to (50), $V_{C,x,2N+2}$ will be maximum if the following condition is valid:

$$\frac{d\left(\sin\left(\frac{2\pi f_o}{f_s}(2xN-N)\right)\right)}{dx} = \quad (51)$$

$$0 \Rightarrow \frac{2\pi f_o}{f_s}(2xN-N) = \frac{\pi}{2} \Rightarrow x = \frac{f_s}{8Nf_o} + \frac{1}{2}$$

The voltage stress of the switches and diodes when $$x = \frac{f_s}{8Nf_o} + \frac{1}{2}$$

is equal to:

$$V_{C,MAX} = \quad (52)$$

$$\sqrt{\frac{I_m V_m}{Cf_s}\left(\frac{\sin\left(\frac{2\pi f_o}{f_s}(N+1)\right)}{\sin\left(\frac{2\pi f_o}{f_s}\right)}+1\right)} \cong \sqrt{\frac{I_m V_m}{Cf_s}\left(\frac{\sin\left(\frac{2\pi f_o}{f_s}N\right)}{\sin\left(\frac{2\pi f_o}{f_s}\right)}+1\right)}$$

In (52) the voltage stress is expressed based on N. The voltage stress can also be calculated based on the number of capacitors, M, as follows:

$$V_{C,MAX} = \sqrt{\frac{I_m V_m}{Cf_s}\left(\frac{\sin\left(\frac{\pi}{2M}\right)}{\sin\left(\frac{2\pi f_o}{f_s}\right)}+1\right)} \quad (53)$$

$$M = \frac{f_s}{4Nf_o} \quad (54)$$

If the maximum allowable capacitance is used, (53) will be simplified as follows:

$$V_{C,MAX} = \sqrt{2} \times (V_m + \sqrt{2} V_{dc}) \times \sqrt{\frac{\sin\left(\frac{\pi}{2M}\right)}{\sin\left(\frac{2\pi f_o}{f_s}\right)}+1} \quad (55)$$

According to (55) increasing the value of M decreases the voltage stress. The maximum value of M, as discussed in previous part is $$\frac{f_s}{4f_o}.$$

Assuming $V_m = 200$ V, $I_m = 10$ A, $V_{dc} = 50$ V, $I_{dc} = 20$ A, $f_s = 6$ kHz, $f_o = 60$ Hz, $\theta_V = -\frac{\pi}{4}$, $\theta_i = -\frac{\pi}{4}$, $C = 2.2$ $\mu F$, FIG. 25 shows the maximum voltage across the switches/diodes of this inverter vs. the number of capacitors in the capacitor network.

1.1.3.3 Use of Transformer for Reducing Voltage Stress

Another solution for reducing the voltage stress of the switches and diodes in the proposed inverter is to use a low frequency transformer at the load.

By using a transformer, the maximum capacitance can be increased. Assuming the turn ratio of the transformer is "a" (a<1), the maximum required capacitance will be determined as follows:

$$C < \frac{I_m V_m}{f_s(aV_m\sqrt{2}+2V_{dc})^2} \quad (56)$$

Using (56) and (28) the voltage stress can be determined:

$$V_{2,max} = \sqrt{\frac{I_m V_m}{2\pi f_{in} C}} = \sqrt{2} \times (aV_m + \sqrt{2} V_{dc}) \times \sqrt{\frac{f_s}{2\pi f_o}} \quad (57)$$

1.2 Single-Phase ac to Three-Phase ac Capacitive Link Converter

Unlike single-phase ac systems, the instantaneous power of a three-phase ac system (source or load) is a constant dc value. This implies that a three-phase ac to a single-phase ac or a single-phase ac to a three-phase ac converter will have the inherent double frequency harmonic problem. The single-phase inverter topology described above can be extended to be used in these systems. FIGS. 26 and 27 depict the bidirectional single-phase ac to three-phase ac converters with series and parallel link capacitors, respectively. Referring to FIG. 26, an input switch bridge 52, output switch bridge 56, and link state 54 are connected in series. A single phase AC source 51 and three-phase AC load 57 are provided. Galvanic isolation, as shown in FIG. 28, can be provided by adding a high frequency transformer to the link.

1.2.1 Analysis of Single-Phase ac to Three-Phase ac Capacitive Link Converter

The single-phase ac-to-three phase ac converter has 4 states in each switching cycle. If the power flows from a single-phase ac source towards a three-phase ac load, there will be one charging state, two discharging states, and a state during which no power is transferred. FIG. 29 shows the behavior of the converter with series link capacitor in each of the states. During the time span shown in this figure, $I_{in}$, $I_{Ao}$, and $I_{Co}$ are positive (left to right), and $I_{bo}$ is negative (right to left). Also, for the case shown in FIG. 29, the voltage across the output phase pair BCo has the maximum line to line output voltage and it is negative. It is clear that the phase pair carrying the maximum line-to-line voltage and its polarity continuously change over a load/source cycle. Also, the polarity of the input and output currents change over a load/source cycle.

In state 1, diodes D1 and D4 at the input side and diodes D5 and D8 along with switches S6 and S10 at the output-side conduct. The input current passes the link capacitor and charges it. In state 2, switches S2 and S4 will be turned on and diodes D8 and D4 stop conducting. During this state, the current of phase C passes the link capacitor, and since it is negative the link capacitor starts discharging. To end this state and initiate state 3, switch S8 is turned on. By turning on switch S8, diode D5 stops conducting, and the current of phase B passes the link capacitor. The link capacitor continues discharging. To end this state switches S6 and S4 will be tuned off, and diode D9 starts to conduct. During state 4, the link current is zero.

The behavior of the converter with parallel link capacitor is shown in FIG. 30.

The low frequency component of the link capacitor voltage will be similar to that of the single-phase inverter. Assuming the current and voltage of the single-phase source/load are:

$$v_i(t)=V_m \sin(\omega t+\theta_V)=V_m \sin(2\pi ft+\theta_V) \quad (58)$$

$$i_i(t)=I_m \sin(\omega t+\theta_I)=I_m \sin(2\pi ft+\theta_I) \quad (59)$$

Two possible equations for low frequency component of the link voltage are as follows:

$$v_c(t) = \left|\sqrt{\frac{I_m V_m}{C\omega}} \sin\left(2\pi ft + \frac{\theta_V + \theta_I}{2} + \frac{\pi}{4}\right)\right| \quad (60)$$

$$v_c(t) = \sqrt{\frac{I_m V_m}{2C\omega} \sin(4\pi ft + \theta_V + \theta_I) + V_0} \quad (61)$$

All techniques disclosed herein for reducing the link peak voltage of the single-phase inverter topologies can also be used in the single-phase ac to three-phase ac topologies. FIGS. 31 and 32 depict these topologies when a capacitor network is used instead of one capacitor.

1.3 Single-Phase ac to Single-Phase ac Capacitive Link Inverter

In some embodiment, converters are provided for applications that have single-phase ac sources and single-phase ac loads; however, the voltage amplitude and/or frequency of the input and output are not necessarily the same. The proposed single-phase ac-ac converters are depicted in FIGS. 33 and 34. The isolated configuration is shown in FIG. 35.

In single-phase ac-to-single-phase ac inverters the input and output power both have dc and alternating components. The alternating components of the input and output power are not necessarily the same. Therefore, there may be a mismatch of power that needs to be managed.

The input and output voltages and currents are expressed in (62)-(65):

$$v_i(t)=V_{mi} \sin(\omega_i t+\theta_{Vi})=V_{mi} \sin(2\pi f_i t+\theta_{Vi}) \quad (62)$$

$$i_i(t)=I_{mi} \sin(\omega_i t+\theta_{Ii})=I_{mi} \sin(2\pi f_i t+\theta_{Ii}) \quad (63)$$

$$v_o(t)=V_{mo} \sin(\omega_o t+\theta_{Vo})=V_{mo} \sin(2\pi f_o t+\theta_{Vo}) \quad (64)$$

$$i_o(t)=I_{mo} \sin(\omega_o t+\theta_{Io})=I_{mo} \sin(2\pi f_o t+\theta_{Io}) \quad (65)$$

Using (62)-(65), the input and output power, will be calculated as follows:

$$P_i(t) = \frac{I_{mi} V_{mi}}{2} \{\cos(\theta_{Vi} - \theta_{Ii}) - \cos(2\omega_i t + \theta_{Vi} + \theta_{Ii})\} = \quad (66)$$

$$\frac{I_{mi} V_{mi}}{2} \{\cos(\theta_{Vi} - \theta_{Ii}) - \cos(4\pi f_i t + \theta_{Vi} + \theta_{Ii})\}$$

$$P_o(t) = \frac{I_{mo} V_{mo}}{2} \{\cos(\theta_{Vo} - \theta_{Io}) - \cos(2\omega_o t + \theta_{Vo} + \theta_{Io})\} = \quad (67)$$

$$\frac{I_{mo} V_{mo}}{2} \{\cos(\theta_{Vo} - \theta_{Io}) - \cos(4\pi f_o t + \theta_{Vo} + \theta_{Io})\}$$

The average values of input and output power need to be equal:

$$\frac{I_{mi} V_{mi}}{2} \cos(\theta_{Vi} - \theta_{Ii}) = \frac{I_{mo} V_{mo}}{2} \cos(\theta_{Vo} - \theta_{Io}) \quad (68)$$

The mismatch of input and output power values need to be managed by the link capacitor. Therefore, the instantaneous value of the link capacitor power is as follows:

$$P_c(t) = \frac{I_{mo} V_{mo}}{2} \cos(2\omega_o t + \theta_{Vo} + \theta_{Io}) - \frac{I_{mi} V_{mi}}{2} \cos(2\omega_i t + \theta_{Vi} + \theta_{Ii}) \quad (69)$$

Assuming C, $i_c(t)$, and $v_c(t)$ are the link capacitance and low frequency components of the link capacitor current and voltage, the following expression needs to be met:

$$P_c(t) = v_c(t) \times i_c(t) = C \times v_c(t) \times \frac{d(v_c(t))}{dt} \quad (70)$$

One of the possible solutions for (69) and (70) is as follows:

$$v_c(t) = \left|\sqrt{\frac{I_{mo} V_{mo}}{C\omega_o}} \sin\left(\omega_o t + \frac{\theta_{Vo} + \theta_{Io}}{2} + \frac{\pi}{4}\right) - \sqrt{\frac{I_{mi} V_{mi}}{C\omega_i}} \sin\left(\omega_i t + \frac{\theta_{Vi} + \theta_{Ii}}{2} + \frac{\pi}{4}\right)\right| \quad (71)$$

Another possible solution for (69) and (70), can be:

$$v_c(t) = \sqrt{\frac{I_{mo} V_{mo}}{2C\omega_o} \sin(2\omega_o t + \theta_{Vo} + \theta_{Io}) - \frac{I_{mi} V_{mi}}{2C\omega_i} \sin(2\omega_i t + \theta_{Vi} + \theta_{Ii}) + V_0} \quad (72)$$

FIG. 36 shows the link voltage for a 10 kW single-phase ac-to-single phase ac configuration with input and output frequencies of 60 Hz and 120 Hz, respectively.

Techniques described herein for reducing the link peak voltage of the single-phase inverter topologies can also be used in the single-phase ac to single-phase ac topologies. FIGS. 37 and 38 depict these topologies when a capacitor network is used instead of one capacitor.

2. Inductive Link Converter 2.1 Inductive-Link Single-Phase ac Inverter

In some embodiments, converters are provided that use an inductor for transferring the power from input towards output, and also for managing the mismatch of power between input and output. FIG. 39 shows the schematic of the proposed single-phase inverter. The dc side-current is always from left to right; however, the voltage can be positive (positive top terminal) or negative (negative top terminal). Positive dc voltage implies power transfer from dc side towards ac-side; and negative polarity of dc voltage indicates the power is transferred from ac-side towards the dc-side. Despite providing bidirectional power flow, in most applications that require bidirectional power flow, the polarity of the dc-current needs to be bidirectional rather than the polarity of the voltage. To have both positive and negative dc-side currents, a switch-bridge needs to be used at the dc-side, as shown in FIG. 40.

As depicted in FIGS. 41 and 42, both topologies can provide galvanic isolation through a single-phase high frequency transformer added to the link.

The disclosed inverter is also capable of interfacing several sources and/or loads. A system with two dc sources and a single-phase ac load is shown in FIG. 43.

Similar to the capacitive-link inverter, the inductive-link inverter has three states in each cycle. FIG. 44 shows the behavior of the inverter in each state, assuming V_ac is positive. In the first state the input voltage (dc source), which is positive, charges the link inductor and results in an increase of the link inductor current. During this state switch S0 and diode D0 conduct. Duration of this state is determined such that the dc-side current meets it reference. During the second state, the input-side switch is open and the output side switches/diodes S3, D3, S2, and D2 provide a path for the link current. The voltage across the link is equal to −V_ac, and its negative polarity results in a decrease of the link inductor current. If V_ac is negative, switches/diodes S1, D1, S4, and D4 are conducting instead of S3, D3, S2, and D2. In both cases, a negative voltage is across the link that results in a decrease of the link inductor current. During this state the link inductor is discharged into the load. Duration of this state is determined such that the load current meets its references. In the third state the input and output are disconnected from the link inductor. Switches/diodes S1, D1, S3, and D3 provide a path for link inductor current.

As discussed previously, the dc-side power is constant, and the ac side power has a dc component along with an alternating component the frequency of which is twice the load voltage/current frequency. The mismatch of input and output power needs to be managed by the link inductor. Assuming the output and input voltages/currents are expressed by (1)-(4), the instantaneous value of link inductor power is as follows:

$$P_L(t) = \frac{I_m V_m}{2}\cos(2\omega t + \theta_V + \theta_I) = \frac{I_m V_m}{2}\cos(4\pi f_o t + \theta_V + \theta_I) \quad (73)$$

Assuming L, $I_L(t)$, and $v_L(t)$ are the link inductance and low frequency components of the link inductor current and voltage, the following expression needs to be met:

$$P_L(t) = v_L(t) \times i_L(t) = L \times i_L(t) \times \frac{d(i_L(t))}{dt} \quad (74)$$

One of the possible solutions for (73) and (74) is as follows:

$$i_L(t) = \left| \sqrt{\frac{I_m V_m}{L\omega}} \sin\left(\omega t + \frac{\theta_V + \theta_I}{2} + \frac{\pi}{4}\right) \right| \quad (75)$$

Link current is depicted in FIG. 45. The minimum value of the link inductor current is zero, in this case. Assuming the minimum current of the inductor is above zero, another possible solution for (73) and (74) is:

$$i_L(t) = \sqrt{\frac{I_m V_m}{2L\omega}\sin(2\omega t + \theta_V + \theta_I) + I_0} \quad (76)$$

To lower the link peak current, an inductor network can be used instead of a single inductor, as depicted in FIG. 46.

2.2 Single-Phase ac to Three-Phase ac Inductive Link Converters

In some embodiments, the disclosed topology can be extended to systems with single-phase ac source (or load) and three-phase ac load (or source). FIGS. 47 and 48 show the non-isolated and isolated configurations.

This converter can have 4 states in each switching cycle. If the source is single-phase ac, and the load is three-phase ac, there is one charging state, two discharging states, and a state during which no power is transferred. The principle of the operation of this converter during each state is shown in FIG. 49. In this figure, it is assumed I_i, I_bo, and I_co are positive, and I_ao is negative. During the first state, the link inductor is charged through the source. During the second and third states output phase pairs ab_o and ac_o discharge the link inductor, respectively. During the fourth state the link inductor is shorted.

An inductor network can be used instead of the link inductor to reduce the maximum peak of inductor current, as shown in FIG. 50.

2.3 Single-Phase ac to Single-Phase ac Inductive Link Converter

FIGS. 51 and 52 depict the non-isolated and isolated single-phase ac-ac inverters. The single-phase ac to single phase ac converter with inductor network is shown in FIG. 53.

In some embodiments, the switching device(s) of the input circuitry and the output switch bridge can be a field effect transistor (FET), an insulated gate bipolar transistor (IGBT), or a metal-oxide-semiconductor field-effect transistor (MOSFET). In some embodiments, a switching device can be a field effect transistor (FET), an insulated gate bipolar transistor (IGBT), or a metal-oxide-semiconductor field-effect transistor (MOSFET) with an associated diode. In some embodiments, a switching device can be a field effect transistor (FET), an insulated gate bipolar transistor (IGBT), or a metal-oxide-semiconductor field-effect transistor (MOSFET) with anti-parallel diode.

As used herein, a controllable device may be a device that can be controlled to act as a switch, such that the device conducts current when switched on and does not conduct current when switched off. In some cases, a controllable device may have three or more terminals, with one of the terminals corresponding to an input that may allow or prevent the flow of current through two other terminals. In some embodiments, controllable device may include a bipolar junction transistor or a field effect transistor, among other components. An uncontrollable device may be a device that, unlike a controllable device, does not include a terminal input that controls the flow of current through the device. In some cases, an uncontrollable device may have two or more terminals, with current flowing from one terminal through the other. An uncontrollable device may only conduct in one direction and prevent the flow of current in the opposite direction; this property of an uncontrollable device may be referred to herein as "reverse-blocking" of such a device. Such an uncontrollable device may start to conduct when a positive voltage is applied across it, and when it conducts the voltage across it remains zero. In some embodiments, the uncontrollable device may include a diode, among other components. Some uncontrollable devices may turn off when the current flowing through it becomes zero. It should be noted that a controllable device may also include an uncontrollable device, such that the device's conduction may be controllable in one direction and it is uncontrollable in another direction.

In some embodiments, the reactive component can be at least one capacitive device operative at a capacitance of less than 1 mF, less than 1 µF, or less than 1 nF. Film capacitors can have an operative range of about $1 \times 10^{-4}$ F to less than $1 \times 10^{-9}$ F. Electrolytic capacitors can have an operating range of about $1 \times 10^{-7}$ F to about 1 F.

The power conversion devices may be controlled in any suitable manner, such as by circuitry or by a controller having one or more processors, memory, and machine-readable instructions stored in the memory that, upon execution by the one or more processors, cause the device to carry out operations to control sequence and duration of each of the controllable devices.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A power conversion device comprising:
   input circuitry configured to be coupled to a power source or load, the input circuitry comprising at least one switching device or diode;
   an output switch bridge configured to be coupled to a load or power source, the output switch bridge comprising at least four controllable switching devices arranged in a bridge configuration to control current output; and
   a link stage comprising at least one reactive component configured for alternating current (AC) operation, wherein the input circuitry, output switch bridge and link stage are operative to regulate an input and an output currents and manage power mismatch between the power source and load;
   wherein the device is operative in at least three states in a switching cycle, including at least one state to charge the reactive component of the link stage from the power source, at least one state in which power is discharged from the link stage into the load, and a single state in which no power is transferred through the link stage and one or both of a link voltage remains constant and a link current is zero or remains constant.

2. The power conversion device of claim 1, wherein the device is operative to suppress a double frequency harmonic component at the input circuitry.

3. The device of claim 1, wherein switches in the input circuitry and output switch bridge are operative at a fixed switching frequency.

4. The device of claim 1, wherein the device is operative to control the input current to be about equal to a selected reference value.

5. The device of claim 1, wherein the input circuitry comprises an input switch bridge configured to be coupled to a direct current (DC) power source, the input switch bridge comprising at least one switching device controllable to regulate an input DC current with suppression of a double frequency harmonic component.

6. The device of claim 1, wherein the output switch bridge is configured to be coupled to an AC load, the output switch bridge comprising at least four controllable switching devices arranged in a bridge configuration to control current output to the load.

7. The device of claim 1, wherein the device is operative as a single phase inverter or rectifier.

8. The device of claim 1, wherein the device is operative to regulate the input current and the output current simultaneously.

9. The device of claim 1, wherein the link stage is arranged in series or in parallel with the input circuitry and the output switch bridge.

10. The device of claim 1, wherein the reactive component comprises a film capacitor, a ceramic capacitor, an electrolytic capacitor, or an inductive device.

11. The device of claim 1, wherein the device is operative to provide bidirectional flow of power.

12. The device of claim 1, wherein each of the switching devices of the output switch bridge comprises a field effect transistor (FET), an insulated gate bipolar transistor (IGBT), or a metal-oxide-semiconductor field-effect transistor (MOSFET) with anti-parallel diode; and/or wherein the at least one the switching device of the input circuitry comprises a field effect transistor (FET), an insulated gate bipolar transistor (IGBT), or a metal-oxide-semiconductor field-effect transistor (MOSFET) with anti-parallel diode.

13. The device of claim 1, further comprising circuitry that causes, and/or a controller comprising one or more processors, memory, and machine-readable instructions stored in the memory that, upon execution by the one or more processors, cause the device to carry out operations to control sequence and duration of each of the controllable switching devices.

14. The power conversion device of claim 1, wherein a voltage rating of the switching devices is about equal to a maximum link stage voltage.

15. The power conversion device of claim 1, wherein a maximum voltage of the link stage is selected based on a selected maximum link stage capacitance.

16. The power conversion device of claim 1, wherein the link stage comprises a plurality of capacitors, each capacitor in series with a bidirectional conducting bidirectional blocking controllable switching device, the plurality of capacitors arranged in series or in parallel with the input circuitry and the output switch bridge, and wherein each capacitor transfers power in at least two switching cycles over a load power cycle.

17. The power conversion device of claim 1, wherein the link stage comprises a plurality of series inductors, each inductor in parallel with a forward conducting bidirectional blocking controllable switching device, the plurality of inductors arranged in series or in parallel with the input circuitry and the output switch bridge.

18. A method of controlling a power conversion device, comprising:
   providing the power conversion device of claim 1; and
   operating the device to regulate the input and output currents with suppression of a double frequency harmonic component.

19. A method of controlling a power conversion device, comprising:
   providing the power conversion device of claim 1; and
   operating the device with a plurality of switching cycles, each switching cycle comprising at least one charging state, at least one discharging state, and at least one state during which no power is transferred.

20. The device of claim 1, wherein the device is operative in order such that the at least discharging state occurs in the switching cycle after the at least one charging state, and the single state in which no power is transferred through the link stage occurs in the switching cycle after the at least one charging state and the at least one discharging state.

\* \* \* \* \*